United States Patent
Tuda

(10) Patent No.: US 7,116,852 B2
(45) Date of Patent: Oct. 3, 2006

(54) OPTICAL SIGNAL PROCESSING CIRCUIT AND METHOD OF PRODUCING SAME

(75) Inventor: Hiroyuki Tuda, Tokyo (JP)

(73) Assignee: Keio University, Tokyo (JP)

( * ) Notice: Subject to any disclaimer, the term of this patent is extended or adjusted under 35 U.S.C. 154(b) by 63 days.

(21) Appl. No.: 10/451,157

(22) PCT Filed: Dec. 11, 2001

(86) PCT No.: PCT/JP01/10824

§ 371 (c)(1),
(2), (4) Date: Jun. 30, 2003

(87) PCT Pub. No.: WO02/054120

PCT Pub. Date: Jul. 11, 2002

(65) Prior Publication Data

US 2004/0047561 A1    Mar. 11, 2004

(30) Foreign Application Priority Data

Dec. 28, 2000   (JP)   ............... 2000-403167

(51) Int. Cl.
  *G02B 6/12* (2006.01)
  *H01L 21/00* (2006.01)
(52) U.S. Cl. .................... 385/14; 385/11; 385/31; 385/122; 385/129; 385/130; 385/131; 438/29; 438/31
(58) Field of Classification Search ............... 385/39, 385/41, 47, 50, 51, 129, 132, 11, 14, 31, 122, 385/130, 131; 356/328; 438/29, 30, 31, 438/32, 40, 42, 43, 16
See application file for complete search history.

(56) References Cited

U.S. PATENT DOCUMENTS

| 5,029,981 | A | * | 7/1991 | Thompson | 359/572 |
| 5,216,727 | A | * | 6/1993 | Vakhshoori et al. | 385/14 |
| 5,495,331 | A | * | 2/1996 | Wulf | 356/328 |
| 6,563,997 | B1 | * | 5/2003 | Wu et al. | 385/130 |
| 6,795,182 | B1 | * | 9/2004 | Rakuljic et al. | 356/328 |

FOREIGN PATENT DOCUMENTS

| JP | 7-7229 | | 1/1995 |
| JP | 10-133052 | * | 5/1998 |
| JP | 2000-098150 | * | 4/2000 |

OTHER PUBLICATIONS

Y. Kawajiri et al.; "Characteristics of a 90 degree optical interconnection device using a slab waveguide with an elliptically-shaped mirror"; *The 1998 Institute of Electronics, Information and Communication Engineers General Conference C-3-145*; p. 311; Mar. 27, 1998.

* cited by examiner

Primary Examiner—Brian M. Healy
(74) Attorney, Agent, or Firm—Armstrong, Kratz, Quintos, Hanson & Brooks, LLP

(57) ABSTRACT

A novel two-dimensional optical signal processing circuit which becomes possible only by the introduction of a concave, flat or convex reflecting structure; and a method of producing the same. Disposed on an optical wave-guiding circuit board (50) formed with an output wave-guiding path (13) and an input wave-guiding path (14) are the optical axes of the input coupling end (I) and output coupling end (U) of a coupling circuit (15) such that the optical axes pass through the same point (Q) on a reflection structure (16), the reflection structure (16) being fabricated by using a laser ablation device (30).

29 Claims, 41 Drawing Sheets

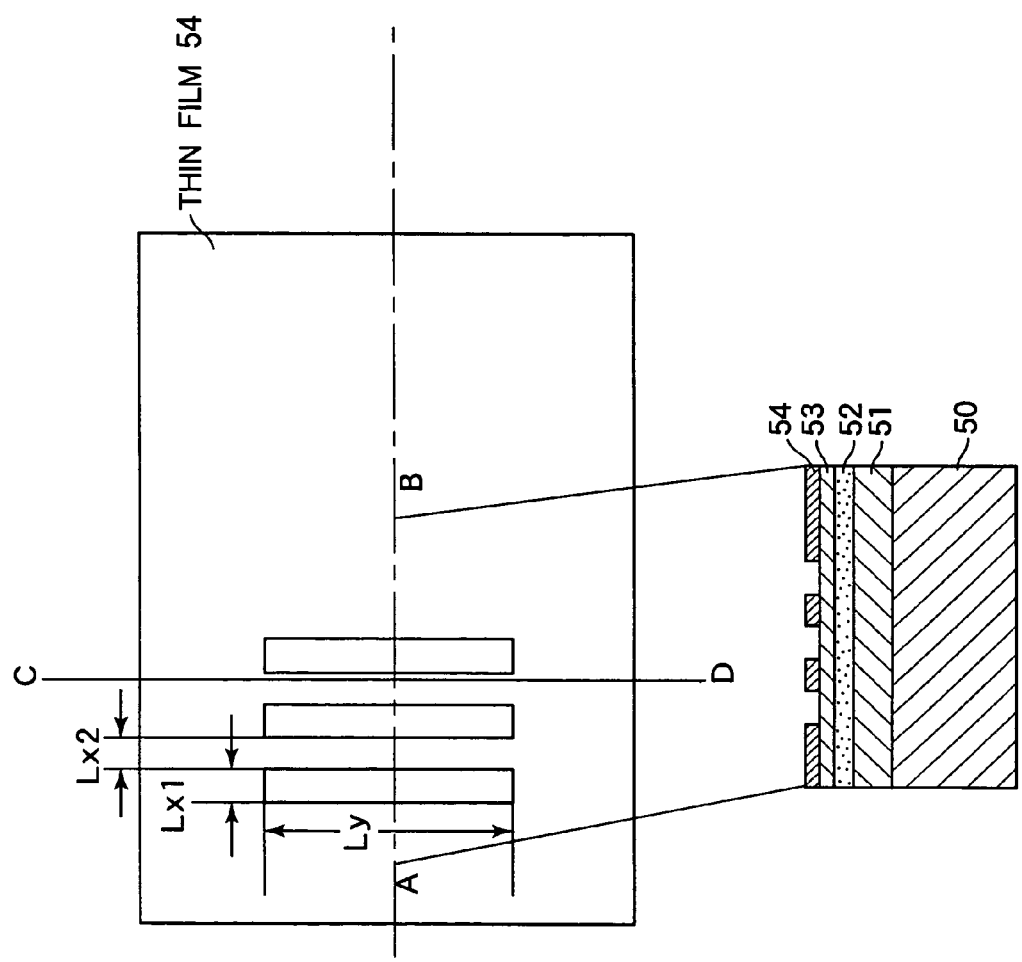

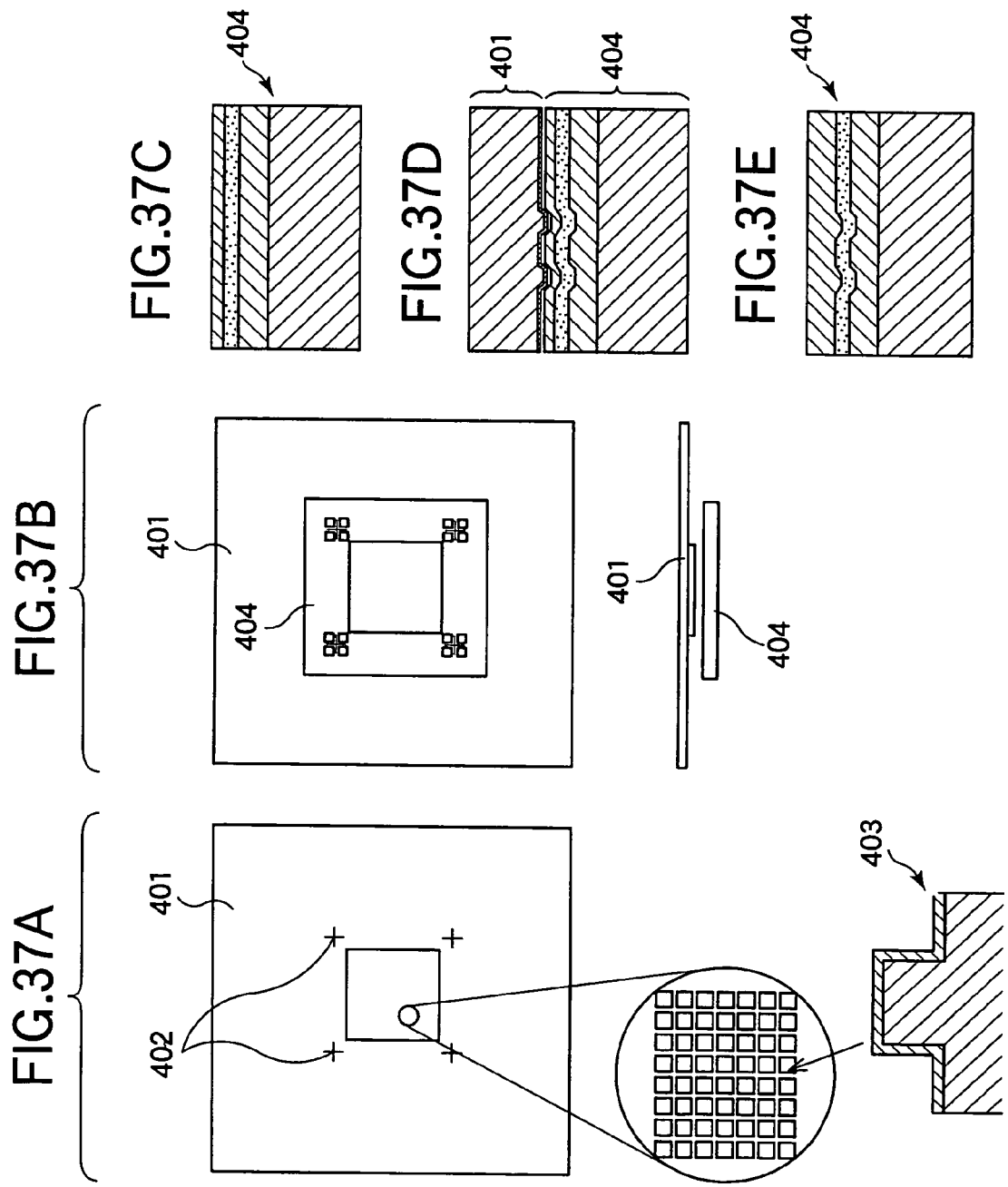

OPTICAL SIGNAL PROCESSING CIRCUIT AND METHOD OF PRODUCING SAME

BACKGROUND OF THE INVENTION

1. Field of the Invention

The present invention relates to an optical signal processing circuit and a method for producing the same. In particular, it relates to an optical signal processing circuit and a method for producing the same, which are effective in applications for an optical multiplexer for optical communications and an optical signal processing apparatus that controls a super high-speed optical signal waveform.

2. Description of the Related Art

There is an optical signal processing circuit disclosed in Japanese publication of unexamined patent application No. (hereinafter referred to as JP-A-) 2000-098150 as one of the prior arts pertaining to optical signal processing circuits having a concave, flat or convex reflecting structure formed therein.

In the prior art, it has been proposed that optical coupling between an arrayed waveguide and an input/output waveguide is coupled by means of a reflecting structure.

However, the prior art does not provide any detailed method for producing the reflecting structure, and problems remain in the reflecting structure and in arrangement of the input/output waveguides.

FIG. 42 shows a configuration of a prior art slab waveguide lens function circuit.

The slab waveguide type lens function circuit 200 is structured so that arrayed waveguides 201a and 201b consisting of a single waveguide or a number of waveguides are connected to each other via a slab waveguide 202. Ends 201ae and 201be of respective waveguides are disposed on arcs centering around both ends P and Q of optical axes PQ of the slab waveguide 202. The configuration becomes approximately equivalent to a case where the ends 201ae and 201be of the waveguides are placed at positions of the front focusing plane and the rear focusing plane in a lens because both ends P and Q of the slab waveguide 202 are, respectively, made into the relationship of spatial Fourier transformation.

However, in the configuration, it is impossible that an image-formation of each other is established between two waveguides 201 and 201b as in an optical system using lenses and mirrors, and since it is necessary that the ends 201ae and 201be of the waveguides are disposed on arcs, the degree of freedom in creating circuits is low.

Further, no publicly known technique is provided in regard to a general configurational method of an optical signal processing circuit in which a reflecting structure of a concave, flat or convex plane or a periodic grooved structure is formed in an optical waveguide circuit to constitute a reflective optical system.

There is a one-dimensional optical waveguide as a technique that can be regarded as its particular case, wherein a reflecting structure of a distributed feedback type semiconductor laser and a distributed reflective type semiconductor laser, and an optical fiber diffraction grating are already known.

In actuality, however, these publicly known techniques are arts pertaining to a reflecting structure and diffractive structure, which are constituted in a single optical waveguide, and are not necessarily sufficient for circuit design of a two-dimensional planar waveguide having a concave, flat or convex reflecting structure or a periodic grooved structure.

Also, in an ion etching method (reactive ion etching method) that has generally and conventionally been utilized as a production technique for the above-described structure, since it is not possible to form smooth grooves perpendicularly and sufficiently deep, the method is not suitable for production of the above-described optical signal processing circuit.

The convergence ion beam etching method as has been disclosed in JP-A-H7-7229 can be considered as another groove formation art.

However, although the perpendicularity and smoothness of the grooved structure formed by this method are comparatively satisfactory, the convergence ion beam etching method has a slow etching speed, wherein it takes two or three hours to form a grooved structure of several tens of microns. In addition, the ion beam diameter is usually 5 through 10 microns in the convergence ion beam etching method, wherein further minute processing is difficult to perform. Therefore, concurrent use of a specified mask is taken into consideration. However, since the etching selectivity is slight between substances with respect to the ion beam, it is necessary to provide a thick resist film in view of forming deep grooves, and resultantly it is difficult to process minute patterns of 3 microns or less.

FIG. 43 shows a configuration of an optical nonlinear element having a pseudo phase matching section by a prior art periodic polarization inverting structure 502. In the prior art element, efficiencies of wavelength conversion and secondary higher harmonics generation, etc., are low if applied for practical uses, and the prior art element is driven only by a laser light having high intensity. Since the efficiencies are proportional to the square of an element length, a large-sized substrate may be used. However, it is extremely difficult to produce a large-sized substrate, and production cost thereof is expensive. Also, the application area of a large-sized element is narrowed in view of practical applications.

In the prior art laser processing, there is a limit in minute processing of a high wavelength, and the prior art laser processing is not suitable for a sub-micron process. This is a physical limit resulting from a diffraction limit of light. Utilization of a mask by electron beam tracing is taken into consideration. However, since light exponentially attenuates if the light transmits a window whose dimension is less than the wavelength, deep processing becomes impossible.

Conventionally, no configuration method of TE/TM mode coupler/splitter circuit that can be integrated in a waveguide has publicly been known.

In the prior arts, a specified pattern is formed by an electron beam exposure and tracing method, a structure is produced by dry etching, etc., and a diffraction grating is produced in a waveguide. (For example, DFB laser utilizing a chemical compound semiconductor). However, an expensive and large-sized apparatus is indispensable for highly accurate etching.

Conventionally, ion implantation type and combination of substrates aiming at reflectivity control utilizing an ion implantation technique are not taken into consideration, and no report exists of an optical signal processing element utilizing the same. The ion implantation is used mainly to control the electric transmissivity of a semiconductor, and only a research report exists of a current narrowing structure by $H^+$ ion implantation in production of optical elements.

Conventionally, it takes a long time for patterning of minute processing. For example, it takes approximately 10 hours to trace at an accuracy of 0.01 microns in an area of 1 cm square with an electron beam tracing device. For this reason, an element provided by the electron beam exposure/tracing method generally becomes expensive and special.

SUMMARY OF THE INVENTION

In view of the above problems, it is therefore an object of the invention to provide a novel two-dimensional optical signal processing circuit that is enabled only after introduction of a reflecting structure having a concave, flat or convex plane, and a method for producing the same.

An optical signal processing circuit according to the invention comprises: a substrate on which optical waveguides are held; first and second optical waveguides formed on the substrate; and a reflecting structure that disposes the first coupling end of the first optical waveguide and the second coupling end of the second optical waveguide, which are formed on the substrate, in a position where an image-formation of each other is established, and couples them together.

In addition, an optical signal processing circuit according to the invention comprises: a substrate on which an optical waveguide is held; first and second optical waveguides formed on the substrate; and a reflecting structure that disposes the first coupling end of the first optical waveguide and the second coupling end of the second optical waveguide, which are formed on the substrate, in a position where an image Fourier transformation of each other is established, and couples them together.

Also, the optical signal processing circuit according to the invention is featured in that the reflecting structure is shaped to be an arc whose radius is r; and the first coupling end and the second coupling end are disposed so that the optical axes thereof pass through the same point Q on the corresponding reflecting structure, and the coupling ends are disposed at a symmetrical position with respect to the straight line including the center P of the arc of the reflecting structure and the point Q, and are further disposed on an arc whose radius is r, centering around a termination point T that is provided by extending the line segment PQ by r/2 in the direction of the point Q.

Further, the optical signal processing circuit according to the invention is featured in comprising: a substrate on which optical waveguides are held; three or more optical waveguides formed on the substrate; and a plurality of reflecting structures coupling between the optical waveguides formed on the substrate.

In addition, the optical signal processing circuit according to the invention is featured in that the reflecting structure is shaped to be an arc whose radius is r; and the first coupling end and second coupling end of the optical waveguide are disposed so that the optical axes thereof pass through the same point Q on the corresponding reflecting structure, and the coupling ends are disposed at a symmetrical position with respect to the straight line including the center P of the arc of the reflecting structure and the point Q.

Also, the optical signal processing circuit according to the invention is featured in that the reflecting structure is shaped to be an arc whose radius is r; and the first coupling end and second coupling end of the optical waveguide are disposed so that the optical axes thereof pass through the same point Q on the corresponding reflecting structure, and the coupling ends are provided on the arc whose radius is r, centering around the point Q, and are disposed at a symmetrical position with respect to the straight line including the center P of the arc of the reflecting structure and the point Q.

Also, the optical signal processing circuit according to the invention is featured in that an intersection line of the reflecting structure and the plane including the optical axis of the optical waveguide is parabolic, elliptical, or hyperbolic.

Further, the optical signal processing circuit according to the invention is featured in further comprising a periodic grooved structure formed in the light propagation path on the substrate.

In addition, the optical signal processing circuit according to the invention is featured in that the periodic grooved structures are shaped so that respective grooves thereof are straight, and are disposed in parallel to each other in a specified direction.

Also, the optical signal processing circuit according to the invention is featured in that the periodic grooved structures are shaped so that respective grooves thereof are straight, and are disposed in parallel to each other in a plurality of different directions respectively.

Further, the optical signal processing circuit according to the invention is featured in that the periodic grooved structures are shaped so that respective grooves thereof are arcuate or quadratic-curved.

Also, the optical signal processing circuit according to the invention is featured in that the periodic grooved structure has the periods of the grooves varying by fixed spacing.

In addition, the optical signal processing circuit according to the invention is featured in that the periodic grooved structure has the depths of the grooves varying by fixed depths.

In addition, the optical signal processing circuit according to the invention is featured in that the periodic grooved structure has the periods of the grooves varying periodically.

Also, the optical signal processing circuit according to the invention is featured in that the periodic grooved structure has a ratio in the widths of concave portions and convex portions of the grooves, which is 1:1/nc (nc is the effective refractive index of the optical waveguide).

Also, the optical signal processing circuit according to the invention is featured in that the periodic grooved structure has the concave portions of the respective grooves filled up with a material whose refractive index differs from that of the material for the optical waveguide.

In addition, the optical signal processing circuit according to the invention is featured in that the periodic grooved structure has the concave portions of the respective grooves filled up with a material whose refractive index (nx) differs from that of the material for the optical waveguide, and a ratio in the widths of concave portions and convex portions of the grooves, which is 1/nx: 1/nc.

On the other hand, a method for producing the optical signal processing circuit according to the invention comprises the following steps of (i) through (v).

(i) fixing a substrate, on which an optical waveguide is formed, on a stage;
(ii) adjusting the tilt angle so that the substrate becomes perpendicular to the optical axis of a laser beam by observing a plurality of markers provided on the substrate with a monitoring device;
(iii) rendering a stage controller to recognize the position of an optical waveguide by observing a plurality of markers provided on the substrate with a monitoring device;
(iv) condensing the laser beam along the portion where a reflecting structure is provided, and producing concave portions by moving the stage; and
(v) condensing the laser beam along the surroundings of the concave portions and smoothening the end faces of the concave portions by moving the stage.

In addition, a method for producing the optical signal processing circuit according to the invention comprises the following steps of (i) through (ix);
(i) applying resist on a substrate on which an optical waveguide is formed;
(ii) tracing a pattern on the resist by using an electron beam tracing device;
(iii) developing the resist;
(iv) fixing the substrate, on which the pattern is formed, on a stage;
(v) adjusting the tilt angle so that the substrate becomes perpendicular to the optical axis of a laser beam by observing a plurality of markers provided on the substrate with a monitoring device;
(vi) rendering a stage controller to recognize the position of the above-mentioned pattern by observing a plurality of markers provided on the substrate with a monitoring device;
(vii) condensing the laser beam, and etching the surface by sweeping the surface with a spot of the laser beam while moving the stage;
(viii) controlling the etching depth according to the number of times of pulse irradiation; and
(ix) peeling off the resist.

Further, a method for producing the optical signal processing circuit according to the invention comprises the following steps of (i) through (xi);
(i) forming a thin film (A) made of metal or dielectrics on the optical waveguide;
(ii) applying resist on the thin film (A) of a substrate;
(iii) tracing a pattern on the resist with an electron beam tracing device;
(iv) developing the resist;
(v) etching the thin film (A) by a reactive ion etching device while using the resist as a mask, and copying the electron beam traced pattern;
(vi) peeling off the resist;
(vii) fixing the substrate on a stage;
(viii) adjusting the tilt angle so that the substrate becomes perpendicular to the optical axis of a laser beam by observing a plurality of markers provided on the substrate with a monitoring device;
(ix) rendering a stage controller to recognize the position of the pattern by observing a plurality of markers provided on the substrate with a monitoring device;
(x) condensing the laser beam and etching the surface by sweeping the surface with a spot of the laser beam while moving the stage; and
(xi) controlling the etching depth according to the number of times of pulse irradiation.

The optical signal processing circuit according to the invention comprises; a substrate on which an optical waveguide is held; first through Nth optical waveguide (N is an integer not less than 2) formed on the substrate; and N−1 reflecting structures that dispose the first coupling end of the kth optical waveguide (k is an integer of N−1≧k≧1) and the second coupling end of the k+1th optical waveguide, which are formed on the substrate, in a position where an image-formation of each other is established, and couple them together.

Further, an optical signal processing circuit according to the invention comprises: a substrate on which an optical waveguide is held; first through Nth optical waveguide (N is an integer not less than 2) formed on the substrate; and N−1 total reflecting structures formed on the substrate that couple the kth optical waveguide (k is an integer of N−1≧k≧1) and the k+1th optical waveguide.

In addition, an optical signal processing circuit according to the invention is featured in that a part or the entirety of the optical waveguide includes a nonlinear optical material.

Also, an optical signal processing circuit according to the invention is featured in that the nonlinear optical material has a periodic polarization inverting structure.

Further, an optical signal processing circuit according to the invention is featured in comprising: a substrate on which an optical waveguide is held; a reflecting structure for collimating light from the incident waveguide, in a slab waveguide formed on the substrate; and a periodic structure formed in the propagation path of the light collimated by the reflecting structure, transmits light polarized in one direction and reflects light polarized in the direction orthogonal thereto.

Still further, an optical waveguide including a core layer, a lower clad layer and an upper clad layer; and resist filled up in the core layer, lower clad layer or upper clad layer, and having a pattern traced by an electron beam.

Also, a method for producing the optical signal processing circuit according to the invention is featured in comprising the following steps of:
(i) applying resist on a substrate on which an optical waveguide is formed;
(ii) tracing, on the resist with an electron beam tracing device, a pattern whose length in a specified direction is longer than the wavelength of a laser beam and length orthogonal to the direction is shorter than the wavelength of the laser beam;
(iii) developing the resist;
(iv) fixing the substrate, on which the pattern is formed, on a stage;
(v) adjusting the tilt angle so that the substrate becomes perpendicular to the laser beam optical axis by observing a plurality of markers provided on the substrate with a monitoring device;
(vi) rendering a stage controller to recognize the position of the pattern by observing a plurality of markers provided on the substrate with a monitoring device;
(vii) condensing the laser beam and etching the surface by sweeping the surface with a spot of the laser beam while moving the stage;
(viii) controlling the etching depth according to the number of times of pulse irradiation; and
(ix) peeling off the resist.

In addition, a method for producing the optical signal processing circuit according to the invention is featured in comprising the following steps of:
(i) forming a metal or dielectric thin film on a substrate on which an optical waveguide circuit is formed, and applying resist on the thin film;
(ii) tracing a pattern on the resist with an electron beam tracing device;
(iii) developing the resist;
(iv) copying the electron beam-traced pattern by etching using the resist as a mask;
(v) peeling off the resist;
(vi) accelerating and implanting ions; and
(vii) removing the thin film.

Further, a method for producing the optical signal processing circuit according to the invention is featured in comprising the following steps of:
(i) fabricating a minute structure having concave and convex portions on a metal die;
(ii) forming positioning markers on the metal die having the minute structure and on an optical waveguide substrate respectively;

(iii) forming a replica of the minute structure on the optical waveguide substrate while applying pressure with the positions of the metal die and optical waveguide substrate matching each other; and (iv) forming a core layer and an upper clad layer on a lower clad layer where the replica is produced on the lower clad layer; or forming an upper clad layer on the core layer where the replica is formed on the core layer.

In addition, an optical signal processing circuit according to the invention is featured in that a part or the entirety of the optical waveguide includes an optical amplification material.

Also, an optical signal processing circuit according to the invention is featured in that the optical amplification material is YIG, GGG, YAG, sapphire, $LiNbO_3$, $BaTiO_3$, $LiTaO_3$, quartz or glass, to which a lanthanoid-based rare earth element or Cr is doped.

The present specification includes the description and/or drawings of Japanese Patent Application No. 2000-403167, which is the basis of priority claim of the present application.

BRIEF DESCRIPTION OF THE DRAWINGS

FIG. 34 shows the details of a pattern of a thin film 54;

FIGS. 37A–E show a method for producing a sub-micron level minute refractive index controlling structure by a minute pattern copying method according to a fourteenth embodiment of the invention;

DESCRIPTION OF REFERENCE NUMBERS

Figure 1:
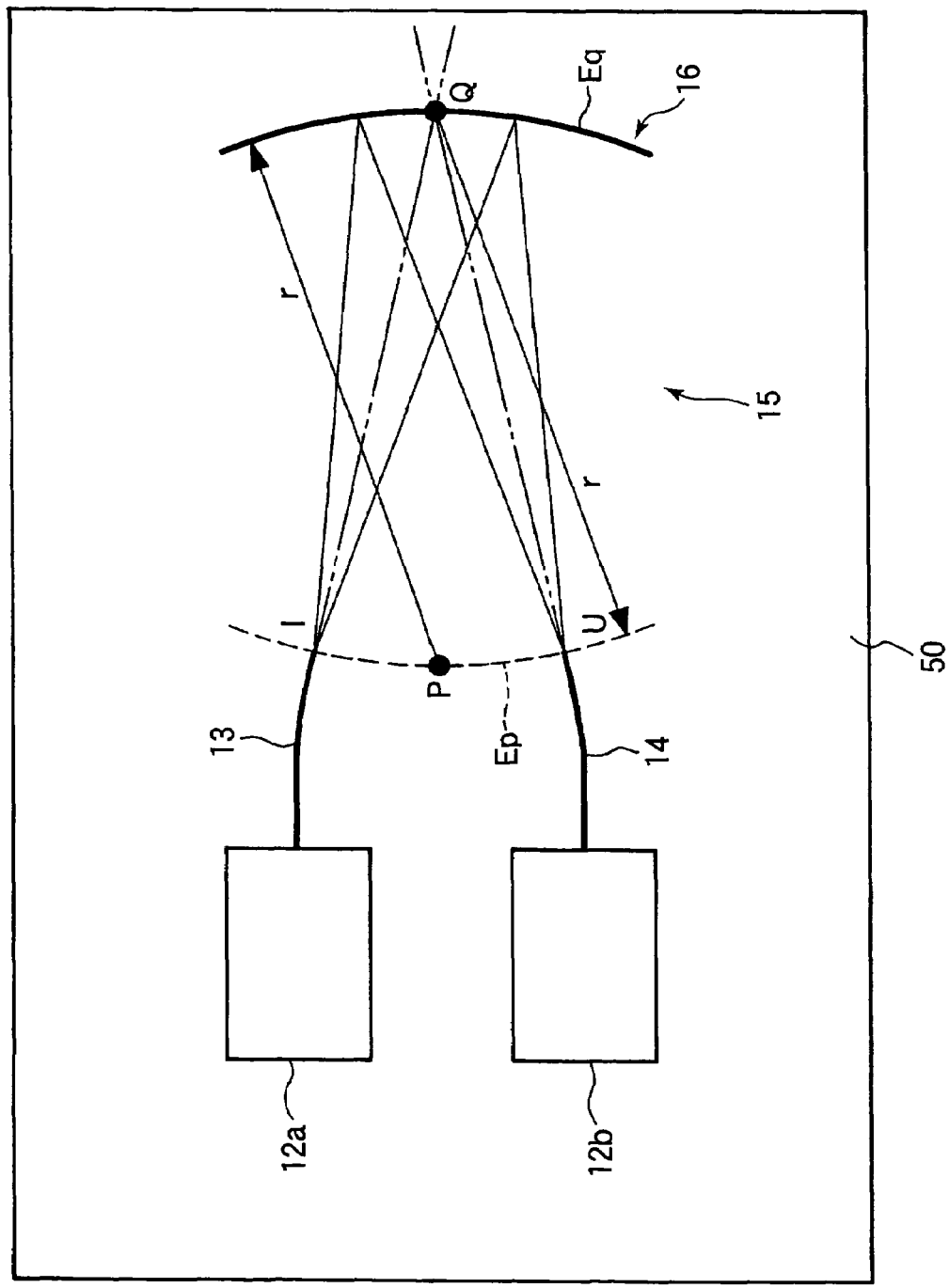
FIG. 1 shows a configuration of an optical signal processing circuit constructed by coupling of two optical waveguide circuits 12a and 12b utilizing a reflecting structure, according to a first embodiment of the invention.

12 Optical waveguide circuit
13 Output waveguide
14 Input waveguide
15 Coupling circuit (Slab waveguide)
16 Reflecting structure
30 Laser ablation device
50 Optical waveguide substrate
51 Lower clad layer
52 Core layer
53 Upper clad layer
54 Thin film
55 Resist
56 Metal or dielectric film
57 Concave portion
60 1:2 optical coupler
70 N:N star-type optical coupler
80 Optical wavelength multiplexer
81 Periodic structure
82, 83, 84 Grooves
86 Filler
90 Optical wavelength multiplexer
91 Arcuate periodic grooved structure
101 Arrayed waveguide
302 Single mode optical waveguide
303 Slab waveguide
304 Periodic polarization inverting structure
305 Reflecting structure
306 Grooved structure
307 Side wall
401 Quartz substrate
402 Positioning pattern
403 Metal
404 Polymer waveguide substrate
701 Input waveguide
702 Reflecting structure
703 Mode separation structure
704 Output waveguide
705 High refractive index portion
706 Low refractive index portion

DETAILED DESCRIPTION OF THE PREFERRED EMBODIMENTS

Hereinafter, a detailed description is given of preferred embodiments of the invention with reference to the accompanying drawings.

In the description thereof, the same components and elements are given the same reference numbers, and overlapping description thereof is omitted.

FIG. 1 shows a configuration of an optical signal processing circuit constructed by coupling of two optical waveguide circuits 12a and 12b utilizing a reflecting structure, according to a first embodiment of the invention.

Herein, the optical waveguide substrate 50 is provided with the optical waveguide circuits 12a and 12b. The output waveguide 13 and input waveguide 14 are, respectively, connected to the optical waveguide circuits 12a and 12b at their one end side, and are connected to the coupling circuit 15 at their other end side.

Reference number 1 denotes an input coupling end (that is, the output coupling end of the output waveguide 13) of the coupling circuit 15 and output waveguide 13. U denotes the output coupling end (that is, the input coupling end of the input waveguide 14) of the coupling circuit 15 and input waveguide 14.

The coupling circuit 15 is constructed by a slab waveguide 15 in which the respective end faces Ep and Eq including the axis ends P and Q with respect to the axis PQ are shaped so as to become a prescribed curvature.

In the case of the present embodiment, the coupling circuit 15 is shaped so that the end face Ep including one axis end P is made into a curved face whose curvature is r with the other axis end Q made into the center of curvature, and the end face Eq including the other axis end Q is made into a curved face whose curvature is r with the other axis end P made into the center of curvature.

The other end face Eq configures the reflecting structure 16 having a curvature r with the axis end P made into the center of curvature.

In addition thereto, the input coupling end I (that is, the output coupling end of the output waveguide 13) of the coupling circuit 15 and the output coupling end U (that is, the input coupling end of the input waveguide 14) of the coupling circuit 15 are disposed so that these constitute linear symmetry with the axis PQ made into the center line.

Thereby, with respect to the input coupling end I and output coupling end U of the coupling circuit 15, either of the optical axes of the input coupling end I and output coupling end U will pass through the axis end Q on a reflecting structure 16 whose curvature is r.

Therefore, the optical axes of the input coupling end I (that is, the output coupling end of the output waveguide 13) and output coupling end U (that is, the input coupling end of the input waveguide 14) of the coupling circuit 15 pass through the same point Q on the reflecting structure 16, and the lengths IQ and QU of the respective optical axes are kept at the same length.

A portion surrounded by the curvature including the arc IPU and the curvature including an arc of the reflecting structure 16 constitutes the slab waveguide 15.

In the arrangement, the input coupling end I and output coupling end U are caused to establish a relationship by which an image is formed at equal magnification, wherein the output waveguide 13 and input waveguide 14 are coupled together at a high coupling efficiency.

Figure 2:
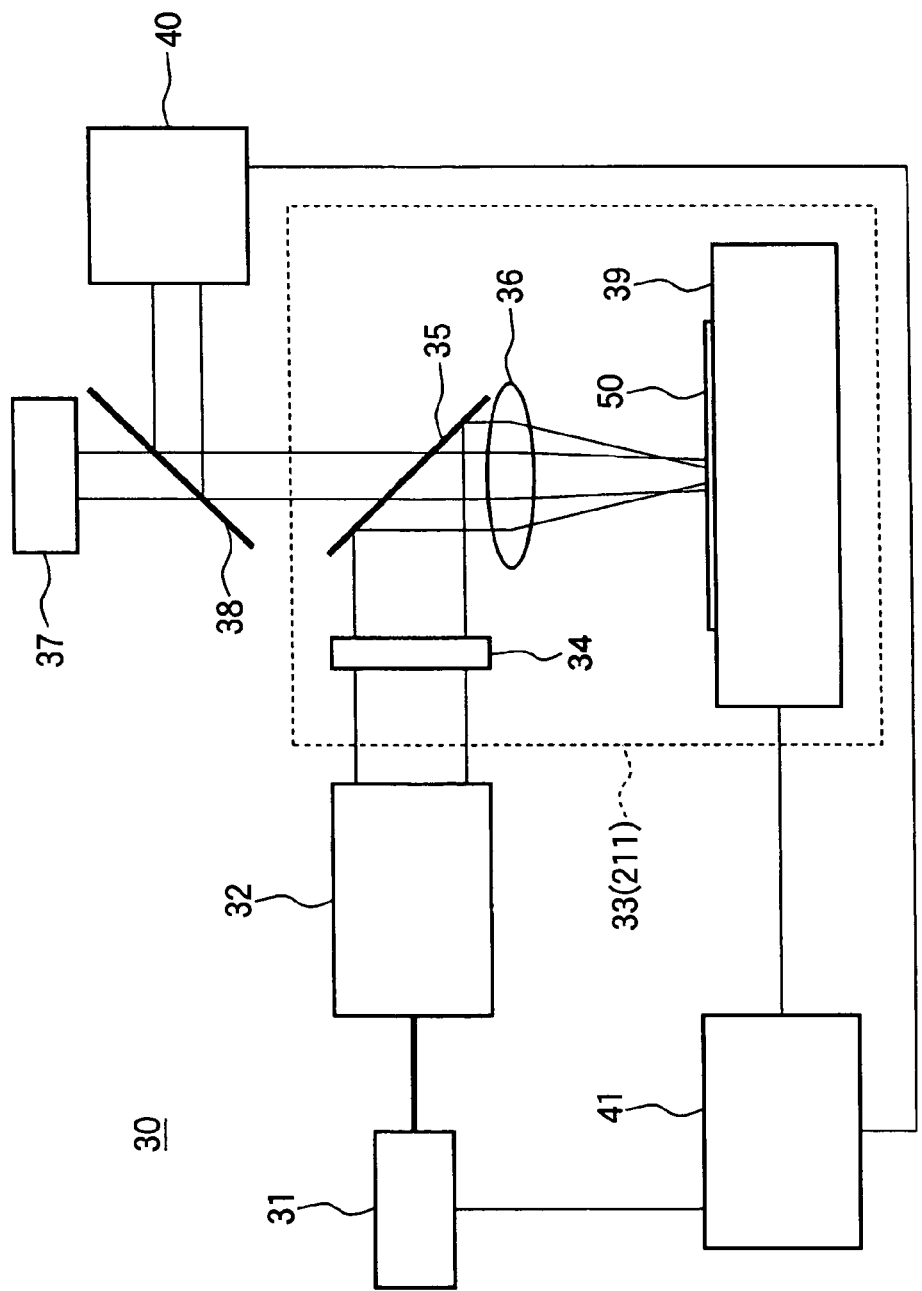
FIG. 2 shows a configuration of a laser ablation device 30 for forming a reflecting structure 16.
Figure 3A:
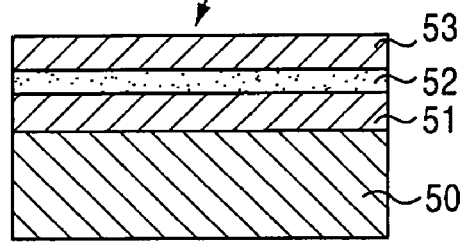
FIGS. 3A–H are sectional views of an optical waveguide substrate 50, which describes the steps of forming the reflecting structure 16 on the optical waveguide substrate 50.
Figure 3E:
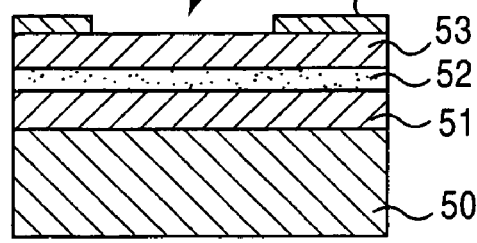
Figure 3B:
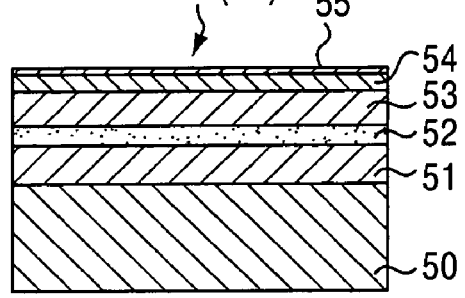
Figure 3F:
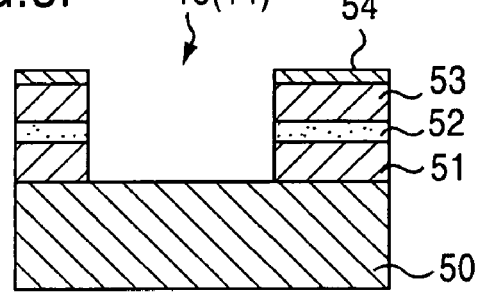
Figure 3C:
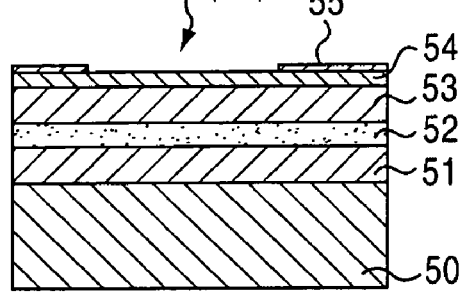
Figure 3G:
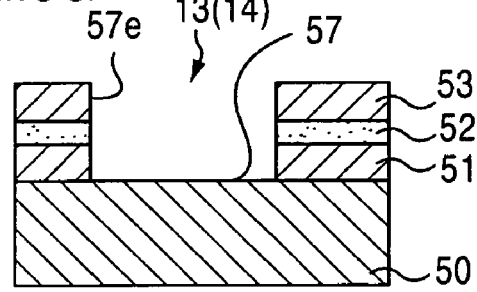
Figure 3D:
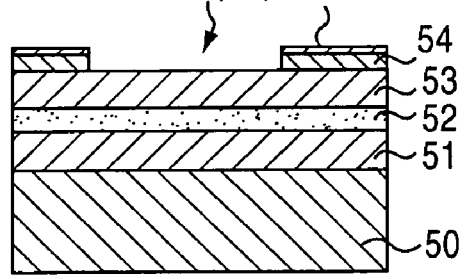
Figure 3H:
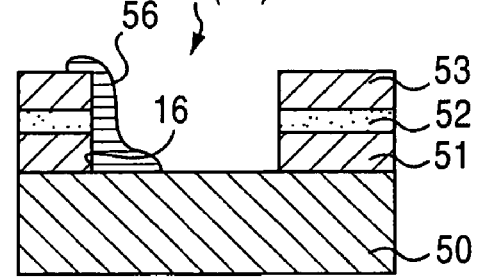

FIG. 2 shows a configuration of a laser ablation device 30 for forming a reflecting structure 16.

Herein, a femtosecond light source 31 that is constructed by a titan sapphire laser, etc., is composed so that, in the case of the present embodiment, for example, a pulse light beam whose repetition frequency is 1 kHz is generated and output at a pulse width which is usually 50fs (femtoseconds) or so, wherein pulse energy of 2 mJ can be obtained.

A pulse light beam generated by the femtosecond light source 31 is provided to a laser light transmission device 32 and is spatially transmitted, wherein the beam diameter is widened by the laser light transmission device 32 so that the light beam is not condensed to a small spot.

A pulse whose beam diameter is widened by the laser light transmission device 32 is devised to be output to a dichroic mirror 35 via a spatial filter 34 secured on the ablation device body 33. The spatial filter 34 is disposed at the focusing position at the rear side of a light condensing lens described later. At this time, since the sectional amplitude profile of the condensed pulse light beam is approximated by Fourier transformation of the sectional amplitude profile on the spatial filter 34, it is possible to control the sectional amplitude profile of the condensed pulse light beam by applying an adequate sectional amplitude profile to the pulse light beam by the spatial filter 34. For example, in the case where a mirror is formed, it is sufficient that the spatial filter 34 is designed so that an amplitude profile expressed in terms of a sine function can be obtained on a line orthogonal to the optical axis.

The dichroic mirror 35 is constructed so as to function as a mirror with respect to light having a wavelength of the pulse light beam and to have a characteristic of propagating the light for the wavelength of an illumination light source. And, the pulse light beam whose sectional amplitude profile is controlled via the spatial filter 34 is guided to the light condensing lens 36.

Also, illumination light from a downward irradiation light source 37 is supplied into the dichroic mirror 35 via a half mirror 38, and the dichroic mirror 35 is constructed so as to guide not only the pulse light beam but also illumination light to the light condensing lens 36.

The light condensing lens 36 is devised so as to condense and irradiate the pulse light beam and illumination light onto the optical waveguide substrate 50, placed and fixed on a micromotion stage 39, which is micromovably disposed at the front-side focusing position with respect to the ablation device body 33.

The irradiation position of the pulse light beam onto the optical waveguide substrate 50 is made adjustable since a controller 41 controls the micromotion of the micromotion stage 39, on which the optical waveguide substrate 50 is placed and fixed, according to image output such as a positioning pattern and an area to be etched, etc., on the optical waveguide substrate 50, which comes from a pickup camera 40 disposed on the mirror face side opposite to the side, of the half mirror 38, where the downward irradiation light source 37 of the half mirror 38 is provided.

Therefore, actuators of the pickup camera 40 and micromotion stage 39 are connected to the controller 41, and at the same time, the Femtosecond light source 31 is also connected thereto. And, the controller 41 controls not only micromotions of the micromotion stage 39 but also a period, energy and number of pulses of the pulse light beam generated by the Femtosecond light source 31. That is, the controller 41 carries out synthetic control with respect to production of an optical signal processing circuit 10 on the optical waveguide substrate 50.

By the laser ablation device 30 thus constructed, the reflecting structure 16 of the optical signal processing circuit 10 is formed by the following steps. In addition, the description thereof is based on the assumption that the waveguide circuit 13 (or 14) is already produced on the optical waveguide substrate 50 in the previous step.

FIGS. 3A–H are sectional views showing an optical waveguide substrate 50, which describes the steps of forming the reflecting structure 16 on the optical waveguide substrate 50;

FIGS. 3A–H are sectional views showing the optical waveguide substrate 50 in which a waveguide circuit 13 (or 14) is formed.

The waveguide circuit 13 (or 14) is formed by laminating the lower clad layer 51, core layer 52, and upper clad layer 53 on the substrate 50 one after another in order.

First, when forming the reflecting structure 16, a metal or dielectric thin film 54 is formed on the waveguide circuit 13 (or 14).

Thereafter, resist 55 is applied on the optical waveguide substrate 50, and the metal or dielectric thin film 54 is coated for processing by the resist 55 (See FIG. 3-(b)).

A pattern is traced on the resist 55 with an electron beam tracing device (not illustrated).

The resist 55 is developed through EB exposure, and the resist 55 existing on the etching plane is peeled off to carry out patterning (See FIG. 3-(c)).

Using the resist 55 as a mask, the resist 55 is peeled off by a reactive ion etching device (not illustrated), and the exposed portions are etched, wherein an electron beam tracing pattern brought about by the electron beam tracing device is copied on the thin film 54 (See FIG. 3-(d)).

After that, the resist 55 is peeled off from the optical waveguide substrate 50 (See FIG. 3-(e)).

Furthermore, the electron beam tracing pattern is copied onto the thin film 54, and the optical waveguide substrate 50 in which the resist 55 is peeled off is fixed on the micromotion stage 39 of the laser ablation device 30.

A plurality of maker images provided on the optical waveguide substrate 50 are observed by a monitoring device (not illustrated) utilizing the pickup camera 40, and the tilt angle is adjusted so that the optical waveguide substrate 50 becomes perpendicular to the optical axis of the pulse light beam.

A plurality of markers provided on the optical waveguide substrate 50 are similarly observed by a monitoring device, and the stage controller (controller) 41 is rendered to recognize the positions of the patterns.

According to control carried out by the controller 41, the laser ablation device 30 condenses a pulse light beam generated by the femtosecond light source 31 with the condensing lens 36 and sweeps the surface of the optical waveguide substrate 50 by a spot of the pulse light beam by moving the micromotion stage 39, thereby etching the upper clad layer 53, core layer 52 and lower clad layer 51 at the portion where the resist 55 is peeled off in the step. Also, the etching depth is controlled by the number of times of irradiation of the pulse light beam (FIG. 3-(f)).

After the etching is completed on the lower clad layer 51, core layer 52 and upper clad layer 53 according to the patterning, the optical waveguide substrate 50 is removed from the micromotion stage 39, and the remaining thin film 54 portion is removed (FIG. 3-(g)).

Metal or dielectric film 56 is deposited on the end faces 57e of the etched concave portion 57, that is, the end faces 57e of the lower clad layer 51, core layer 52 and upper clad layer 53, which are formed by the etching. The lift-off method may be utilized in order to partially form a metal or dielectric film 56 on the optical waveguide substrate 50 (FIG. 3-(h)).

In the procedure, an especially critical point is to select a material of the thin film 54. It is necessary that the thin film 54 is sufficiently thin with respect to the etching depth and endures the irradiation of the pulse light beam. For this reason, metal materials such as tantalum, molybdenum, tungsten, chromium, gold, platinum, vanadium, nickel, silver, and copper are suitable as the material of thin film 54 with respect to the quartz-based waveguide, and dielectric materials such as silicon oxide ($SiO_2$), silicon nitride (SiN), titanium oxide ($TiO_2$), boron nitride (BN), aluminium nitride (AlN) may be acceptable with respect to polymer-based waveguides in addition to the above-described metals.

Also, in the case of the polymer-based waveguide, etching maybe carried out using the resist 55 as a mask without utilizing the thin film 54.

Further, where the beam profile of the laser ablation device 30 approximates a rectangle, no mask is utilized as in the above case, and it is possible that a grooved structure is directly formed. The procedure in this case will be described below.

First, the optical waveguide substrate 50 on which the waveguide circuit 13 (or 14) is formed is fixed on the micromotion stage 39.

A plurality of markers provided on the optical waveguide substrate 50 are observed by the monitoring device, and the tilt angle is adjusted so that the optical waveguide substrate 50 becomes perpendicular to the optical axis of the pulse light beam.

Simultaneously, a plurality of markers provided on the optical waveguide substrate 50 are similarly observed by the monitoring device, and the stage controller (controller) 41 is rendered to recognize the positions of the waveguide circuit 13 (or 14).

Based on control made by the controller 41, the laser ablation device 30 condenses a pulse light beam generated by the femtosecond light source 31 with the light condensing lens 36 along the portion where the reflecting structure 16 is provided, moves the micromotion stage 39 and prepares the concave portion 57.

After that, this time, the laser ablation device 30 condenses a pulse light beam along the surroundings of the concave portion 57, moves the micromotion stage 39 and smoothens the end face 57e of the concave portion 57.

Figure 4:
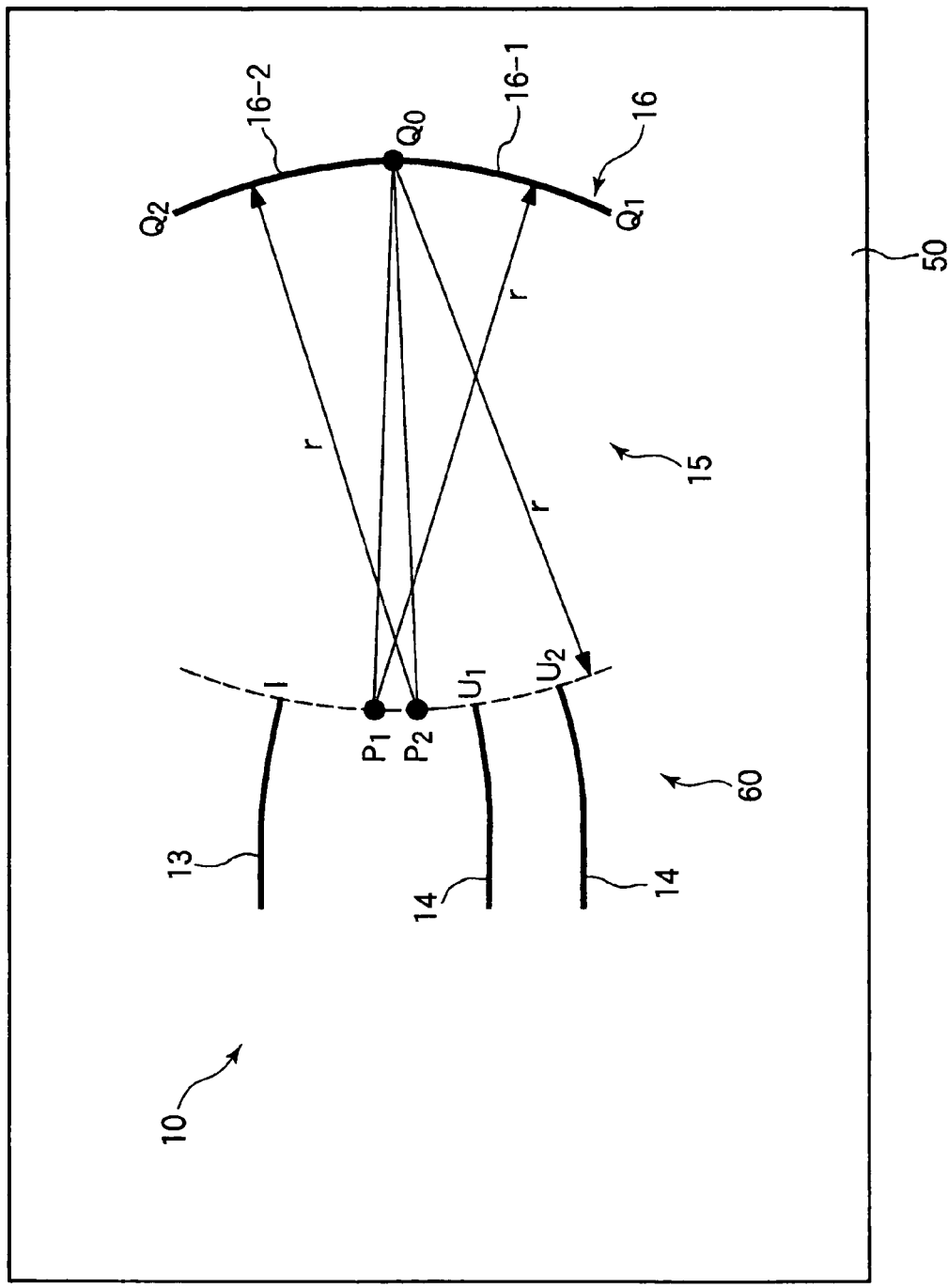
FIG. 4 shows a configuration of a 1:2 optical coupler 60 which is one of the detailed application examples of an optical signal processing circuit according to the first embodiment.

FIG. 4 shows a configuration of a 1:2 optical coupler 60 which is one of the detailed application examples of an optical signal processing circuit according to the first embodiment.

Herein, the reflecting structure 16 is divided into two reflecting structures 16-1 and 16-2 whose center points differ from each other, at the boundary point $Q_0$. The first reflecting structure 16-1 is composed of a spherical surface including an arc $Q_0Q_1$ whose curvature radius is r, centering around the point $P_1$, and the second reflecting structure 16-2 is composed of a spherical face including an arc $Q_0Q_2$ having a curvature radius r of the same size, centering around the point $P_2$.

The center points $P_1$ and $P_2$ are provided on the circumference having a radius r of the same size centering around the boundary point $Q_0$ of the first and second reflecting structure 16-1 and 16-2, and the input coupling end I (that is, the output coupling end of the output waveguide 13) of the coupling circuit 15 and the output coupling end U (that is, the input coupling end of the input waveguide 14) thereof, respectively, meet the positional relationship that is similar to that in the case of the reflecting structure 16 shown in FIG. 1.

That is, the optical axis of the input coupling end I (that is, the output coupling end of the output waveguide 13) of the coupling circuit 15 is disposed on the circumference of radius r passing through the points $P_1$ and $P_2$ centering around the boundary point $Q_0$ so that it passes through the boundary point $Q_0$ of the reflecting structure 16.

In addition thereto, the first output coupling end U1 (that is, the first input coupling end of the input waveguide 14) of the coupling circuit 15 is disposed on the line including the boundary point $Q_0$ of the reflecting structure 16 and the center $P_1$ of an arc of the first reflecting structure 16-1, that is, on the circumference of radius r passing through the points $P_1$ and $P_2$ centering around the boundary point $Q_0$, which is linearly symmetrical to the input coupling end I (that is, the output coupling end of the output waveguide 13) of the coupling circuit 15.

To the contrary, the second output coupling end U2 (that is, the second input coupling end of the input waveguide 14) of the coupling circuit 15 is disposed on the line including the boundary point $Q_0$ of the reflecting structure 16 and the center point $P_2$ of an arc of the second reflecting structure 16-2, that is, on the circumference of radius r passing through the points $P_1$ and $P_2$ centering around the boundary point $Q_0$, which is linearly symmetrical to the input coupling end I (that is, the output coupling end of the output waveguide 13) of the coupling circuit 15, centering the axis $P_2Q_0$.

The portion surrounded by the curvature consisting of these arcs is made into a slab waveguide 15.

Resultantly, since the input coupling end I of the coupling circuit 15 and the first output coupling end U1 thereof, and the input coupling end I of the coupling circuit 15 and the second output coupling end U2 thereof are in a position where an image-formation of each other is established via the first reflecting structure 16-1 consisting of an arc $Q_0Q_1$ and the second reflecting structure 16-2 consisting of an arc $Q_0Q_2$, one half of the emission light from the input coupling end I is distributed to the first output coupling end U1 and the second output coupling end U2, and the optical signal processing circuit according to the present embodiment functions as a 1:2 optical coupler 60 that bifurcates an incident light at the ratio of 1:1.

Also, the 1:2 optical coupler 60 according to the embodiment is formed so that the center point of the first reflecting structure 16-1 consisting of an arc $Q_0Q_1$ is made into $P_1$, and the center point of the reflecting structure 16-2 consisting of an arc $Q_0Q_2$ is made into $P_2$. However, even if the first reflecting structure 16-1 consisting of arc $Q_0Q_1$ is formed with the center point made into $P_2$, and the second reflecting structure 16-2 consisting of arc $Q_0Q_2$ is formed with the center point made into $P_1$, a 1:2 optical coupler having a function similar to that of the 1:2 optical coupler 60 can be constructed.

Further, in the 1:2 optical coupler 60 according to the embodiment, it is a matter of course that a 1:2 optical coupler 60 which distributes light at an arbitrary ratio can be produced by adjusting the division position of the reflecting structure 16.

Figure 5:
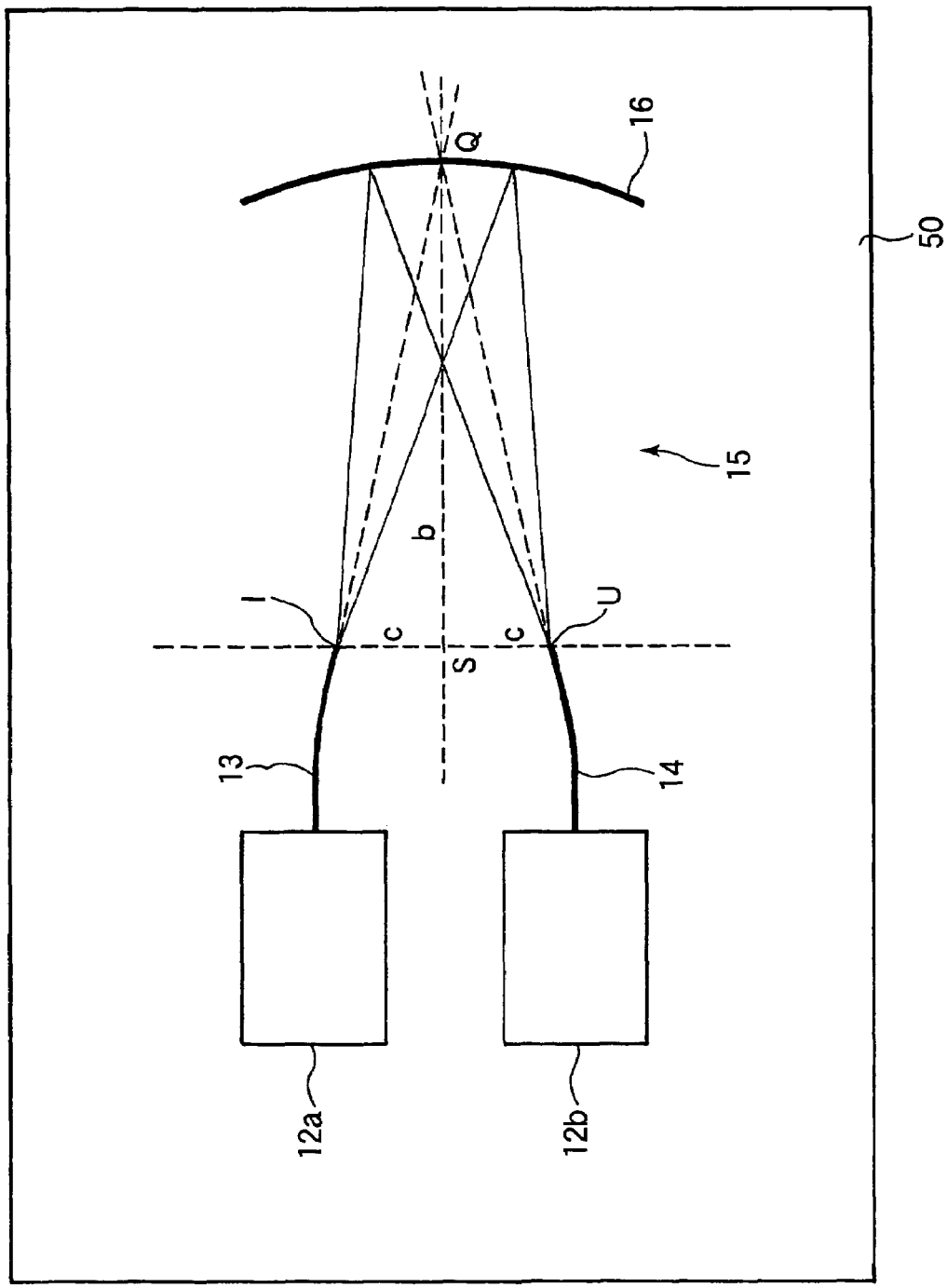
FIG. 5 shows a modified version of the configuration of the optical signal processing circuit constructed by coupling of two optical waveguide circuits 12a and 12b utilizing the reflecting structure shown in FIG. 1.

FIG. 5 shows a modified version of the configuration of an optical signal processing circuit constructed by coupling two optical waveguide circuits 12a and 12b utilizing the reflecting structure shown in FIG. 1.

In the optical signal processing circuit shown in FIG. 1, the description was given of the case where the intersection line of the reflecting structure 16 and plane including the waveguides 13 and 14 is an arc. However, in the optical signal processing circuit shown in FIG. 5, the intersection line of the reflecting structure 16 and the planes including the waveguide lines 13 and 14 is made elliptically arcuate, wherein the input coupling end I of the coupling circuit 15 and the output coupling end U thereof are made into focusing points.

In this case, where the point at which the optical axis of the input coupling end I of the coupling circuit 15 is crossed with that of the output coupling end U thereof is made into Q, the center of an ellipse is made into S, and the minor diameter "b" is expressed in terms of line QS, the distance IS between the input coupling end I and center point S is the same length "c" as the distance US between the output coupling end U and the center point S. Further, if the major diameter of the ellipse is "a," the length "c" meets the relationship expressed by the following expression:

$$c=\sqrt{a^2-b^2} \qquad (1)$$

The reflecting structure 16 is made into an elliptically arcuate curvature having such a relationship.

Also, the curvature of the reflecting structure 16 is not limited to such an elliptical arcuate shape and the above-described arc. It may be a quadratic optical reflective system expressed by other quadratic curves such as a curvature that is expressed by, for example, a parabola and a hyperbola.

Further, in the quadratic optical reflective system in which the reflecting structure 16 shown in FIG. 1 and FIG. 5 is expressed by a quadratic curve including a circular arcuate shape such as an arc or ellipse, a description was given of a configuration of an imaging optical system of equal magnification as an example. However, an imaging optical system of an arbitrary magnification may be constructed.

In this case, in FIG. 1 and FIG. 5, the optical axis of the input coupling end I of the coupling circuit 15 and the optical axis of the output coupling end U thereof pass through the same point Q on the reflecting structure 16, and it is sufficient that the following expression is established with respect to the distance IQ between the input coupling end I and point Q and the distance QU between the point Q and the output coupling end U.

$$\frac{1}{IQ} + \frac{1}{UQ} = \frac{2}{r} \qquad (2)$$

Figure 6:
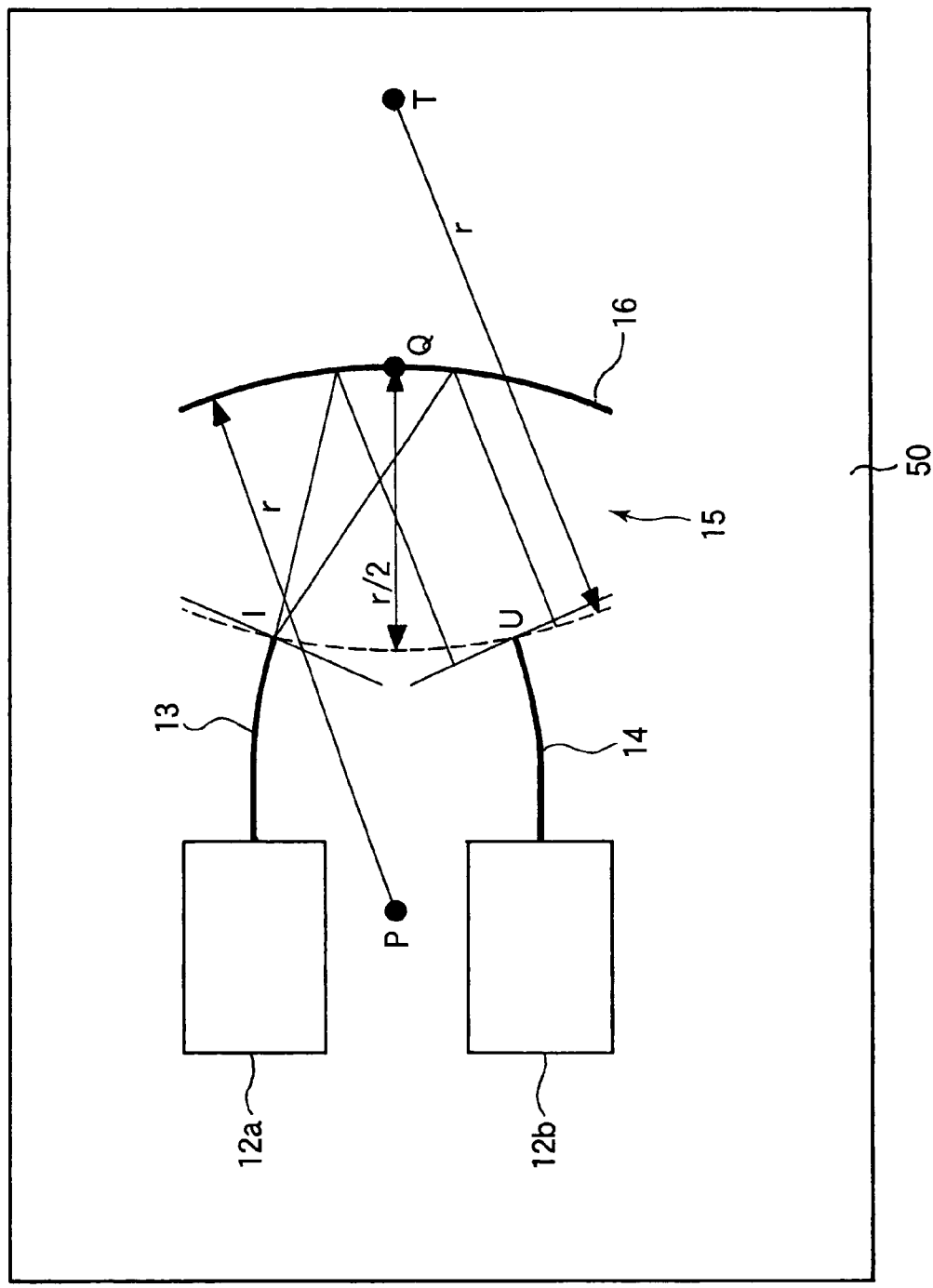
FIG. 6 shows a second embodiment of an optical signal processing circuit constructed by coupling of two optical waveguide circuits 12a and 12b utilizing the reflecting structure 16.

FIG. 6 shows the second embodiment of an optical signal processing circuit constructed by coupling of the two optical waveguide circuits 12a and 12b utilizing the reflecting structure 16.

The reflecting structure 16 is composed of a sphere composed of an arc of curvature radius r centering around the point P. The point Q shows the point on the arc of the reflecting structure 16.

Herein, point T is an end point obtained by extending a segment PQ in the direction of the point Q by a distance of r/2, and the respective centers of the input coupling end I of the coupling circuit 15 and output coupling end U thereof are disposed on the circumference of radius r centering around the end point T. In addition thereto, the optical axis of the input coupling end I (that is, the output coupling end of the output waveguide 13) and the optical axis of the output coupling end U (that is, the input coupling end of the input waveguide 14) of the coupling circuit 15 are disposed so that each thereof passes through the point Q.

The portion surrounded by a curvature consisting of an arc of radius r making the point Q and end point T into the respective centers is made into a slab waveguide 15, and becomes a portion for propagating light.

At this time, the input coupling end I of the slab waveguide (coupling circuit) 15 and the output coupling end U thereof are, respectively, positioned in the relationship of spatial Fourier transformation.

Figure 7:
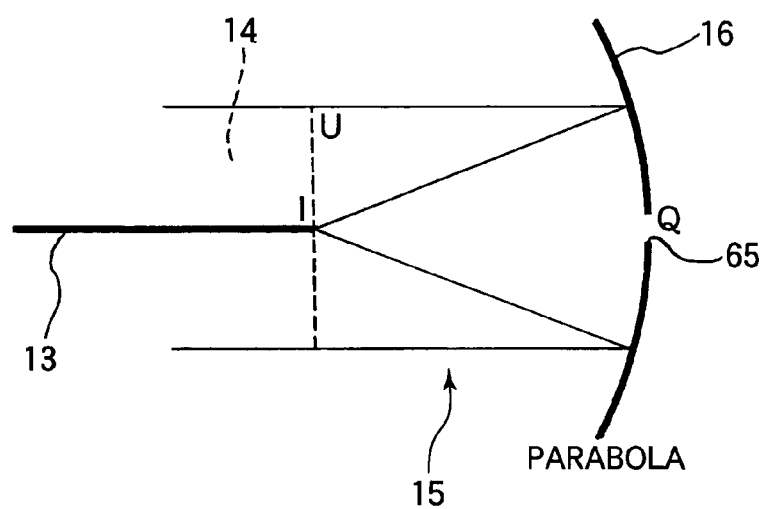
FIG. 7 shows a modified version of the optical signal processing circuit constructed by coupling two optical waveguide circuits 12a and 12b utilizing the reflecting structure shown in FIG. 6.

FIG. 7 shows a modified version of the configuration of the optical signal processing circuit constructed by coupling of two optical waveguide circuits 12a and 12b utilizing the reflecting structure shown in FIG. 6.

In the optical signal processing circuit shown in FIG. 6, a description was given of the case where the intersection line between the reflecting structure 16 and a plane (that is, the plane including the optical axes of the input coupling end I and output coupling end U of the coupling circuit 15) including the waveguides 13 and 14 is an arc. However, in the optical signal processing circuit shown in FIG. 7, the intersection line between the reflecting structure 16 and plane including the waveguides 13 and 14 is devised so as to be expressed by another quadratic curve, for example, a parabola.

That is, in FIG. 7, the reflecting structure 16 is made like a parabola in which the input coupling end I of the coupling circuit 15 is made into the focus, and the top point Q of the parabola in which the optical axis of the input coupling axis I crosses the reflecting structure 16 is made into a notched portion 65, in which a reflected return light is reduced, by removing the reflecting structure 16.

Figure 8:
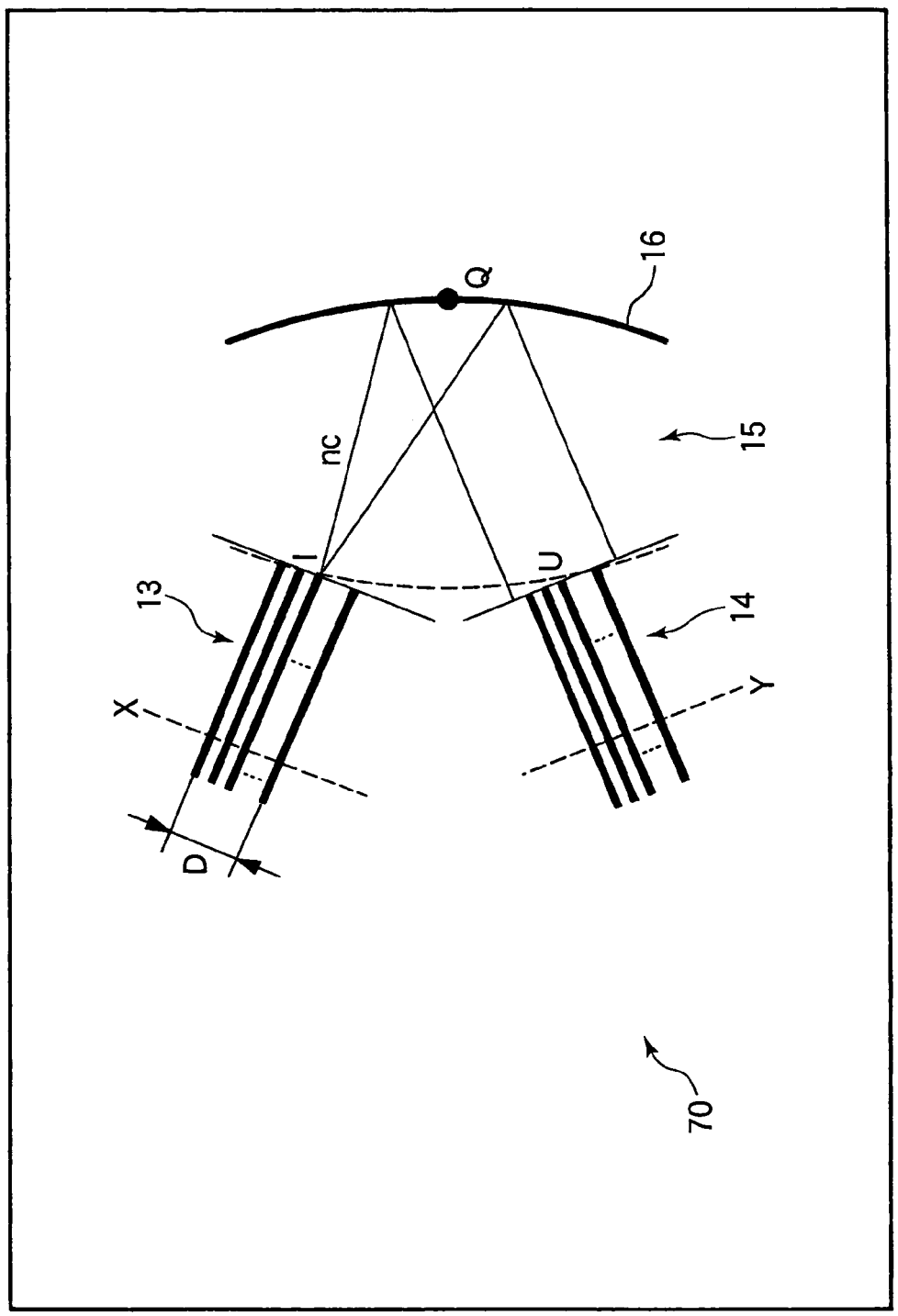
FIG. 8 shows a configuration of an N:N star-type optical coupler 70 as a detailed application example of an optical signal processing circuit according to the second embodiment which is described with respect to FIG. 6.

FIG. 8 shows a configuration of an N:N star-type optical coupler 70 which is a detailed application example of the optical signal processing circuit according to the second embodiment, which is described with respect to FIG. 6.

In the configuration, the output waveguide 13 and input waveguide 14 are, respectively, an array consisting of N waveguides.

Light emitted from one waveguide of the output waveguide 13 is converted to parallel light by the reflecting structure 16, and is distributed to respective waveguides of the input waveguide 14.

In this case, since it is necessary that light is distributed to all the waveguides, the curvature r of the reflecting structure 16 and the widths D of the output waveguide 13 and input waveguide 14 is in a fixed relationship shown by the following expression:

$$\frac{r\omega_c}{\pi n_c \lambda} \geq D \qquad (3)$$

where $\omega_c$ is a mode radius of light propagating in the waveguides of the output waveguide 13 and input waveguide 14, $\lambda$ is a wavelength, $n_c$ is an effective refractive index of the slab waveguide 15, and r is a curvature radius.

Since the input coupling end I of the slab waveguide 15 and the output coupling end U thereof are, respectively, in the relationship of Fourier transformation, the mode profile in the vicinity of the emission end of the output waveguide 13 and input waveguide 14 is controlled in order to reduce the range in the coupling efficiency between waveguides or to increase the coupling efficiency. For example, in the case of increasing the coupling efficiency, the end of the waveguide may be widened to be tapered.

Figure 42:
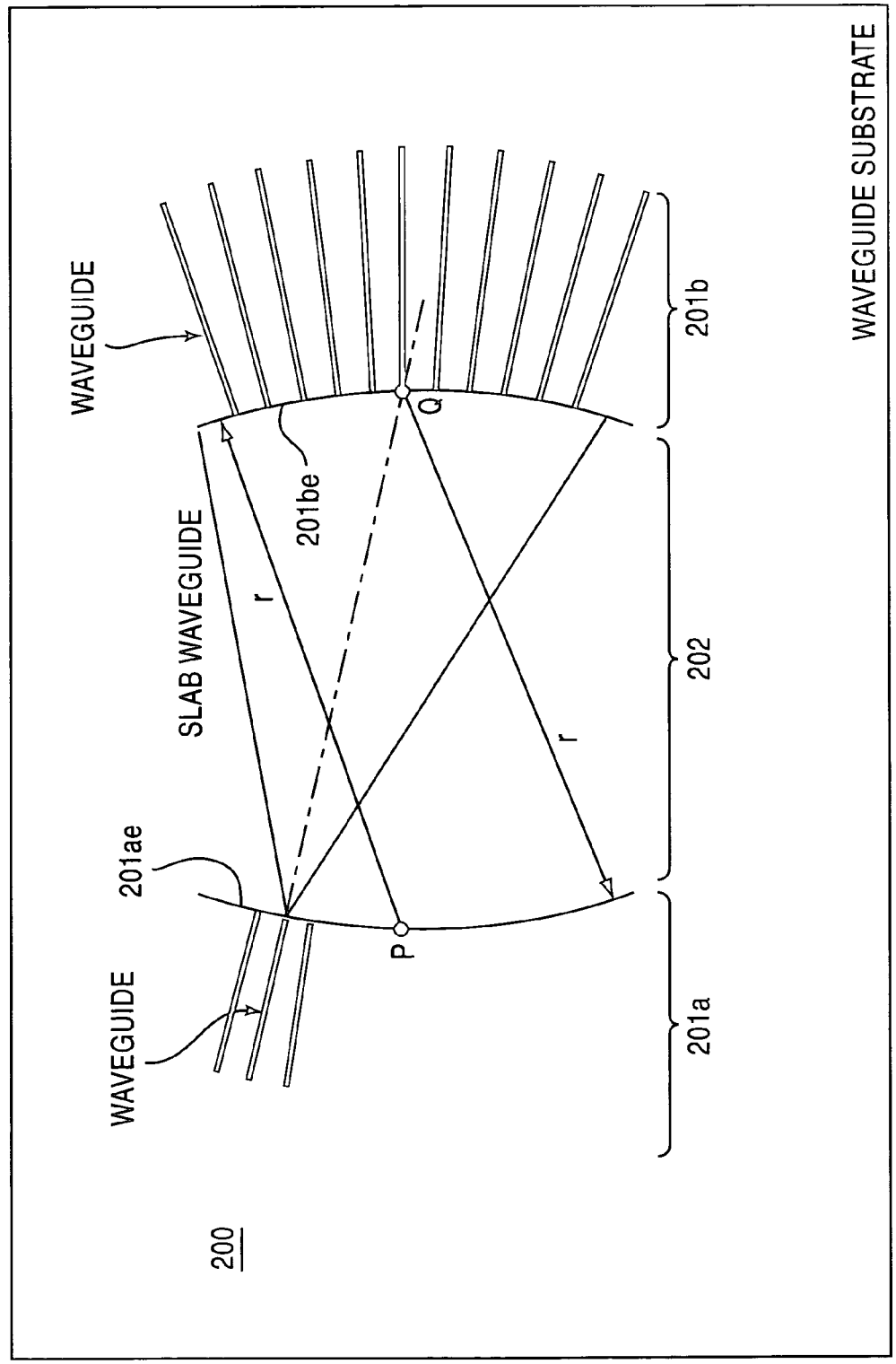
FIG. 42 shows a configuration of a prior art slab waveguide type lens functioning circuit.
Figure 43:
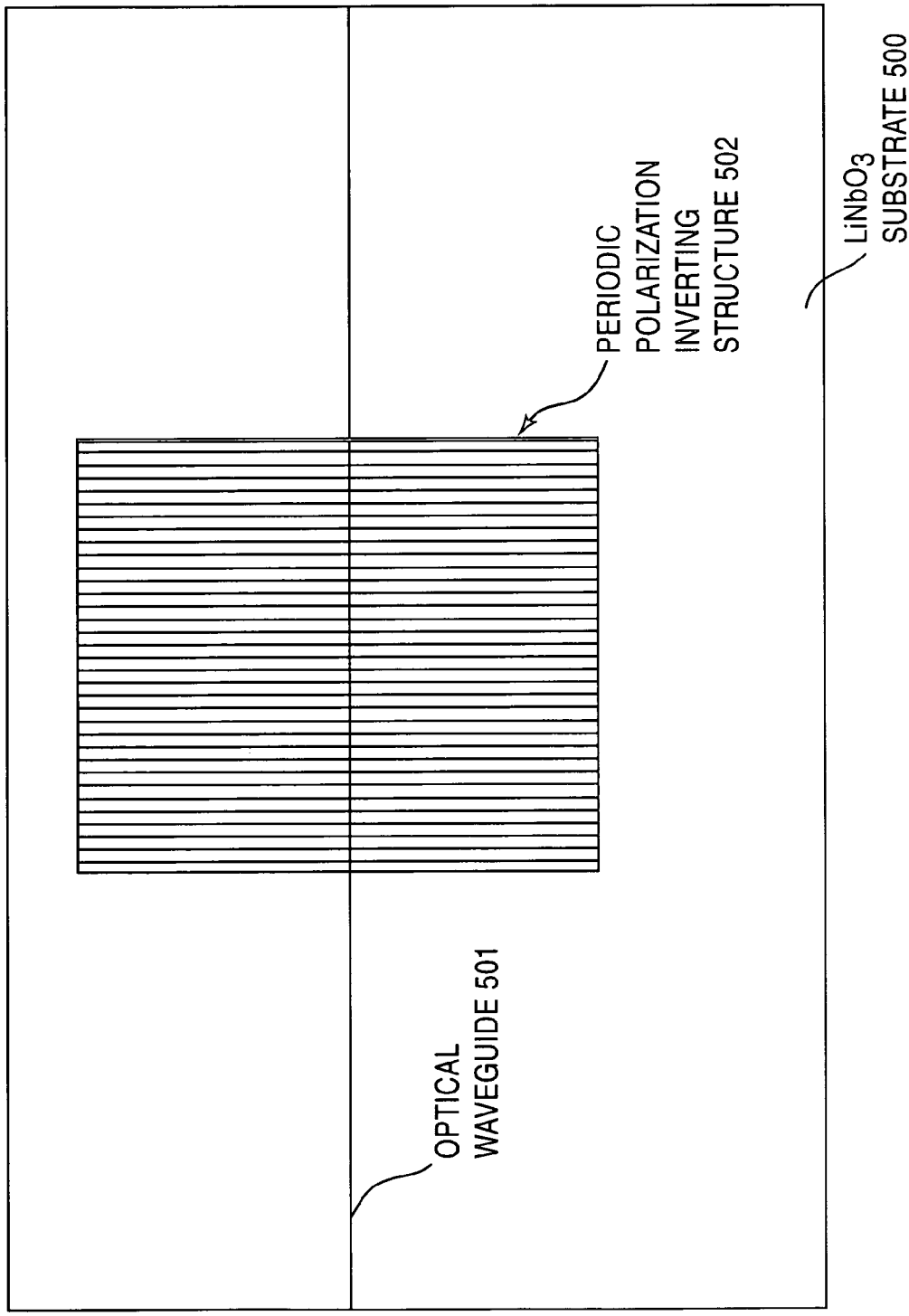
FIG. 43 shows a configuration of an optical nonlinear element having a pseudo phase matching section according to a prior art periodic polarization inverting structure 502.

In the prior art configuration shown in FIG. 42, since the input and output waveguides 201a and 201b are radially connected to the slab waveguide 202, no isochronism is met at a point on a specified line perpendicular to the optical axis.

To the contrary, light guided on line X in FIG. 8 at a specified time simultaneously crosses the line Y at another specified time, wherein isochronism is established. In several optical signal processes, the isochronism is an important feature in view of matching optical pulse positions, that is, rise and fall timing of a pulse.

In addition, in the detailed application example, since the curvature radius r can be made comparatively large, and the respective coupling waveguides of the output waveguide 13 and input waveguide 14 are linearly disposed in parallel to each other, it becomes easy to design and produce the optical signal processing circuit.

Figure 9:
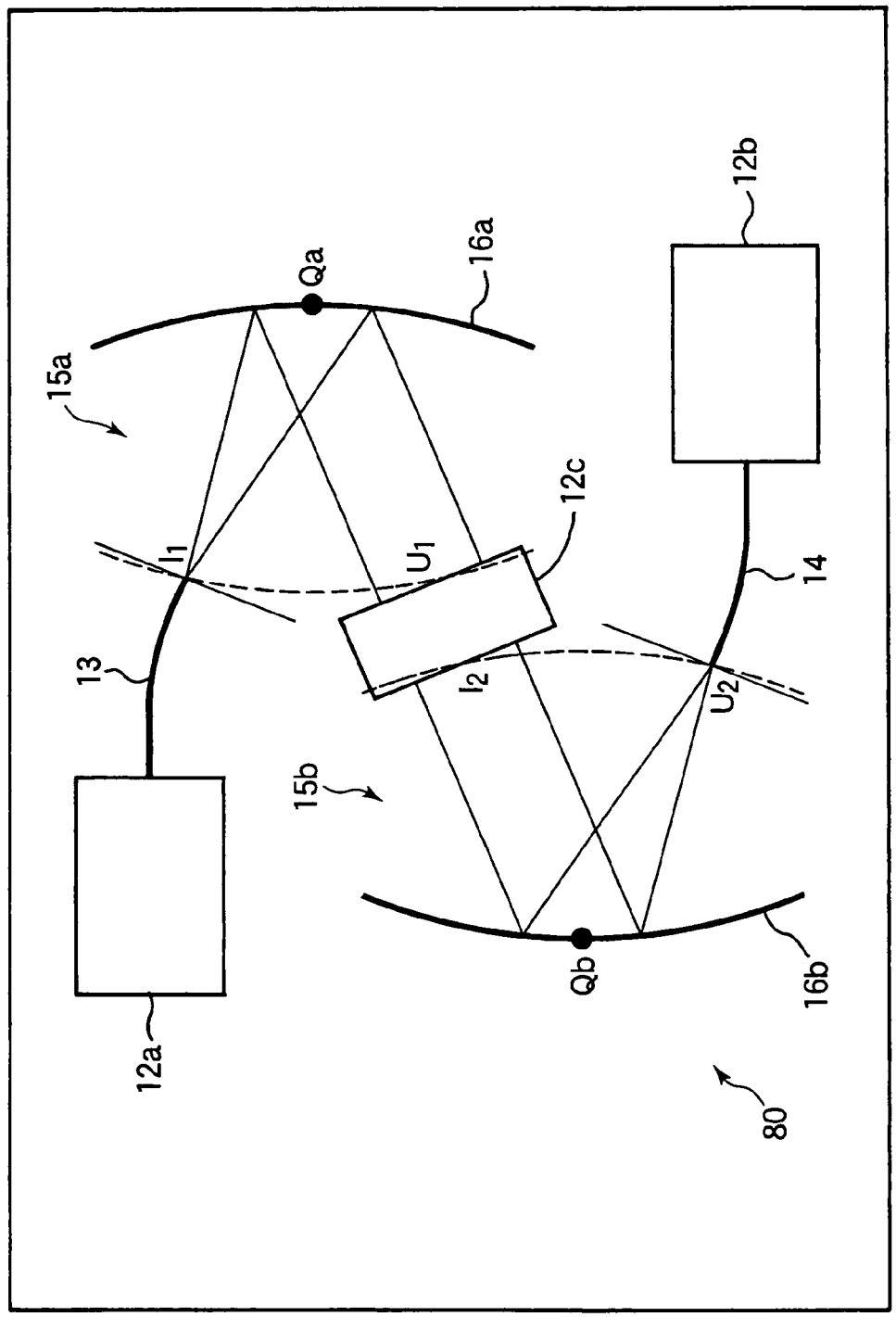
FIG. 9 shows a third embodiment of an optical signal processing circuit constructed by coupling of two optical waveguide circuits 12a and 12b utilizing the reflecting structure 16.

FIG. 9 shows the third embodiment of the optical signal processing circuit constructed by coupling of two optical waveguide circuits 12a and 12b utilizing the reflecting structure 16.

In the construction, as in the configuration of the optical signal processing circuit shown in FIG. 6, the input coupling end I1 (that is, the output coupling end of the output waveguide 13) of the first coupling circuit 15a and the input coupling end U1 (that is, the output coupling end of the first coupling circuit 15a) of the optical waveguide circuit 12c, and the output coupling end I2 (that is, the input coupling end of the second coupling circuit 15a) and the output coupling end U2 (that is, the input coupling end of the input waveguide 14) of the second coupling circuit 15a are, respectively, positioned in the relationship of spatial Fourier transformation.

Thereby, emission light from the output waveguide 13 becomes a parallel light whose light beam diameter is widened by the first reflecting structure 16a of the first coupling circuit 15a, and is made incident into the optical waveguide circuit 12c. At this time, since the light becomes a wide light beam in the slab waveguide 15 (that is, the waveguide including the first and second coupling circuits 15a and 15b, and the optical waveguide circuit 12c), no large loss is produced even if optical components whose size is several tens of microns or more, such as a wavelength plate, phase element, Faraday element, polarization plate, etc., are disposed at the position of the optical waveguide circuit 12c instead of the optical waveguide circuit 12c, wherein it becomes possible to dispose these components.

The emission light from the optical waveguide circuit 12c, that is, a wide light beam in the slab waveguide 15 (that is, the waveguide including the first and second coupling circuits 15a and 15b and the optical waveguide circuit 12c) is condensed by the second reflecting structure 16b of the second coupling circuit 15b and is input into the input waveguide 14.

Figure 10:
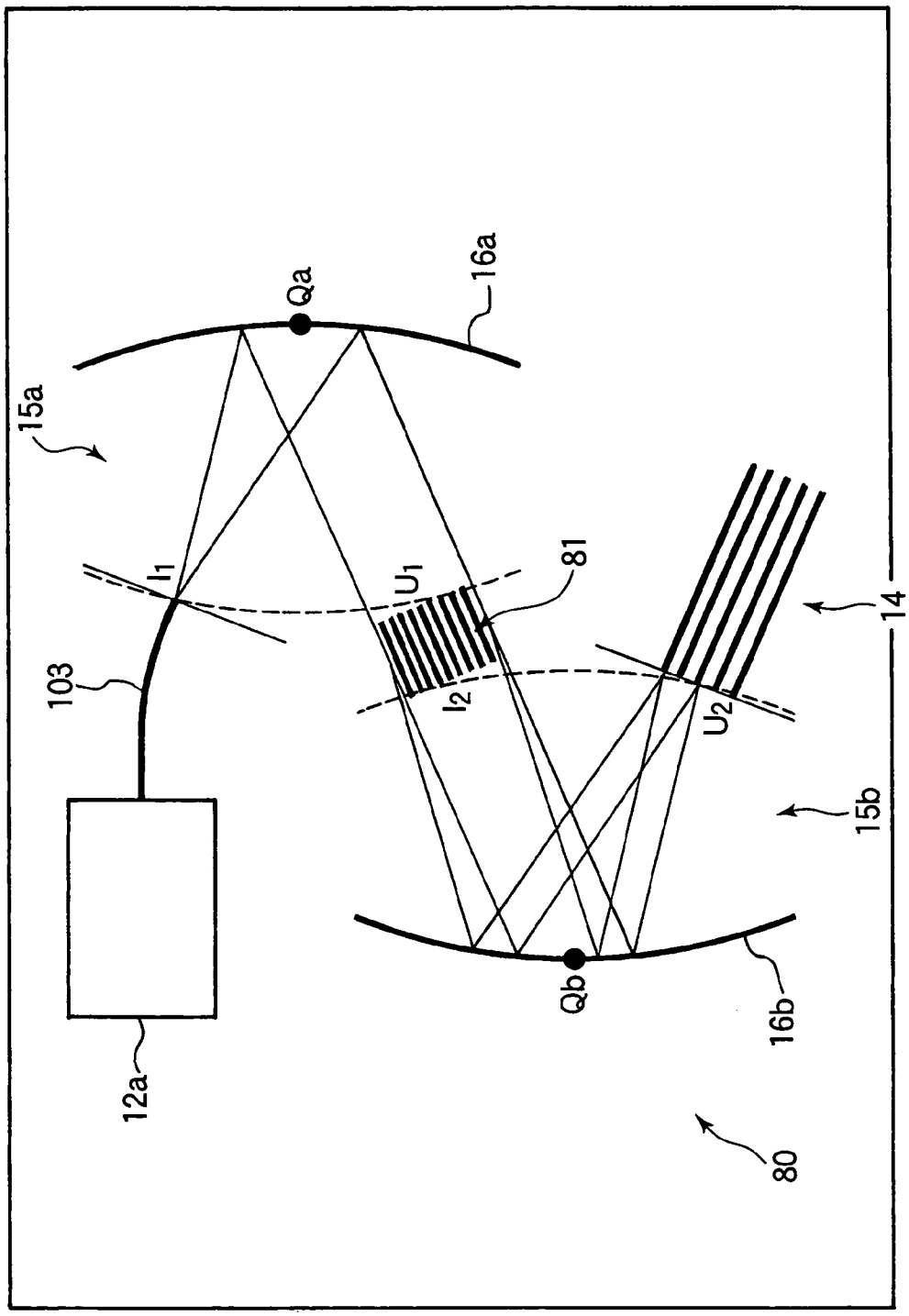
FIG. 10 shows a configuration of an optical wavelength multiplexer 80 which is one of the detailed application examples of the optical signal processing circuit according to the third embodiment described with respect to FIG. 9.
Figure 11:
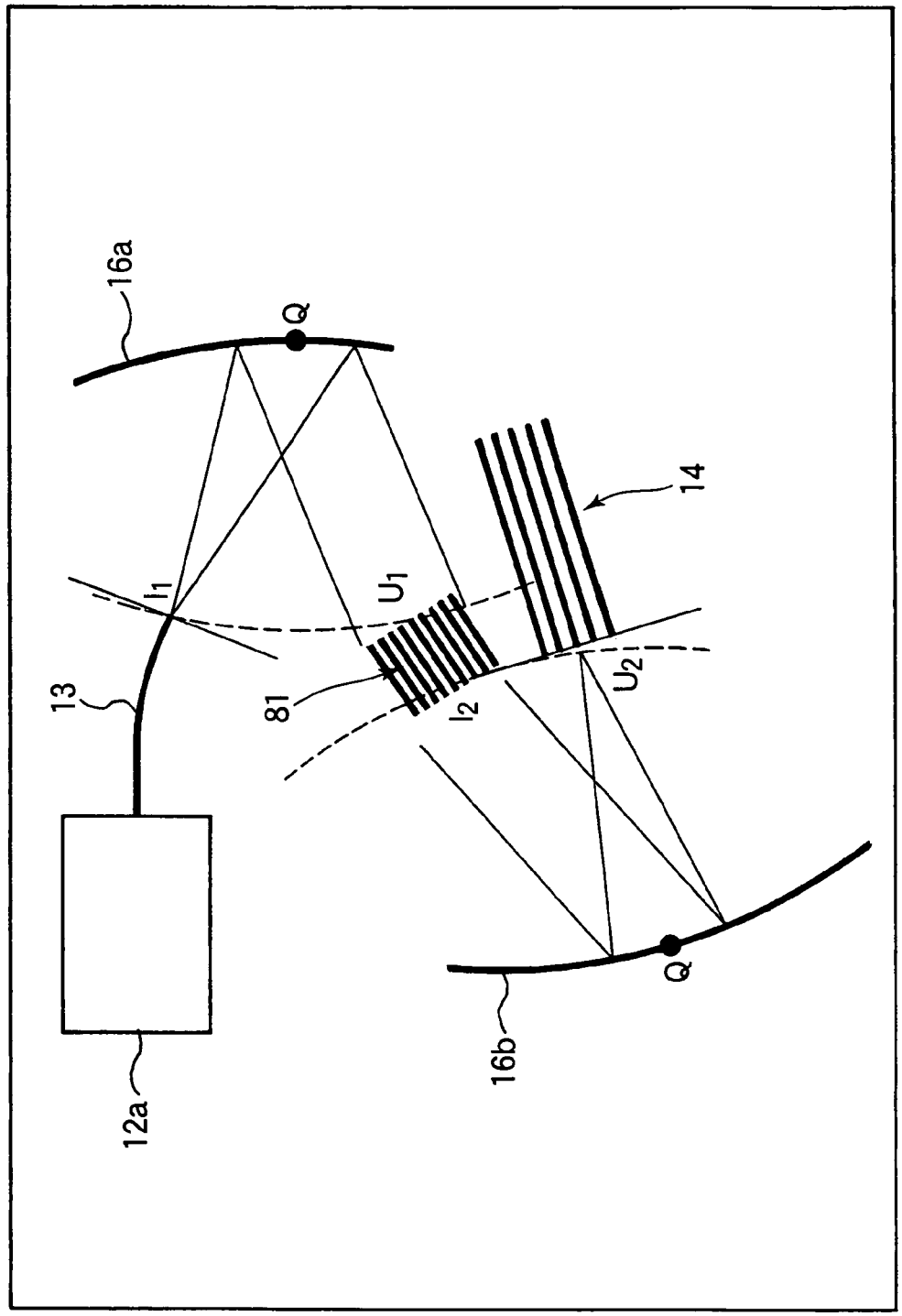
FIG. 11 shows a configuration of another optical wavelength multiplexer 80 which is one of the detailed application examples of the optical signal processing circuit according to the third embodiment described with respect to FIG. 9.

FIG. 10 and FIG. 11 show a configuration of the optical wavelength multiplexer 80, which is one of the detailed application examples of the optical signal processing circuit according to the third embodiment described with reference to FIG. 9.

Herein, in the optical wavelength multiplexer 80 in FIG. 10 and FIG. 11, a periodic grooved structure 81 is disposed as the optical waveguide circuit 12c. FIG. 10 shows a case where the periodic grooved structure 81 is parallel to the optical axis of the parallel light while FIG. 11 shows a case where the periodic grooved structure 81 is inclined with respect to the optical axis of the parallel light.

Figure 12:
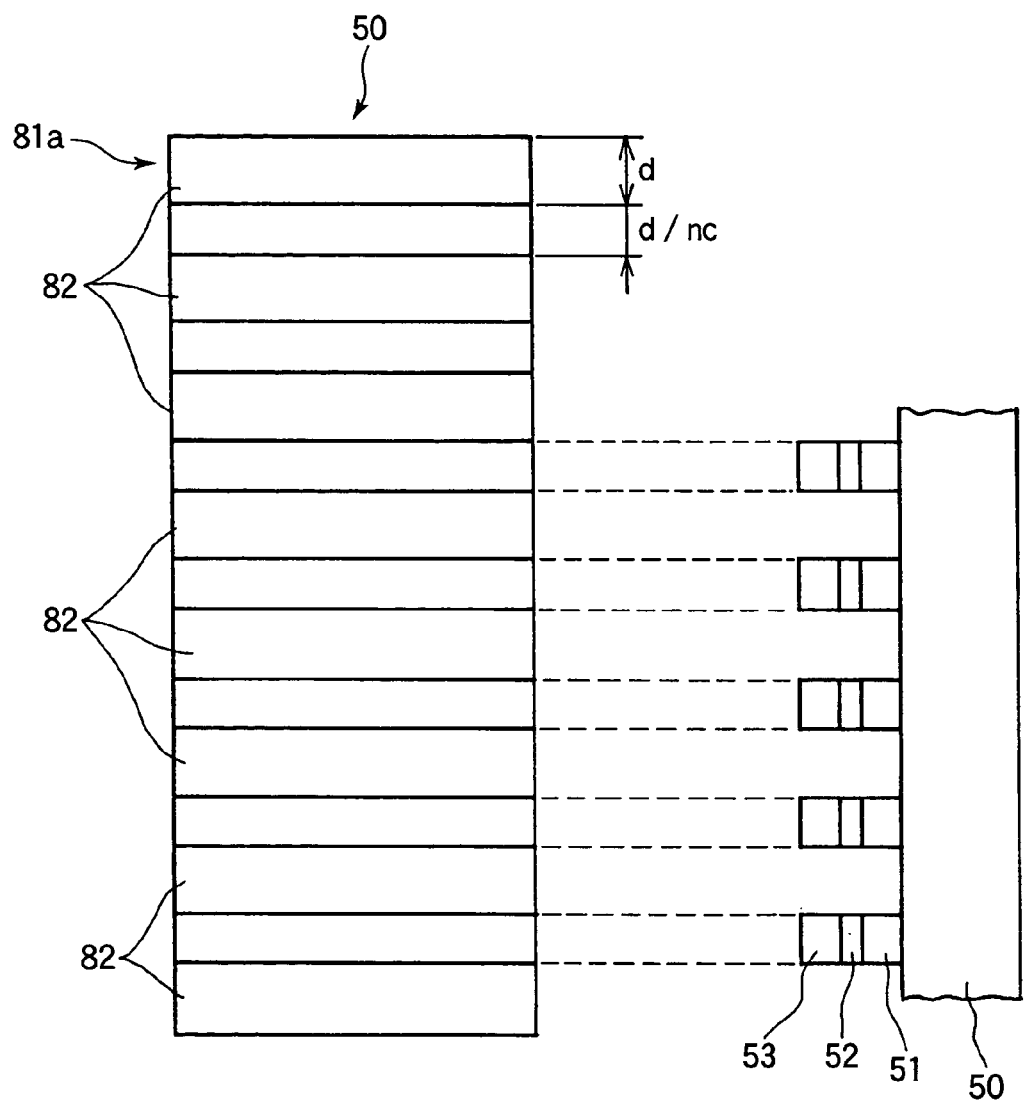
FIG. 12 shows a detailed configurational example of a periodic grooved structure 81.
Figure 13:
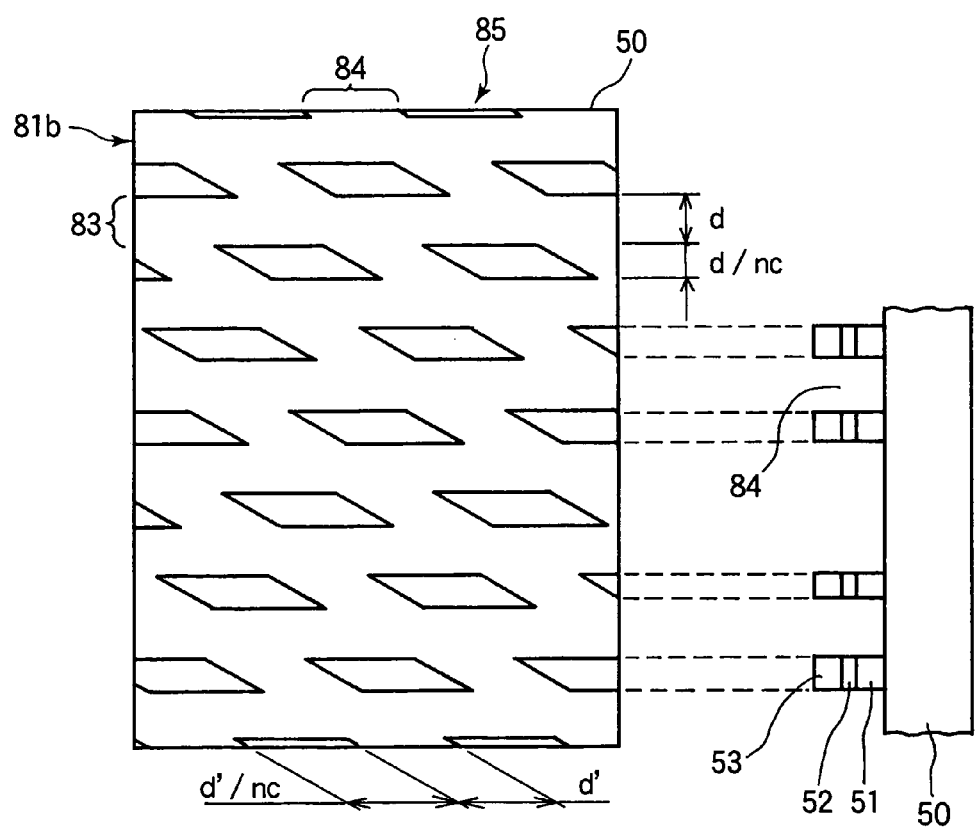
FIG. 13 shows another detailed configurational example of the periodic grooved structure 81.
Figure 14:
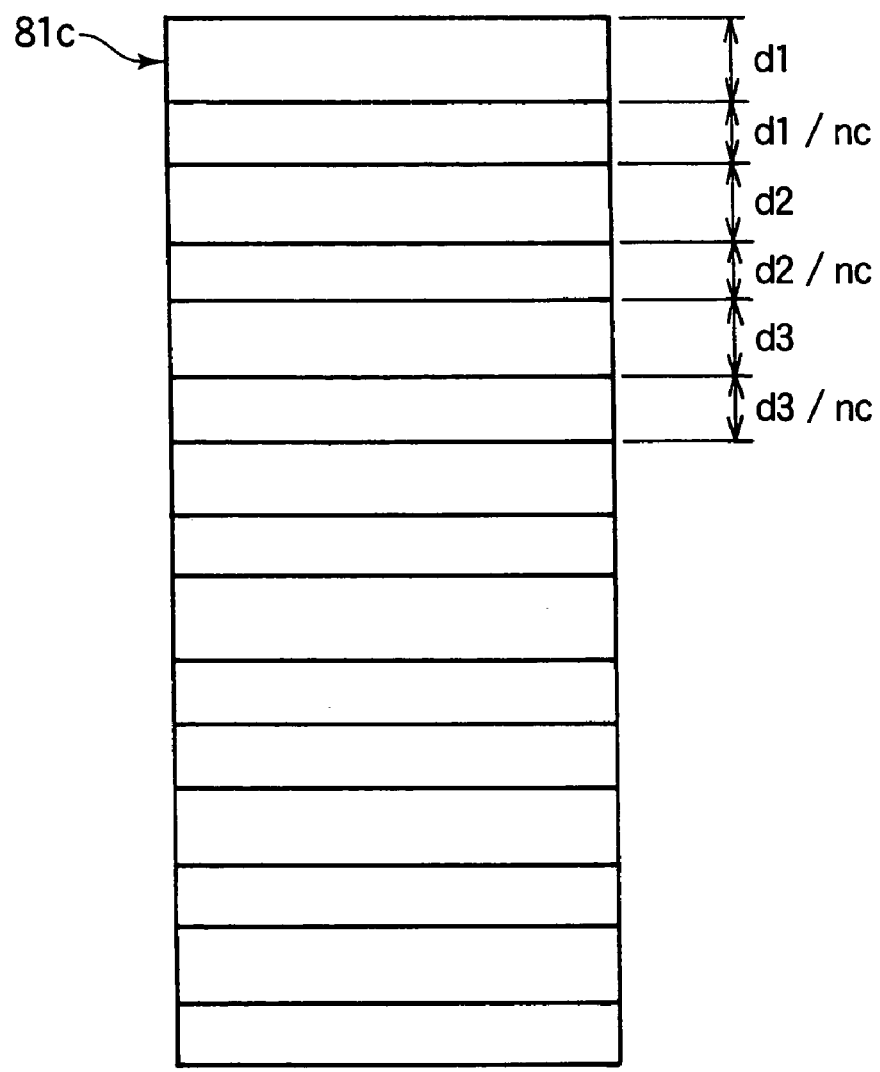
FIG. 14 shows still another detailed configurational example of the periodic grooved structure 81.

FIG. 12 through FIG. 14 show detailed configurational examples of the periodic grooved structure 81.

The periodic grooved structure 81a shown in FIG. 12 is configured so that grooves 82 are juxtaposed to each other with the groove width (concave portion width) of "d" and groove spacing (convex portion width) of "d/nc," where nc is an effective refractive index of the waveguide.

Figure 15:
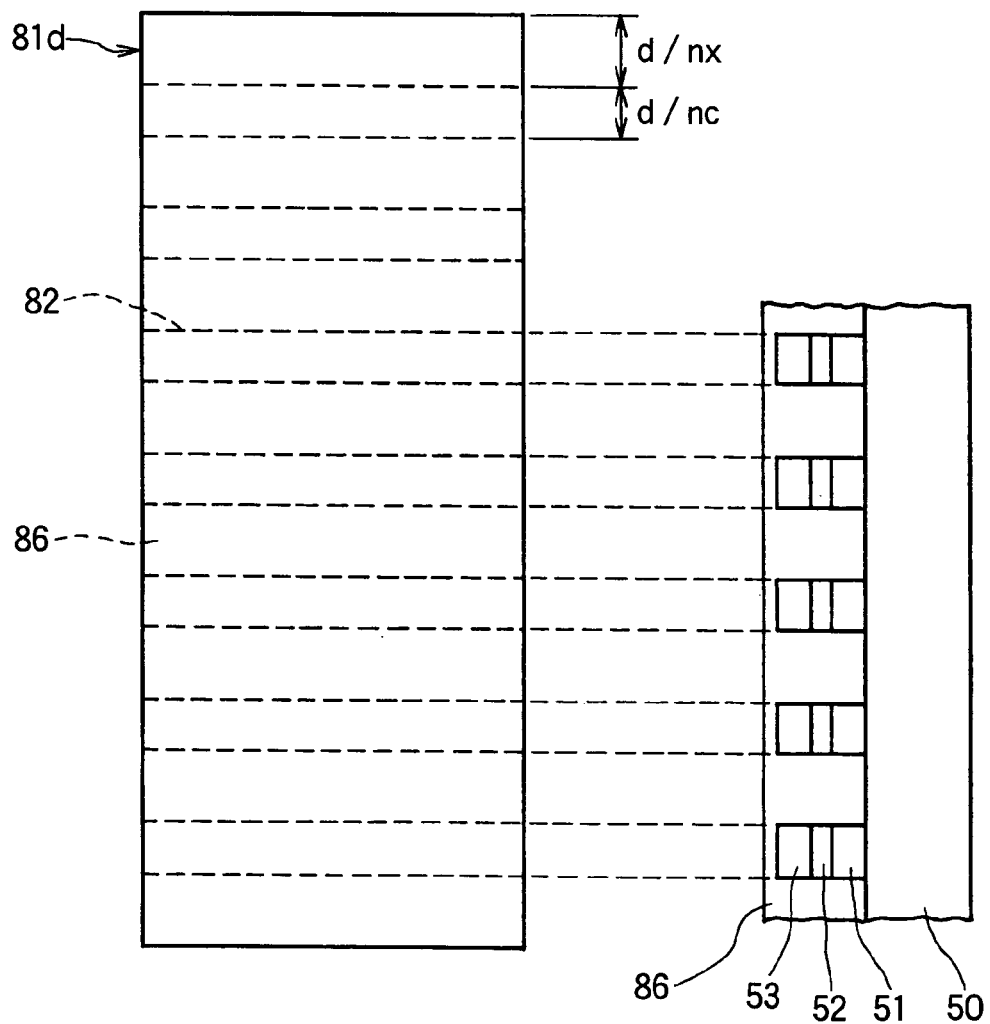
FIG. 15 shows a periodic grooved structure 81d having a filler material 86, which is made of a polymer material or dielectric material, filled up on the grooved portions 82.
Figure 16A:
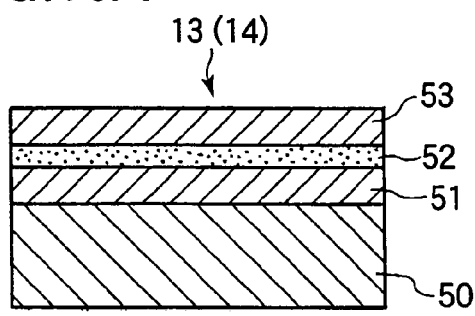
FIGS. 16A–H are sectional views of the optical waveguide substrate 50, which describes the steps of forming the periodic grooved structure 81d on the optical waveguide substrate 50.
Figure 16B:
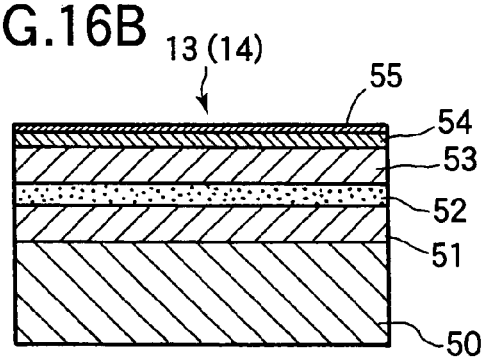
Figure 16C:
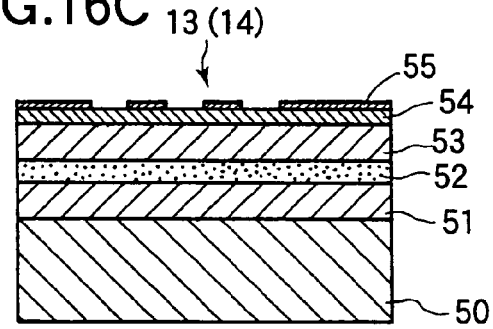
Figure 16D:
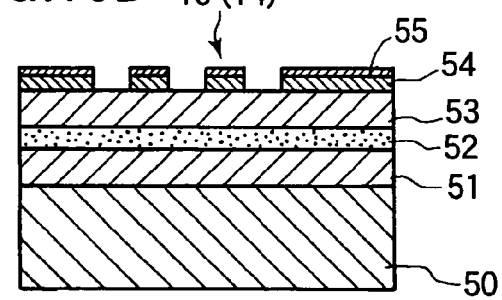
Figure 16E:
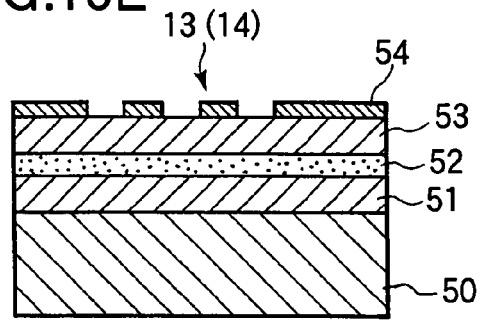
Figure 16F:
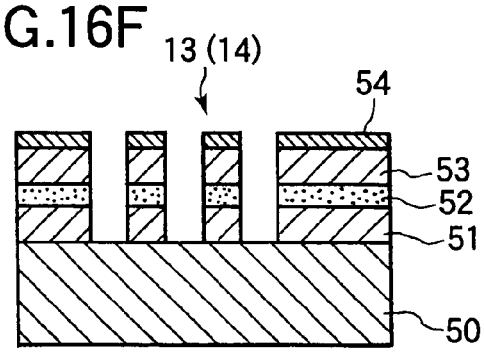
Figure 16G:
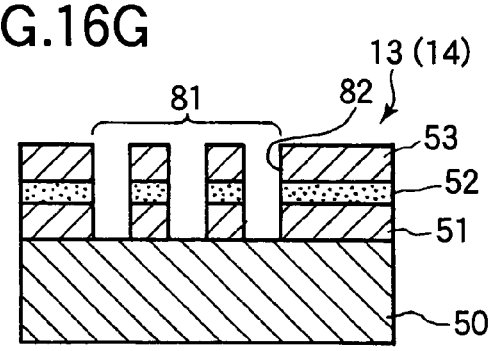
Figure 16H:
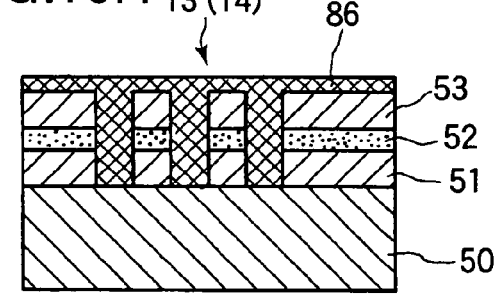

To the contrary, the periodic grooved structure 81d shown in FIG. 15 is configured so as to become like a grating 85 in which two types of grooves 83 and 84 parallel to each other are crossed in a plurality at a prescribed angle.

In the embodiment, the groove 83 is formed on the optical waveguide substrate 50 with the groove width (concave portion width) of "d" and the groove spacing (convex portion width) of "d/nc" while the groove 84 is formed on the optical waveguide substrate 50 with the groove width (concave portion width) of "d'" and the groove spacing (convex portion width) of "d'/nc," wherein both the grooves 83 and 84 are formed with the groove width (concave portion width) and groove spacing (convex portion width) different from each other.

Also, the periodic grooved structure 81c shown in FIG. 14 is configured so that the groove width "d" (concave portion width) of the groove 82 and grating 85 and the groove spacing "d/nc" (convex portion width) are not fixed, but the groove width "d" (concave portion width) and groove spacing "d/nc" (convex portion width) may vary.

Procedures for producing the periodic grooved structure 81 on these optical waveguide substrates 50 are similar to the procedures for producing grooves on the optical waveguide substrate 50 for the above-described reflecting structure 16.

In the grating of these periodic grooved structures 81, the diffraction characteristics show generally intensive wavelength-angle dependence, and diffract light of a specified wavelength to a specified angle.

In particular, since, in the periodic grooved structures 81, there exist two types of fundamental gratings, diffraction corresponding to the respective gratings appears so as to overlap each other. Therefore, complicated wavelength-angle dependence can be brought about.

In addition, dilatory wavelength-angle dependence can be brought about in the periodic grooved structure 81c.

In the optical wavelength multiplexer 80 described with reference to FIG. 10 and FIG. 11, the reflecting structure 16 depends on a wavelength that transforms a change in angle to a change in the light condensing position, and light is coupled in different waveguides of the input waveguide 14. That is, the optical signal processing circuit configured in FIG. 10 and FIG. 11 functions as an optical wavelength multiplexer circuit.

Further, in order to protect the periodic grooved structure 81 portion and to control the characteristics thereof, there may be a case where a polymer material or a dielectric material is filled up in the groove 82 portions (concave portions).

FIG. 15 shows a periodic grooved structure 81d in which a filler 86 consisting of a polymer material and a dielectric material is filled up in the grooved portions 82.

In the periodic grooved structure 81d, since a change in the refractive index is slight, very keen wavelength-angle dependence can be brought about. Procedures for producing such a periodic grooved structure 81 are almost identical to those for producing the reflecting structure 16. However, hereinafter, a description is given of the procedures.

FIG. 16 is a sectional view showing the optical waveguide substrate 50 in order to describe the steps for forming a periodic grooved structure 81d on the optical waveguide substrate 50.

A waveguide circuit 13 (or 14) is formed on the substrate 50, and the waveguide circuit 13 (or 14) is formed by laminating the lower clad layer 51, core layer 52, and upper clad layer 53 one after another (FIG. 16-(*a*)).

First, when forming the reflecting structure 16, a metal or dielectric thin film 54 is formed on the waveguide circuit 13 (or 14).

After that, resist 55 is applied on the optical waveguide substrate 50, and a metal or dielectric thin film 54 is cladded with the resist 55 for processing (FIG. 16-(*b*)).

A pattern is traced on the resist 55 with an electron beam tracing device, and the resist 55 is developed (FIG. 16-(*c*)).

The thin film 54 is etched by a reactive ion etching device, using the resist 55 as a mask, and an electron beam tracing pattern is copied (FIG. 16-(*d*)).

Thereafter, the remaining resist 55 is peeled off (FIG. 16-(*e*)).

In addition thereto, the optical waveguide substrate 50 is fixed on the micromotion stage 39 of the laser ablation device 30.

Observing a plurality of markers provided on the optical waveguide substrate 50 by a monitoring device, the tilt angle of the micromotion stage 39 is adjusted so that the optical waveguide substrate 50 becomes perpendicular to the optical axis of a pulse light beam.

Similarly, observing a plurality of markers provided on the optical waveguide substrate 50 by a monitoring device, the stage controller (controller) 41 is rendered to recognize the position of the above-described pattern.

After that, the pulse light beam is condensed by the light condensing lens 36, and the surface is swept by a spot of the pulse light beam by moving the micromotion stage 39 in order to carry out etching (FIG. 16-(*f*)). At this time, the etching depth is controlled by the number of times of pulse irradiation.

After the etching is completed, the optical waveguide substrate 50 is removed from the micromotion stage 39, and the thin film 54 is removed (FIG. 16-(*g*)).

After that, a filler 86 consisting of a polymer material and a dielectric material is filled up in the grooved portions 82 that constitute the periodic grooved structure 81. This is carried out by deposition or spin coating (FIG. 16-(*h*)).

Figure 17:
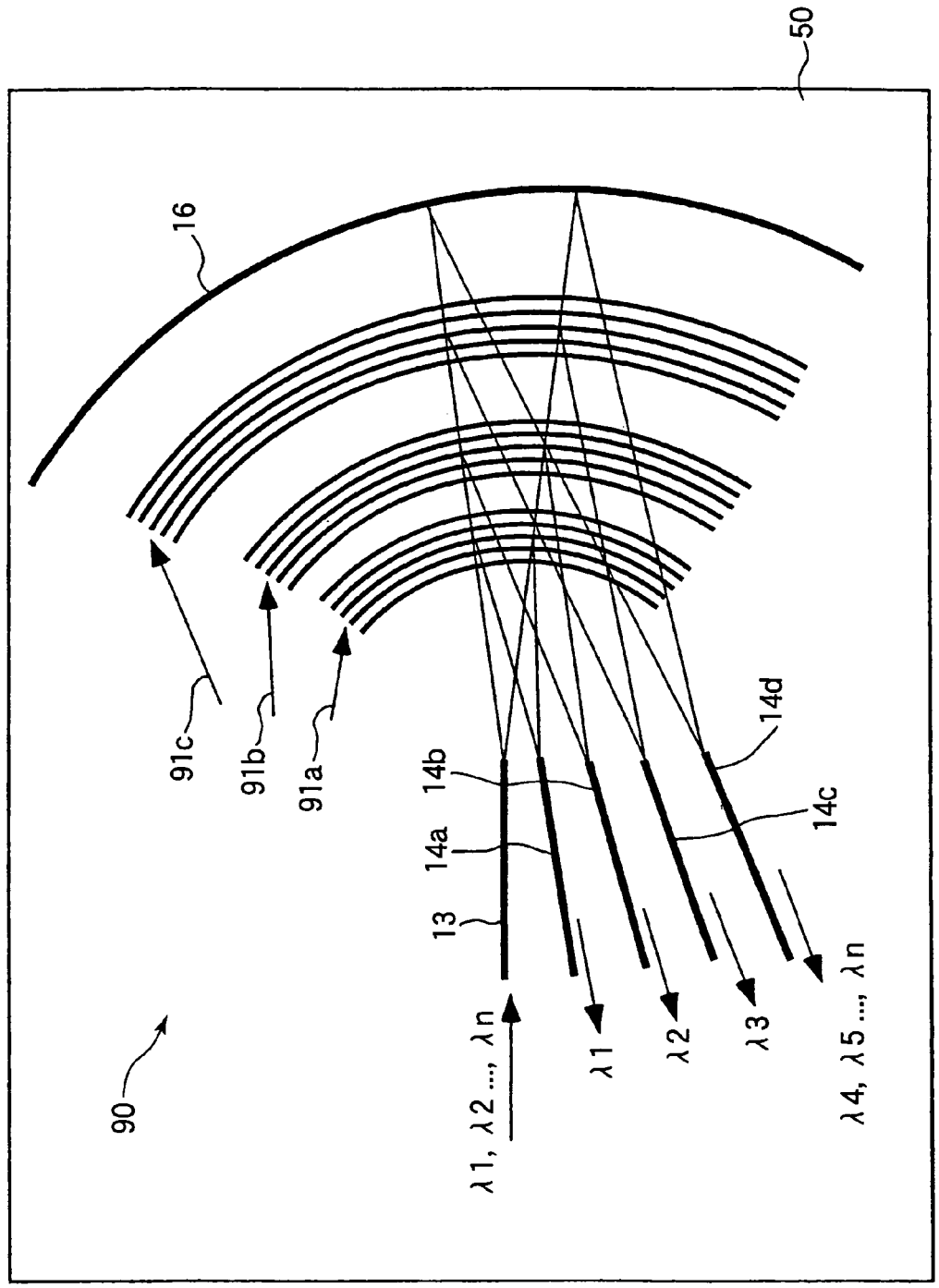
FIG. 17 shows a fourth embodiment of an optical signal processing circuit constructed by coupling of two optical waveguide circuits 12a and 12b utilizing the reflecting structure 16.

FIG. 17 shows the fourth embodiment of the optical signal processing circuit constructed by coupling of two optical waveguide circuits 12*a* and 12*b* utilizing the reflecting structure 16.

The optical signal processing circuit according to the embodiment substitutes the reflecting structures 16-1 and 16-2 shown in FIG. 4 into an arcuate or quadratic curve-like periodic grooved structure 91, and constitutes an optical wave multiplexer 90.

Herein, with respect to a change in the periodic refractive index, it is known that light having a wavelength in the vicinity of Bragg wavelength corresponding to the period thereof is selectively reflected. That is, it is possible to regard the arcuate or quadratic curve-like periodic grooved structure as a wavelength selecting reflecting structure, and it is possible to constitute an optical wavelength multiplexer 90 by utilizing the positional relationship shown in FIG. 4.

In FIG. 17, on the optical waveguide substrate 50, the arcuate periodic grooved structures 91*a*, 91*b* and 91*c* are concentrically formed with spacing therebetween, and the reflecting structure 16 is also concentrically disposed at the outer circumferential portion thereof.

A wavelength λ1 component of emission light from the output waveguide 13 is reflected by the arcuate periodic grooved structure 91*a* and is coupled to the input waveguide 14*a*. Similarly, a wavelength λ2 component is reflected by the arcuate periodic grooved structure 91*b* and is coupled to the input waveguide 14*b*. A wavelength λ3 component is reflected by the arcuate periodic grooved structure 91*c* and is coupled to the input waveguide 14*c*.

The remaining wavelength components are reflected by the reflecting structure 16 and are coupled to the input waveguide 14*d*.

Figure 18:
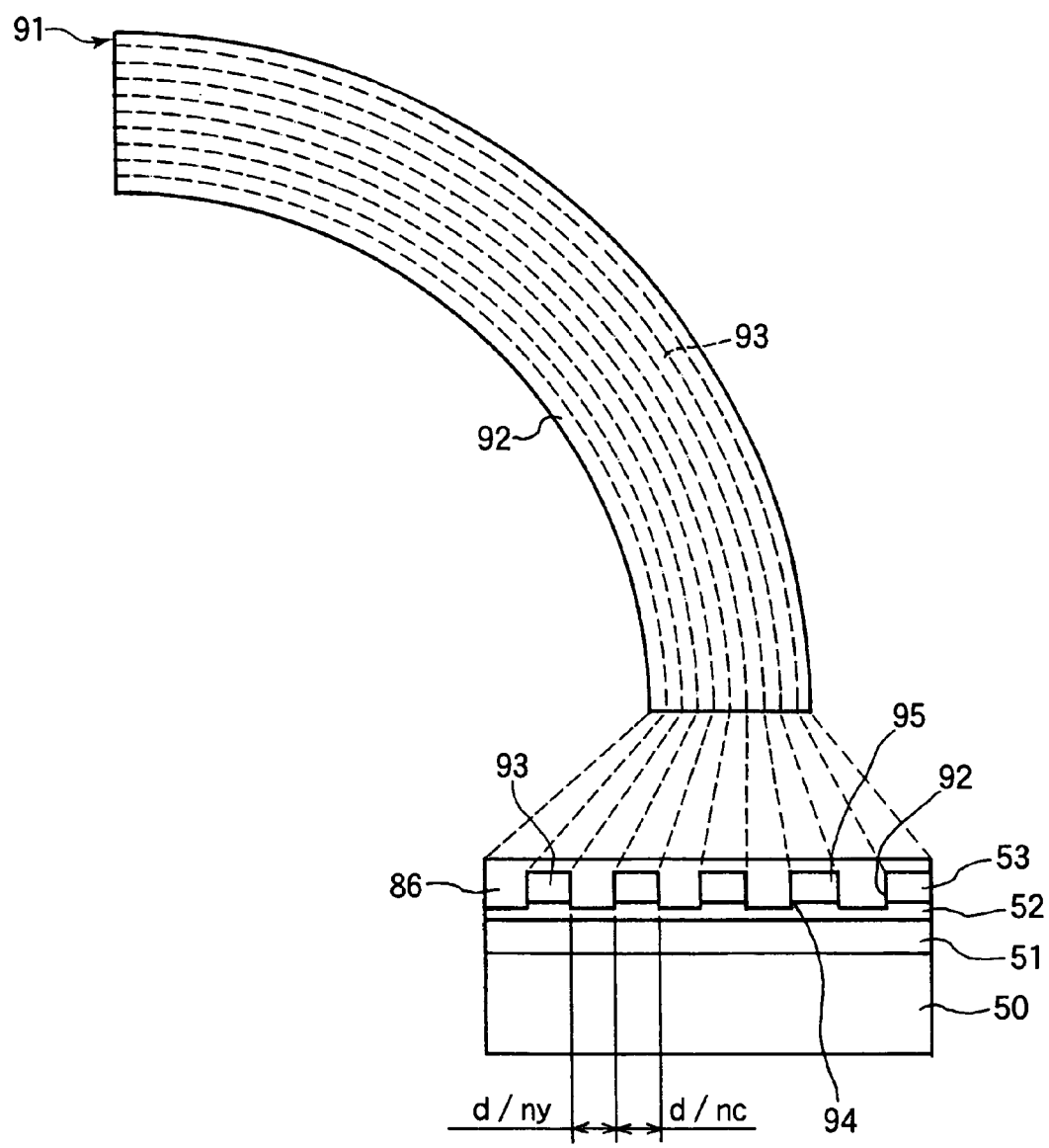
FIG. 18 shows the details of an arcuate periodic grooved structure 91 formed on the optical waveguide substrate 50.

FIG. 18 shows the details of the arcuate periodic grooved structure 91 formed on the optical waveguide substrate 50.

FIG. 18 presents a configuration in compliance with the periodic grooved structure 81*d* shown in FIG. 15. However, it is a matter of course that FIG. 18 may be constructed like the periodic grooved structure 81*a* shown in FIG. 12.

In the embodiment, in order to narrow the bandwidth, a grooved structure in which etching is carried out halfway to the core layer 52 formed on the optical waveguide substrate 50 may be utilized. Different from the reflecting structure 16, the reflection point of the arcuate periodic grooved structure 91 changes depending on the wavelength and a difference in the refractive index between the end face 94 of the grooved portion (concave portion) 92 of the arcuate periodic grooved structure 91 and the between-groove portions (convex portion) 95. Therefore, it is necessary to determine the period depending on the center wavelength to be coupled or split. Generally, the period p is established to one-half the length of the light wavelength in a waveguide with respect to the wavelength to be reflected.

$$p = \frac{\lambda}{2} \tag{4}$$

$$p = d + \frac{d}{n_c}$$

(in the case of the cyclic grooved structure 81*a*) (5)

$$p = \frac{d}{n_y} + \frac{d}{n_c}$$

(in the case of the cyclic grooved structure 81*d*) (5)'

In expression (5)', $n_y$ is an effective refractive index of the portion etched halfway to the core layer. The reflection point is calculated by obtaining multiple reflection from the boundary of the entire periodic grooved structure including the phase. Also, although the structure of the periodic grooved structure 81*c* may be applicable, the period is not fixed in this case, and cannot be simply brought into a formula.

Further, since the periodic grooved structure 81*a* and periodic grooved structure 81*c* overlap each other to constitute the periodic grooved structure 81*b*, it is possible to utilize the structure of the periodic grooved structure 81*b*. In this case, FIG. 18 shows a state where the arcuate periodic grooved structure 91 partially overlaps.

In addition, in the embodiment, since the arcuate periodic grooved structure 91 utilizes a grooved structure etched halfway to the core layer 52 formed on the optical waveguide substrate 50 in order to narrow the bandwidth, etching is carried out halfway to the upper clad layer 53 in order to further narrow the bandwidth, and a filler 86 consisting of a polymer material and a dielectric material maybe filled up in the grooved portions (concave portions) 92. To the contrary, in order to make the bandwidth wider, etching is carried out halfway to the lower clad layer 51 and a filler 86 consisting of a polymer material and a dielectric material is filled up on the grooved portions (concave portions) 92.

Further, in the embodiment, a description was given of the periodic grooved structure 91, exemplifying the arcuate structure as illustrated. However, the periodic grooved structure 91 may be like a quadratic curve such as a parabolic curve, elliptical curve, and hyperbolic curve.

Figure 19:
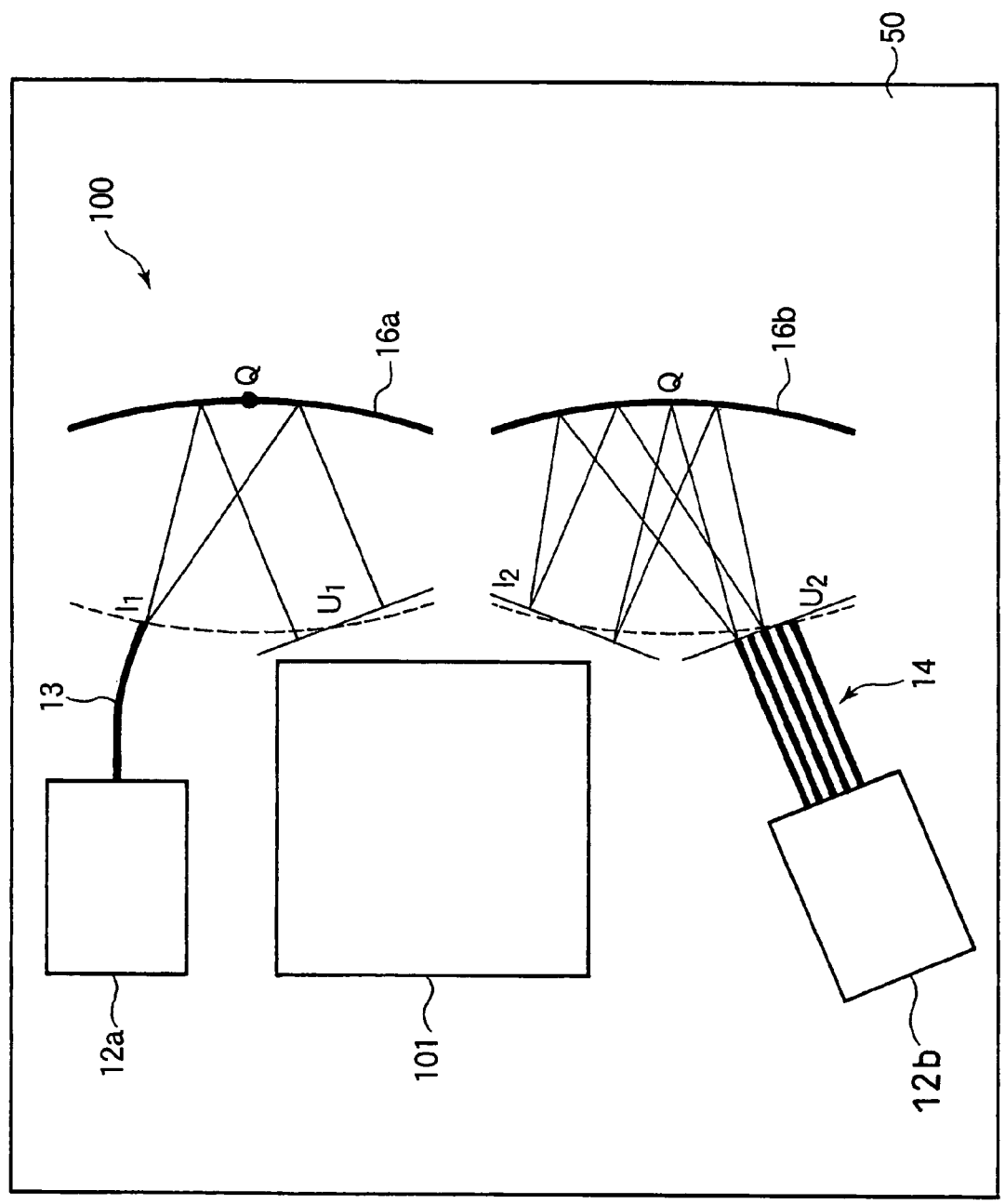
FIG. 19 shows a fifth embodiment of an optical signal processing circuit constructed by coupling of two optical waveguide circuits 12a and 12b utilizing the reflecting structure 16.

FIG. 19 shows the fifth embodiment of the optical signal processing circuit constructed by coupling of two optical waveguide circuits 12a and 12b utilizing the reflecting structure 16.

Topologically, the configuration of the embodiment is equivalent to the embodiment shown in FIG. 9. However, since the configuration is particularly useful, it is shown as a separate embodiment.

The present configuration is an arrayed waveguide diffraction grating 100 that utilizes the reflecting structure 16 and is provided with an arrayed waveguide 101.

Figure 20:
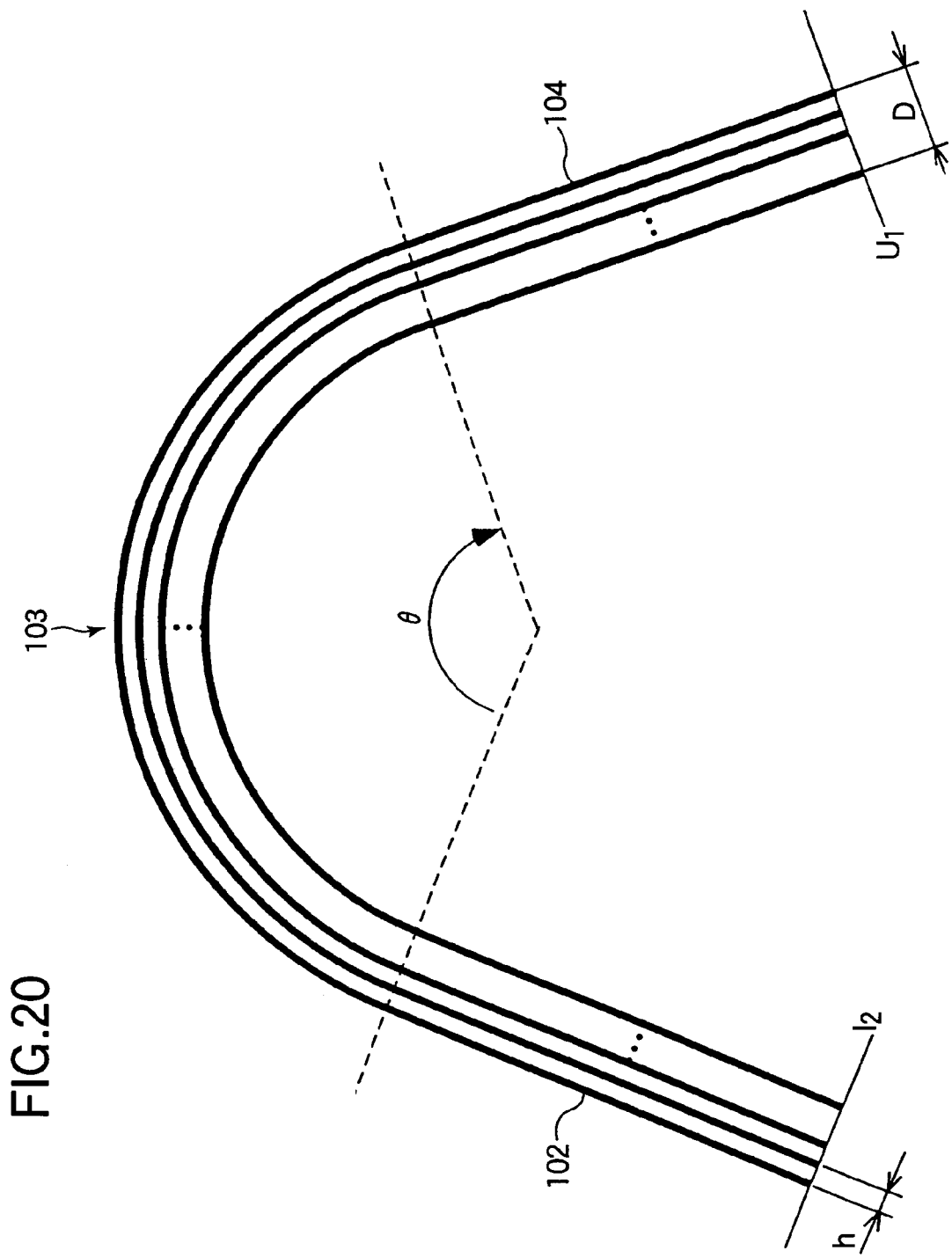
FIG. 20 shows a detailed configuration of an arrayed waveguide 101.

FIG. 20 shows a detailed configuration of the arrayed waveguide 101.

The arrayed waveguide 101 is composed of parallel waveguide portions 102 and 104 and an arcuate or quadratic curve-like waveguide portion 103. Where it is assumed that the distance between the centers of respective waveguides of the arrayed waveguide 101 is "h," and the widening angle of an arc of the arcuate waveguide portion 103 is θ, a difference L in the optical path length between the respective waveguides is expressed by the following expression:

$$L = n_c h \theta \quad (6)$$

Since there is a difference L in the optical path according to the expression (4) although light emitted from the output waveguide 13 is distributed to respective waveguides of the arrayed waveguide 101 and is made incident at an equal phase, the emission portion of the arrayed waveguide 101 is inclined, depending on the wavelength, and the equal phase plane is inclined on the plane I2. In the second reflecting structure 16b, a change in the incident angle is converted to a change in the light condensing position on the output coupling end U2 of the input waveguide 14. That is, the circuit of this configuration functions as an optical multiplexer.

Figure 21:
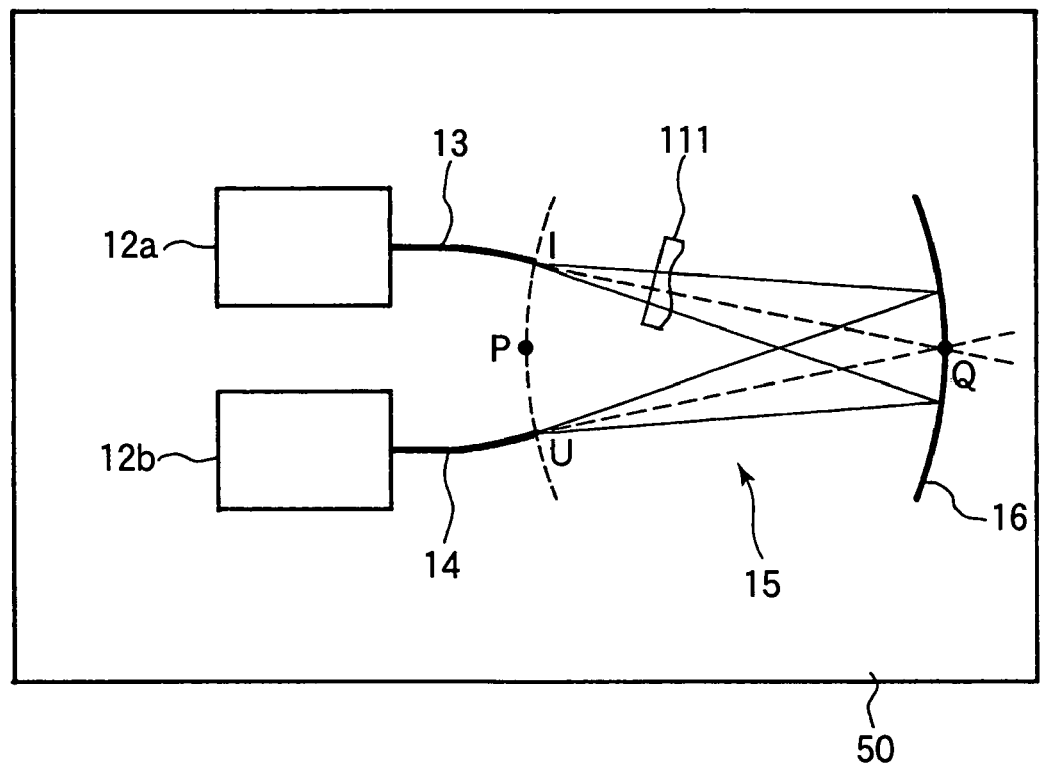
FIG. 21 shows a sixth embodiment of an optical signal processing circuit constructed by coupling of two optical waveguide circuits 12a and 12b utilizing the reflecting structure 16.

FIG. 21 shows the sixth embodiment of the optical signal processing circuit constructed by coupling of two optical waveguide circuits 12a and 12b, utilizing the procedures of forming the periodic grooved structure 81d on the optical waveguide substrate 50, which is described with reference to FIG. 16.

The optical signal processing circuit according to the embodiment is featured in that a wave front compensating portion 111 to reduce aberration which a general optical system has is formed at the slab waveguide 15 portion of a quadratic curve optical system in which the reflecting structure 16 shown in FIG. 1 and FIG. 5 is expressed by a quadratic curve including an arcuate shape such as an arc or ellipse. The wave front compensating portion 111 is integrally formed on the optical waveguide substrate 50 having an optical signal processing circuit formed therein.

Figure 22:
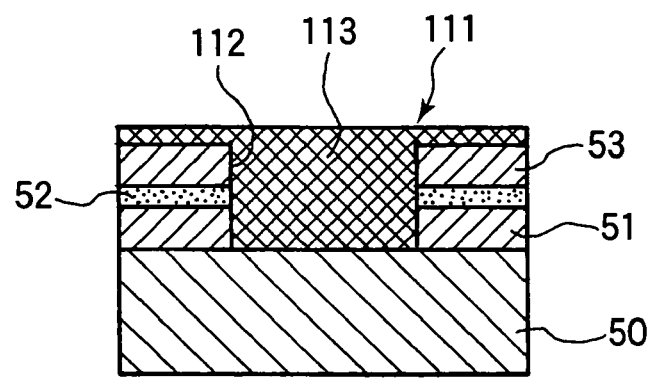
FIG. 22 is a sectional view of a wave front compensation portion 111.

FIG. 22 is a sectional view showing the wave front compensating portion 111 that is formed at the slab waveguide 15 portion on the optical waveguide substrate 50 so as to cross the optical axis of the input coupling end I of the coupling circuit 15.

As in the method for producing a periodic grooved structure 81 which is described with reference to FIG. 16, the wave front compensating portion 111 is produced by removing a partial plane of the upper clad layer 53, core layer 52 and lower clad layer 51 at the slab waveguide 15 portion to a prescribed pattern, forming a wave front compensating portion forming groove 112, and filling the wave front compensating portion forming groove 112 with a material 113 having a refractive index different from that of the effective refractive index of the waveguide consisting of the above-described upper clad layer 53, core layer 52 and lower clad layer 51. The wave front compensating portion forming groove 112 is devised so that the groove width thereof changes depending on the positions in the lengthwise direction.

Also, the place where the wave front compensating portion 111 is provided is not limited to the above-described position but may be formed at the slab waveguide 15 portion on the optical waveguide substrate 50 so as to cross the optical axis of the output coupling end U of the coupling circuit 15.

Figure 23:
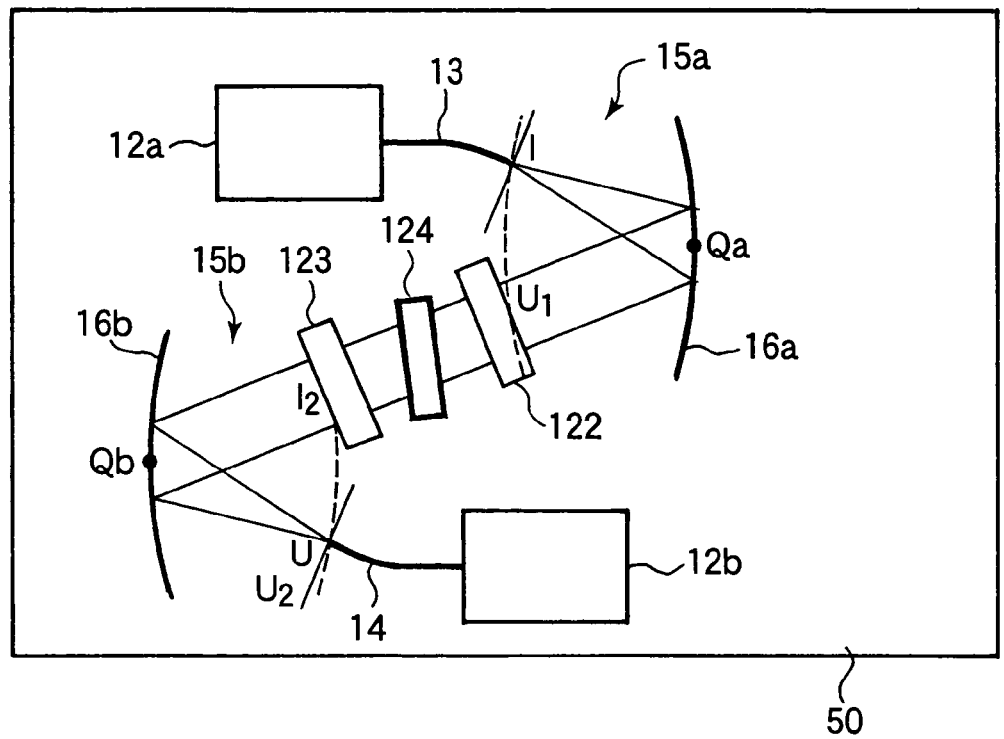
FIG. 23 shows a seventh embodiment of an optical signal processing circuit constructed by coupling of two optical waveguide circuits 12a and 12b utilizing the reflecting structure 16.

FIG. 23 shows the seventh embodiment of the optical signal processing circuit constructed by coupling of two optical waveguide circuits 12a and 12b utilizing the reflecting structure 16.

Figure 24:
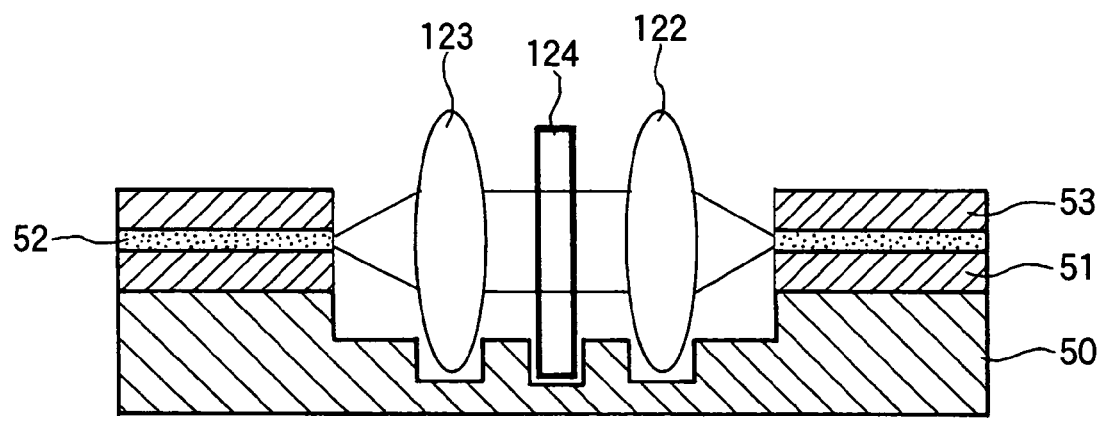
FIG. 24 is a sectional view of the optical signal processing circuit shown in FIG. 23.

FIG. 24 is a sectional view showing the optical signal processing circuit shown in FIG. 23.

In the configuration, as in the configuration of the optical signal processing circuit shown in FIG. 6 and FIG. 9, the input coupling end I1 (that is, the output coupling end of the output waveguide 13) of the first coupling circuit 15a and the input coupling end U1 (that is, the output coupling end of the first coupling circuit 15a), and the output coupling end I2 (that is, the input coupling end of the second coupling circuit 15a) and the output coupling end U2 (that is, the input coupling end of the input waveguide 14) of the second coupling circuit 15a are, respectively, positioned in the relationship of spatial Fourier transformation.

Thereby, emission light from the output waveguide 13 is made incident into the optical waveguide circuit 12c by the first reflecting structure 16a. In this case, the emission light becomes a wide light beam in the slab waveguide 15 (that is, the first and second coupling circuits 15a and 15b, and waveguide including the optical waveguide circuit 12c) and widens the light beam diameter in the optical waveguide circuit 12c in which a partial plane of the upper clad layer 53, core layer 52, lower clad layer 51 and the optical waveguide substrate 50 is removed to a prescribed pattern at the slab waveguide 15 portion. Simultaneously, the emission light widens a light beam in the direction perpendicular to the surface of the waveguide of the optical waveguide circuit 12c between a pair of cylindrical lenses 122 and 123 in the optical waveguide circuit 12c by the cylindrical lenses 122 and 123 spaced from each other and fixed in the grooved structure 121 of the optical waveguide circuit 12c, wherein it becomes possible to incorporate a comparatively large optical component 124 therein.

At this time, at the optical component 124, a component may be diagonally inclined and attached with respect to the direction of the light beam in order to suppress reflection at the end face thereof.

Figure 25:
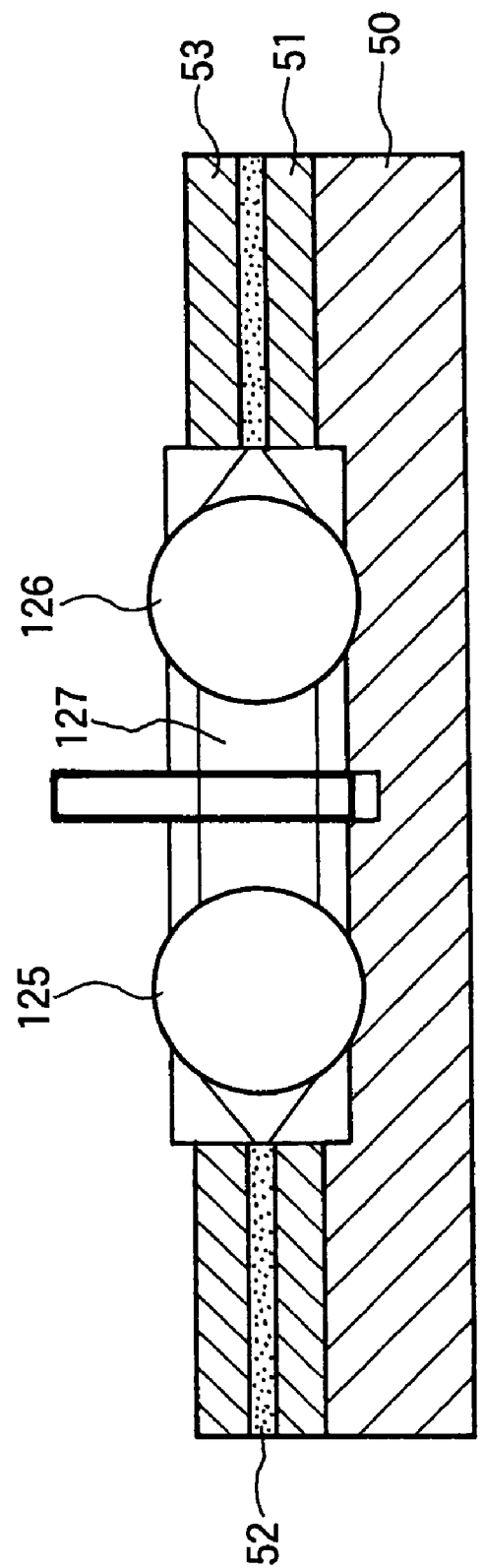
FIG. 25 shows a modified version of the configuration shown in FIG. 23 and FIG. 24.

FIG. 25 shows a modified version of the configuration shown in FIG. 23 and FIG. 24.

In the configuration, cylindrical distribution refractive index lenses 125 and 126 are spaced from each other and attached in the light beam direction in the grooved structure 121 instead of the cylindrical lenses 122 and 123.

In this case, a transparent adhesive agent 127 whose refractive index is close to the refractive index of the distribution refractive index lenses 125, 126 and slab waveguide 15 are utilized when fixing the distribution refractive index lenses 125 and 126 in the grooved structure 121. If the transparent adhesive agent 127 is further filled in the clearance in the grooved structure 121 after the distribution refractive index lenses 125 and 126 are fixed, no reflection preventing film, etc., is required on the surface of the distribution refractive index lenses 125 and 126, wherein solid fixing thereof can be secured.

Figure 26:
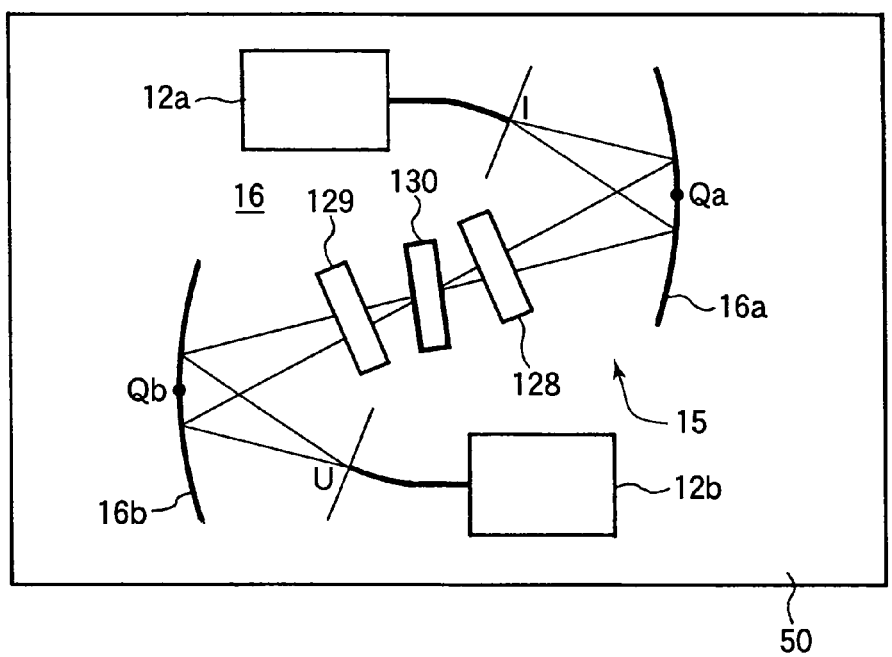
FIG. 26 shows an eighth embodiment of an optical signal processing circuit constructed by coupling of two optical waveguide circuits 12a and 12b utilizing the reflecting structure 16.

FIG. 26 shows the eighth embodiment of the optical signal processing circuit constructed by coupling of two optical waveguide circuits 12a and 12b utilizing the reflecting structure 16.

Figure 27:
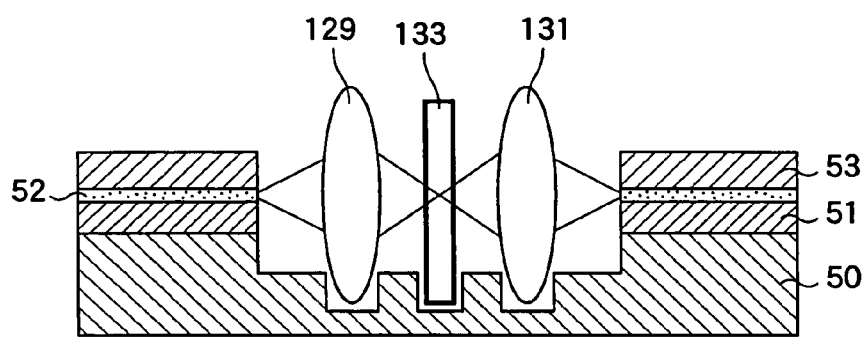
FIG. 27 is a sectional view of the optical signal processing signal shown in FIG. 26.

FIG. 27 is a sectional view showing the optical signal processing circuit shown in FIG. 26.

In the configuration, with respect to emission light from the output waveguide 13, a light beam is condensed by the reflecting structure 16a, and at the same time, the light beam is condensed in the direction perpendicular to the surface of the waveguide of the optical waveguide circuit 12c by a pair of cylindrical lenses 128 and 129 spaced from each other and fixed in the grooved structure 121 of the optical waveguide circuit 12c in which a partial plane of the upper clad layer 53, core layer 52, lower clad layer 51 and optical waveguide substrate 50 is removed to a prescribed pattern at the slab waveguide 15 portion, wherein it becomes possible to incorporate an optical component 130 such as a semiconductor laser, etc., between the cylindrical lenses 128 and 129.

At this time, at the optical component 130, a component may be diagonally inclined and attached with respect to the direction of the light beam in order to suppress reflection at the end face thereof.

Figure 28:
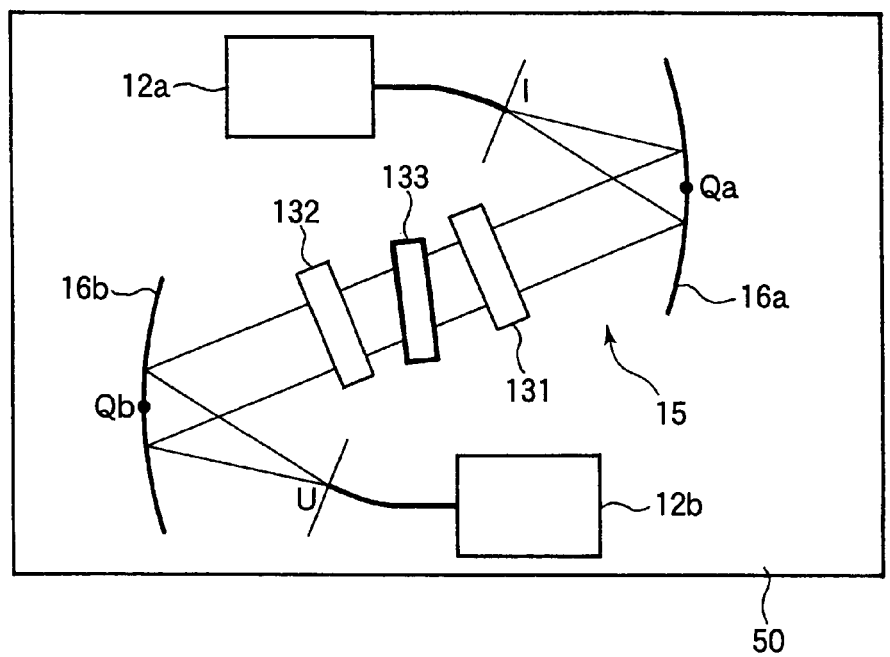
FIG. 28 shows a ninth embodiment of an optical signal processing circuit constructed by coupling of two optical waveguide circuits 12a and 12b utilizing the reflecting structure 16.

FIG. 28 shows the ninth embodiment of the optical signal processing circuit constructed by coupling of two optical waveguide circuits 12a and 12b utilizing the reflecting structure 16.

Figure 29:
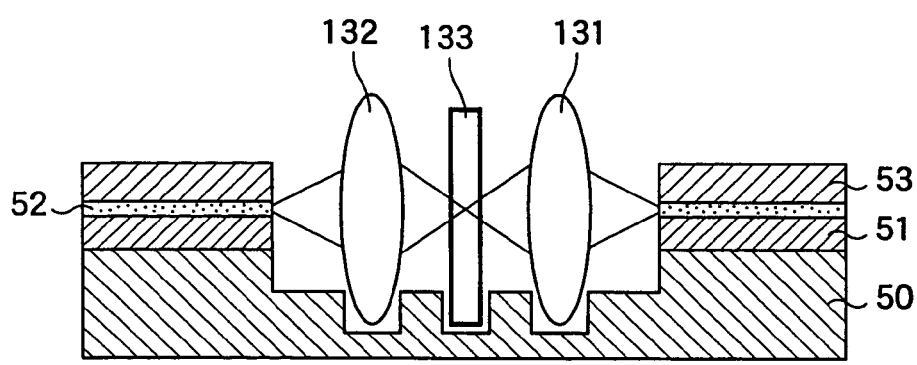
FIG. 29 is a sectional view of the optical signal processing signal shown in FIG. 28.

FIG. 29 is a sectional view showing the optical signal processing circuit shown in FIG. 28.

In the configuration, the emission light from the output waveguide 13 is made into a parallel light whose light beam diameter is widened by the reflecting structure 16a, and simultaneously, a light beam is condensed in the direction perpendicular to the surface of the waveguide of the optical waveguide circuit 12c by a pair of cylindrical lenses 131 and 132 that are spaced from each other and fixed in the grooved structure 121 of the optical waveguide circuit 12c in which a partial plane of the upper clad layer 53, core layer 52, lower clad layer 51 and the optical waveguide substrate 50 is removed to a prescribed pattern on the slab waveguide 15 portion, wherein it becomes possible to incorporate an optical component 133 such as a photo diode array, etc., between the cylindrical lenses 131 and 132.

At this time, at the optical component 133, a component may be diagonally inclined and attached with respect to the direction of the light beam in order to suppress reflection at the end face thereof.

Figure 30:
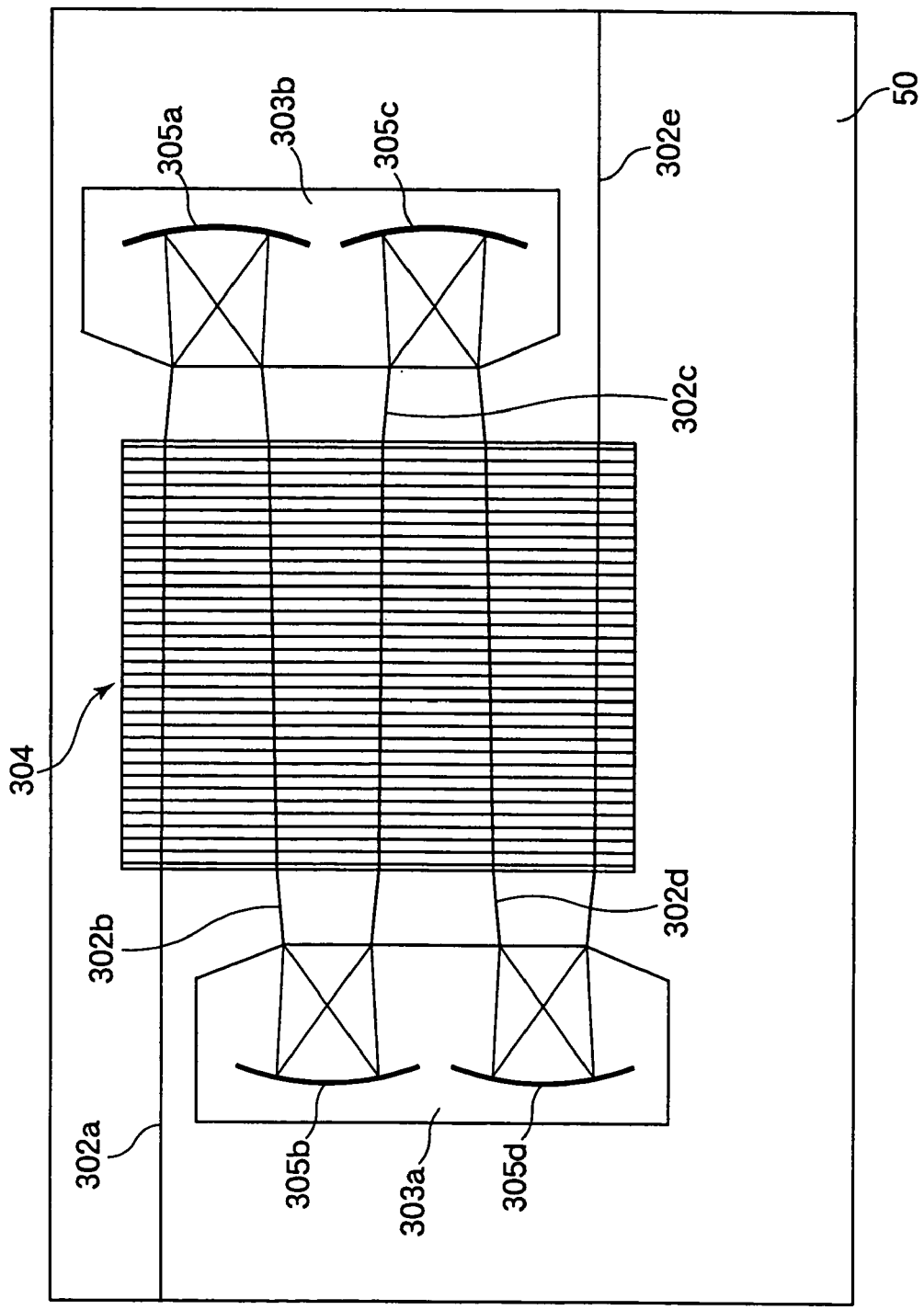
FIG. 30 shows a tenth embodiment of an optical signal processing circuit having a pseudo phase matching structure in which optical waveguides are connected in multiple stages, utilizing the reflecting structure.

FIG. 30 shows the tenth embodiment of the optical signal processing circuit having a pseudo phase matching structure in which optical waveguides are connected in multiple stages by utilizing the reflecting structure. Herein, the optical waveguide substrate 50 is made of $LiNbO_3$ in the present embodiment. Also, in single-mode optical waveguides 302a through 302e, the cores thereof are formed by diffusing titanium. Slab waveguides 303a and 303b are also constructed by diffusing titanium. In addition, a periodic polarization inverting structure 304 is a pseudo phase matching section in which polarization is periodically inverted. Since a wavenumber corresponding to the period compensates a difference between two times the propagation coefficient of basic waves and the propagation coefficient of the secondary harmonics, for example, in generation of the secondary harmonics, it is possible to achieve the phase matching in a long area. The reflecting structures 305a through 305d couple between respective single-mode waveguides. Generally, the efficiency of the secondary optical nonlinear effect (secondary harmonics generation, sum-frequency generation, differential-frequency generation, and parametric amplification, etc.,) is proportional to the square of the length of the waveguide. Conventionally, it is expected that the efficiency which has been limited by the size of a substrate can be dramatically increased by a lengthening of the size thereof, which is brought about by multiple-stage connections using the reflecting structures 305a through 305d. That is, according to the present embodiment, for example, under the condition that the nonlinear effect is not saturated, the efficiency is increased twenty-five times (5×5). Utilizing these effects, it becomes possible to construct an optical signal processing circuit that is able to obtain short wavelength laser light necessary for wavelength conversion and optical memory in optical communications by secondary harmonics generation.

The method and structure for producing the reflecting structures 305a through 305d are the same as those in the first and second embodiments, and the description thereof is omitted.

The present embodiment has achieved an optical nonlinear circuit that increases mutual operating lengths by providing a number of reflecting structures 305a through 305d on the optical waveguide substrate 50 and includes a pseudo phase matching section brought about by a highly efficient periodic polarization inverting structure. Since a fold-over structure brings about multiple stages even if the optical waveguide substrate is small-sized, an increase in the mutual operating length can be achieved. Since the efficiency of the nonlinear element is proportional to the square of the length, it is possible to raise the efficiency 10 through 100 times and increase the same to the saturation range. That is, it becomes possible to carry out wavelength conversion and to generate secondary harmonics at low pumping power, wherein circuits can be made small-sized, power consumption can be decreased and noise level can be also reduced.

Figure 31:
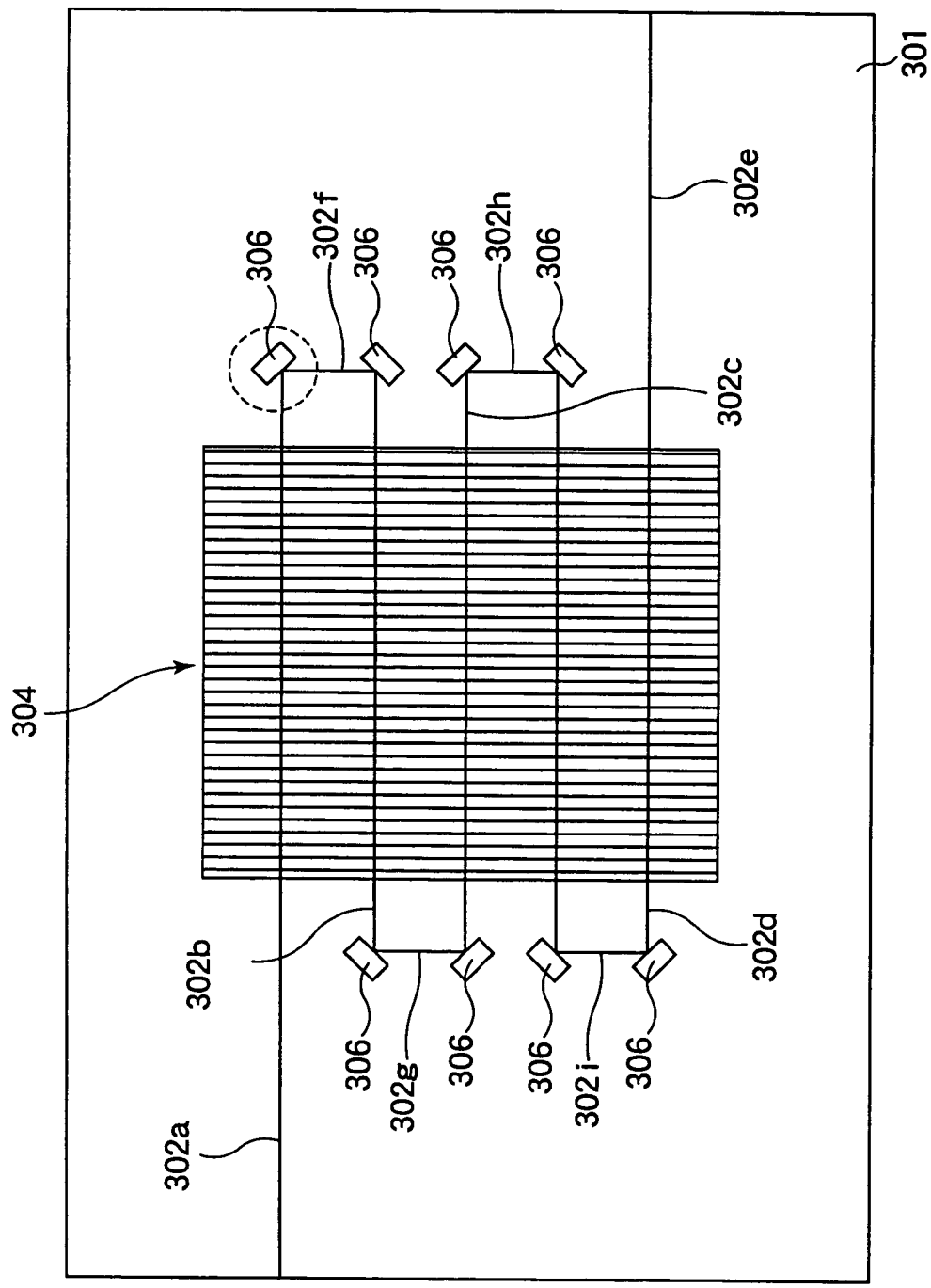
FIG. 31 shows an eleventh embodiment of an optical signal processing circuit having a pseudo phase matching structure in which optical waveguides are connected in multiple stages, utilizing the reflecting structure.
Figure 32:
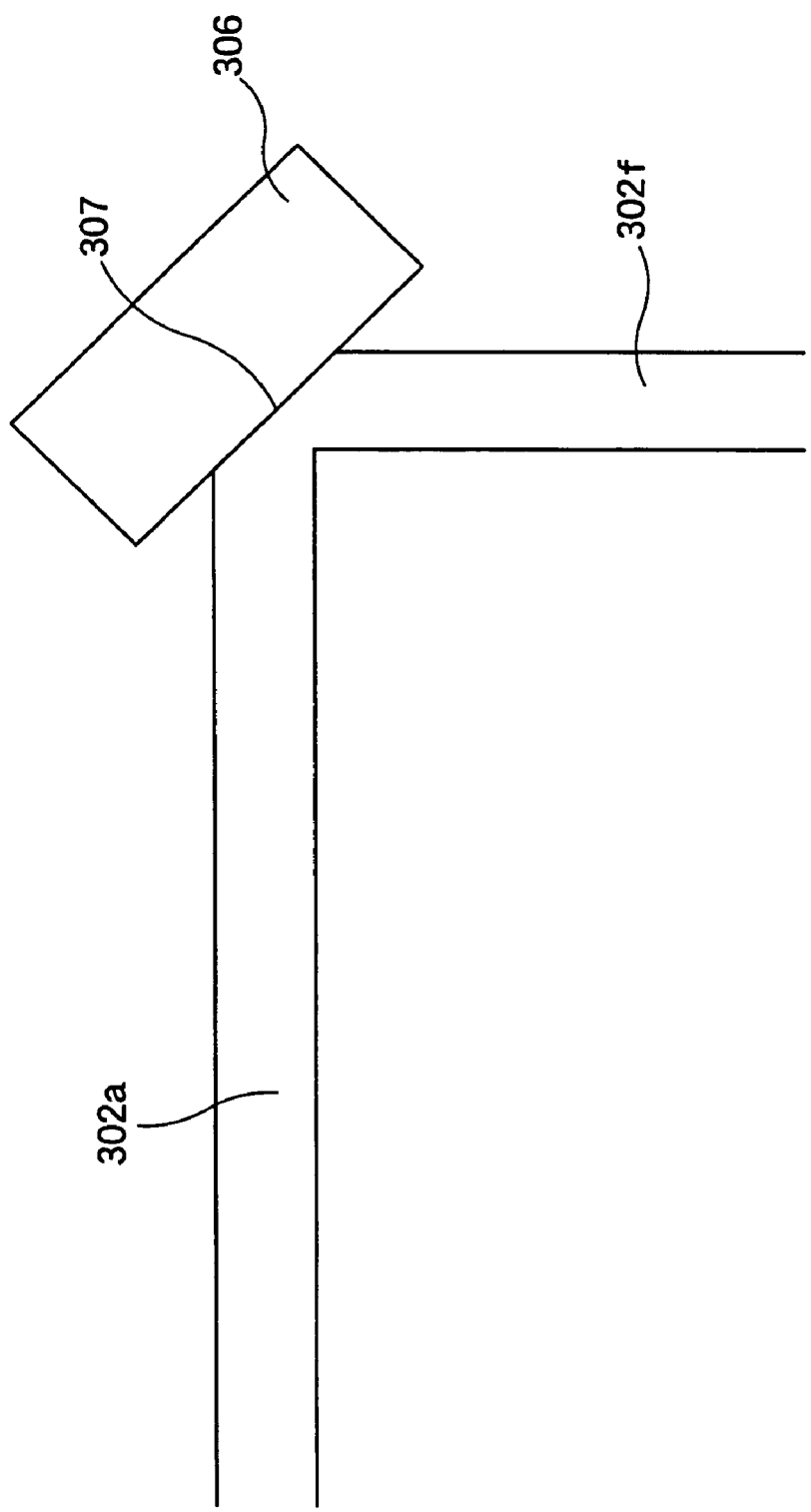
FIG. 32 shows the details of a grooved structure 306.
Figure 33A:
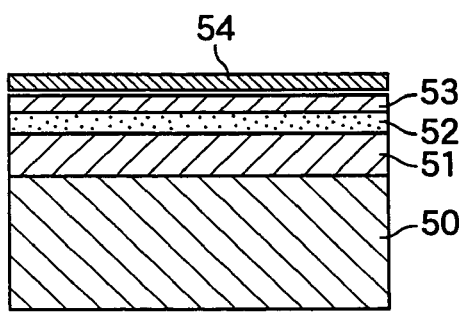
FIGS. 33A–H are sectional views of an optical waveguide substrate 50 for describing the steps of producing a further minute structure than the wavelength $\lambda m$ of a processing laser beam by laser ablation processing.
Figure 33E:
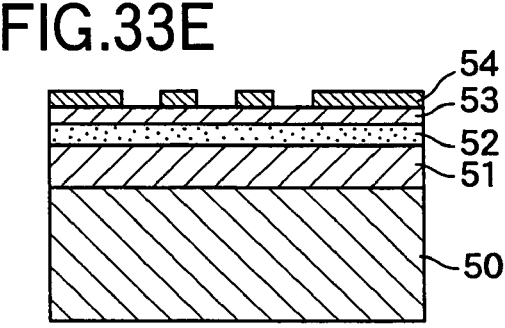
Figure 33B:
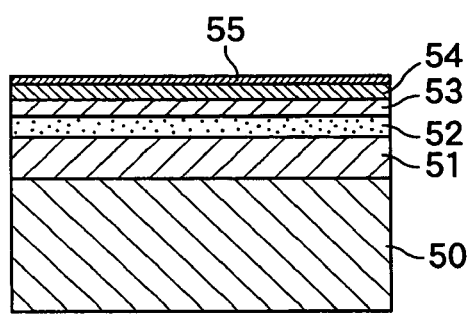
Figure 33F:
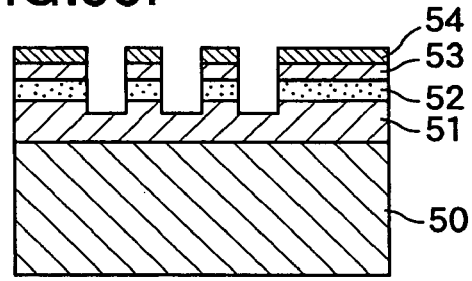
Figure 33C:
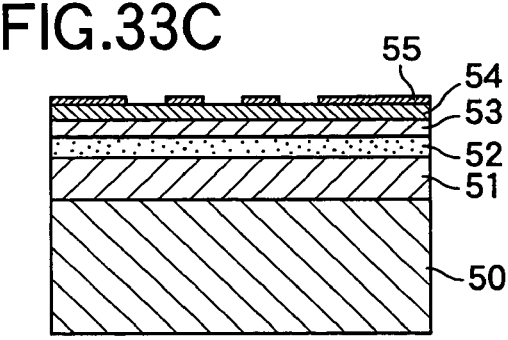
Figure 33G:
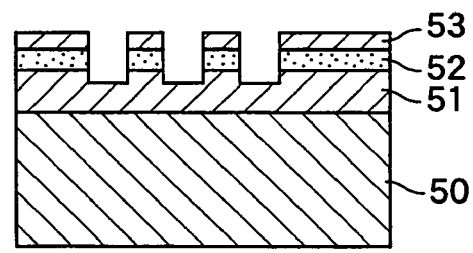
Figure 33D:
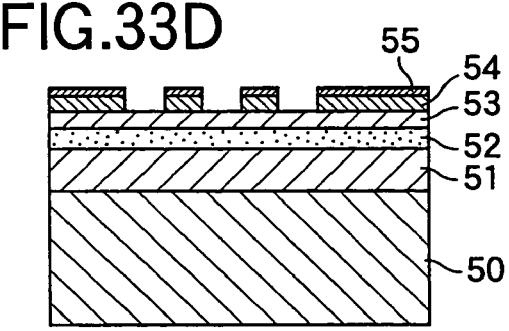
Figure 33H:
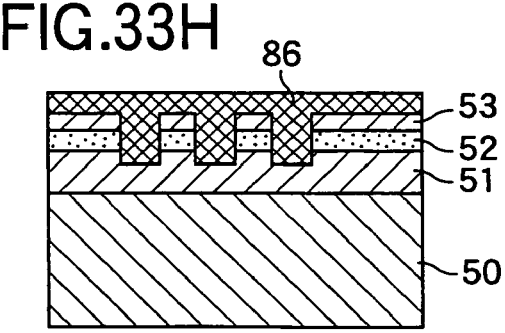
Figure 35A:
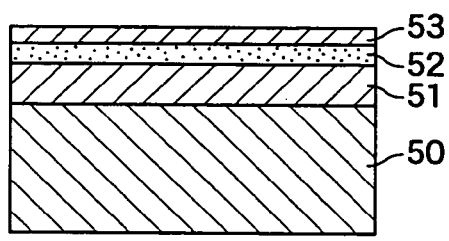
FIGS. 35A–F show a method for producing a sub-micron level minute structure by an electron beam exposure method according to a twelfth embodiment of the invention.
Figure 35D:
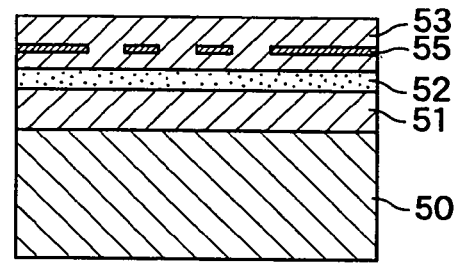
Figure 35B:
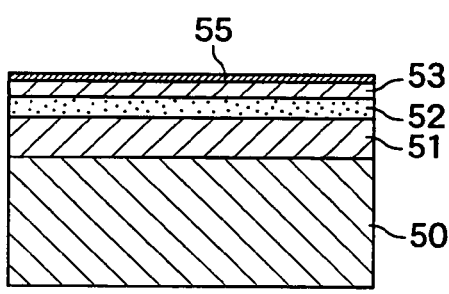
Figure 35E:
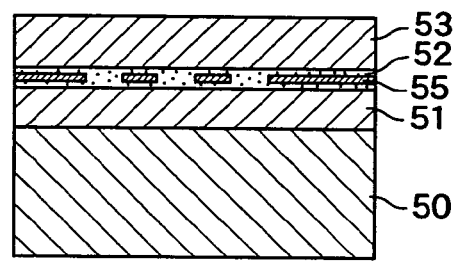
Figure 35C:
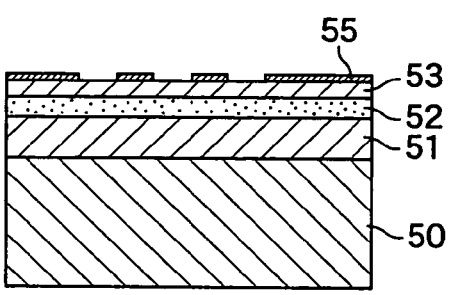
Figure 35F:
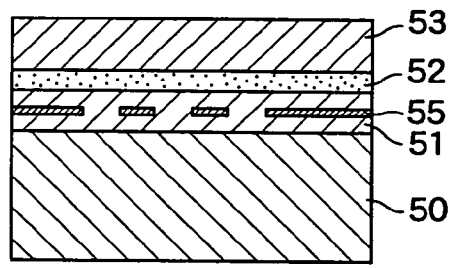
Figure 36A:
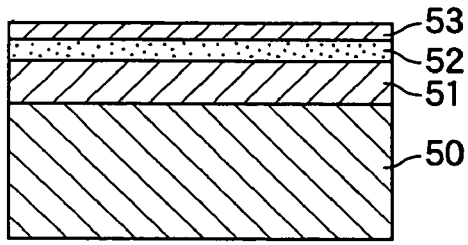
FIGS. 36A–H show a method for producing a sub-micron level minute structure by an ion implantation method according to a thirteenth embodiment of the invention.
Figure 36B:
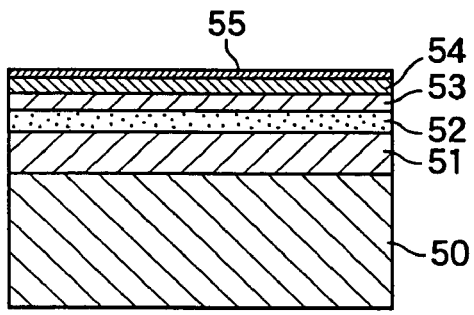
Figure 36C:
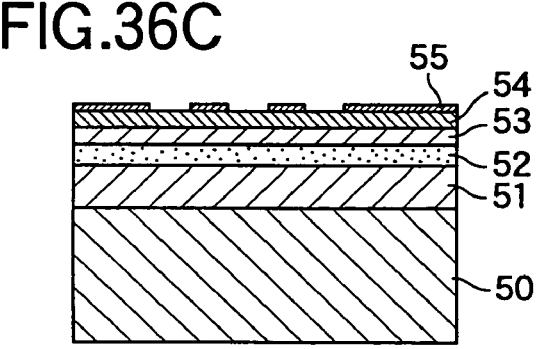
Figure 36D:
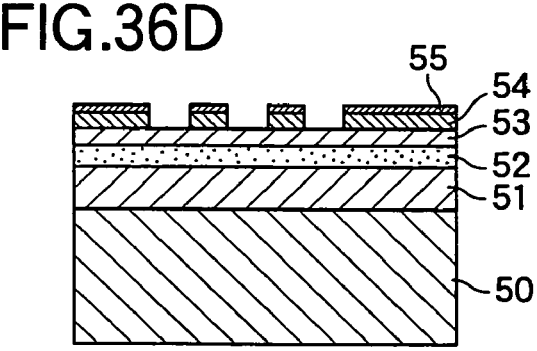
Figure 36E:
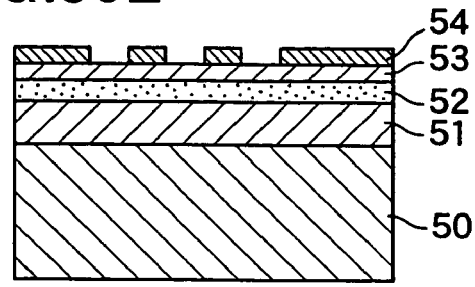
Figure 36F:
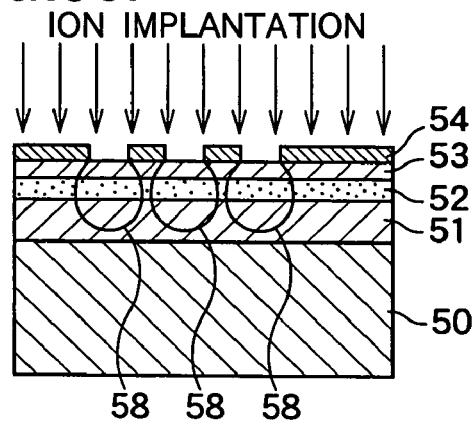
Figure 36G:
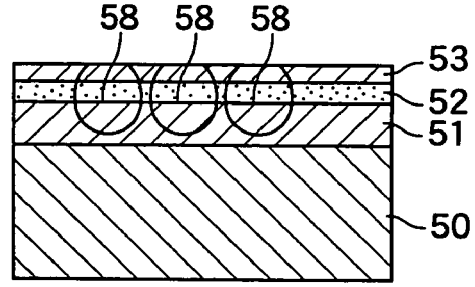
Figure 36H:
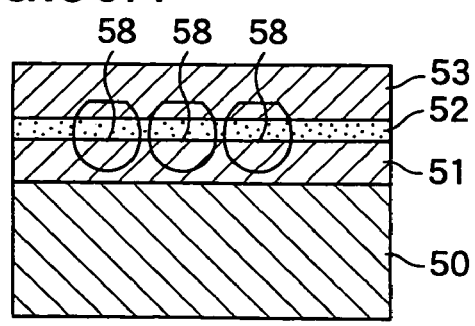

FIG. 31 shows the eleventh embodiment of the optical signal processing circuit having a pseudo phase matching structure in which optical waveguides are connected in multiple stages utilizing the reflecting structure. Herein, as shown in FIG. 32, a grooved structure 306 is formed, which cuts off the core portions of the single-mode optical waveguides 302a through 302i, and the side wall 307 thereof is functioned as the entire reflection mirror, whereby an optical signal processing circuit is constructed, which includes a pseudo phase matching structure in which the single-mode waveguides 302a through 302i are connected in multiple stages. Generally, since the refractive index of the material of the waveguide is sufficiently higher than the refractive index of air, a high reflection factor can be obtained with any metal layer provided on the side wall. However, a protection film such as a metal layer may be provided to protect the side thereof.

In the embodiment, a description is based on an example using an $LiNbO_3$ waveguide of titanium diffused core. However, it is a matter of course that Mg-doped $LiNbO_3$, LiTaO$_3$, KTiOPO$_4$, and RbTiOPO$_4$ may be used. Also, as a matter of course, Li-proton exchange may be used for core layer production.

In the method according to the present embodiment, a minute structure producing method is made clear, which utilizes a pattern whose length has the wavelength of a processing laser wavelength or longer with respect to one direction and has the wavelength or less with respect to another direction, in order to achieve laser processing less than the sub-micron level. In almost all optical signal processing circuits, if the minute direction of a pattern is made coincident with the propagation direction of signal light since the propagation direction of signal light is one direction, it becomes possible to achieve a sufficiently minute structure with respect to signal light. For example, it becomes possible to vary and control the effective refractive index without changing materials if a minute structure is provided. Thereby, a degree of freedom in designing optical signal processing circuits can be remarkably increased.

FIG. 33 is a sectional view showing an optical waveguide substrate for description of the steps of producing a further minute structure than the wavelength λm of processing laser light by laser ablation processing.

(1) A metal or dielectric thin film 54 is formed on the optical waveguide circuit (FIG. 33-(*a*)). Herein, reference number 50 denotes an optical waveguide substrate, 51 denotes the lower clad layer, 52 denotes the core layer, and 53 denotes the upper clad layer.
(2) Resist 55 is applied on the thin film 54 (FIG. 33-(*b*)).
(3) A pattern is traced on the resist 55 with an electron beam tracing device.
(4) The resist 55 is developed (FIG. 33-(*c*)).
(5) A thin film 54 is etched by a reactive ion etching device using the resist 55 as a mask, and an electron beam tracing pattern is copied (FIG. 33-(*d*)).
(6) The resist 55 is peeled off (FIG. 33-(*e*)).
(7) The optical waveguide substrate 50 is fixed on a stage.
(8) While observing a plurality of markers provided on the optical waveguide substrate 50 by a monitoring device, the tilt angle is adjusted so that the optical waveguide substrate 50 becomes perpendicular to the optical axis of a laser beam.
(9) While observing a plurality of markers provided on the optical waveguide substrate 50, the stage controller is rendered to recognize the position of the above-described pattern.
(10) The laser light is condensed, the stage is moved, and etching is carried out by sweeping the spot of the laser light on the surface (FIG. 33-(*f*)).
(11) The etching depth is controlled by the number of times of pulse irradiation.
(12) The optical waveguide substrate is removed from the stage, and the thin film 54 portion is removed (FIG. 33-(*g*)).
(13) A polymer material and dielectric material 86 is filled up in the grooved portions as necessary. This is carried out by evaporation or spin coating (FIG. 33-(*h*)).

A point at which the present method differs from the prior art method resides in the pattern traced by the electron beam tracing device. As shown in FIG. 34, the dimension of the pattern where the thin film 54 is peeled off, that is, the window dimension remarkably differs in two orthogonal directions. In the present method, the length L×1 in the short direction of the window is shorter than λm, and the length Ly in the lengthwise direction of the window is longer than λm. For example, where the thin film 54 is a metal film, if the vibration side of the electric field is set in the direction of Ly, the laser light can transmit through the window only to the degree of the wavelength. However, if the vibration side of the electric field is set in the direction of Lx, it can transmit through the window. That is, by setting the vibration side of the electric field in the direction of Lx by adjusting the polarization plane of the processing laser, it is possible to fabricate a further minute structure than the wavelength with respect to a specified direction by ablation. Generally, light propagating through an optical waveguide propagates along the optical axis, for example, like A→B in the drawing. Therefore, if Lx1+Lx2 (Lx2: spacing between windows) is made sufficiently short in comparison with the wavelength in the waveguide of light propagating through the optical waveguide, for example, it is made 25% or shorter, the propagating light only sensitizes the mean refractive index of the minute structure, wherein no diffracting light corresponding to the period is brought about. Also, if with respect to light propagating in the direction of C→D in the drawing the Lx1+Lx2 is set to 80% or less in comparison with the wavelength in the waveguide of light propagating through the optical waveguide, no diffraction light is brought about. That is, according to the present method, it is possible to control the equivalent refractive index of materials.

FIG. 35 shows a method for fabricating a sub-micron level minute structure on the basis of an electron beam exposure method according to the twelfth embodiment of the invention. In FIG. 35-(*a*), reference number 50 denotes an optical waveguide substrate, 51 denotes the lower clad layer, 52 denotes the core layer, and 53 denotes the upper clad layer.

(1) Resist 55 is applied on the upper clad layer 53 of the optical waveguide substrate 50 (FIG. 35-(*b*)).
(2) A pattern is traced on the resist 55 with an electron beam tracing device.
(3) The resist 55 is developed (FIG. 33-(*c*)).
(4) The upper clad layer 53 is further fabricated on the resist 55. For example, if a polymer material is used for a waveguide, the material is applied by a spin coater to fill up the resist 55, and polymerization and hardening are carried out (FIG. 35-(*d*)).

Also, the resist 55 is provided in the core material 52, and similarly the remainder of the core layer 52 and the upper clad layer 53 may be fabricated (FIG. 35-(*e*)).

In addition, the resist 55 is provided on the lower clad layer 51, and similarly the remainder of the lower clad layer 51, the core layer 52 and upper clad layer may be fabricated (FIG. 35-(*f*)).

Here, where the resist 55 is filled up in the upper clad layer 53 or the lower clad layer 51, if the resist 55 is filled up in an area in which the electric field intensity of light to be waveguided is one-tenth or more of the intensity of the core layer 52, a diffracting grating, etc., may be fabricated by substantially influencing the intensity of light to be waveguided.

In the present embodiment, by utilizing a minutely patterned resist as the fabricating material of waveguide and filling it up in the waveguide in the polymer waveguide, it becomes possible to fabricate an optical signal processing circuit including a diffraction grating, etc., without utilizing any expensive etching device.

FIG. 36 shows a method for fabricating a sub-micron level minute structure by an ion implantation method according to the thirteenth embodiment of the invention. In FIG. 36-(*a*), reference number 50 denotes an optical waveguide substrate, 51 denotes the lower clad layer, 52 denotes the core layer, and 53 denotes the upper clad layer.

(1) A metal or dielectric thin film 54 is formed on the upper clad layer 53 of the optical waveguide substrate 50, and resist 55 is applied on the thin film 54 (FIG. 36-(b)).
(2) A pattern is traced on the resist 55 with an electron beam tracing device.
(3) The resist 55 is developed (FIG. 36-(c)).
(4) The thin film 54 is etched by a reactive ion etching device using the resist 55 as a mask, and an electron beam image-tracing pattern is copied (FIG. 36-(d)).
(5) The resist 55 is peeled off (FIG. 36-(e)).
(6) Ions are acceleration-implanted. For example, $H^+$, $F^+$ or diluted gas ions are implanted into the polymer waveguide, wherein it is possible to fabricate a low refractive index portion. When fabricating a high refractive index portion, $C^+$, $Si^+$, $O^+$, $N^+$, and $S^+$ may be implanted. Also, $H^+$, $F^+$, $B^+$, $O^+$, $C^+$, $N^+$ or diluted gas ions are implanted into a quartz waveguide, wherein it is possible to fabricate a low refractive index portion. When fabricating a high refractive index portion, $Si^+$, $Ge^+$, $Ti^+$, $Ta^+$, $P^+$, $Al^+$, $Zr^+$ and rare-earth element ions may be implanted. Further, with respect to a dielectric waveguide, $H^+$, $F^+$, $B^+$, $O^+$, $C^+$, $N^+$ or diluted gas ions are implanted, wherein it is possible to fabricate a low refractive index portion. When fabricating a high refractive index portion, $Si^+$, $Ge^+$, $Ti^+$, $Ta^+$, $P^+$, $Al^+$, $Zr^+$, $Mg^+$ and rare-earth element ions may be implanted. It is a matter of course that polyvalent ions may be used for ion implantation (FIG. 36-(f)).
(7) The thin film 54 is removed (FIG. 36-(g)).
(8) The thickness of the upper clad layer 53 is increased as necessary (FIG. 36-(h)).

In the embodiment, a refractive index controlling method using ion implantation has been disclosed, which clarifies combinations of adequate ions and materials for waveguides. The ion implantation is a standard process in producing silicon LSIs, which enables uniform implantation of adequate ions into large-sized substrates. That is, it becomes possible to easily carry out minute refractive index control by combining with electron beam tracing, wherein the degree of freedom in designing optical signal processing circuits can be improved.

FIG. 37 shows a method for fabricating a sub-micron level minute refractive index controlling structure on a polymer waveguide by a minute pattern copying method according to the fourteenth embodiment of the invention.
(1) Concave and convex patterns of the minute structure are produced in advance on a quartz substrate 401 by an electron beam exposure method, etc. Also, there are positioning patterns 402 on the quartz substrate, and metal 403 such as Ni, Ta, etc., is deposited on the minute pattern (FIG. 37-(a)).
(2) Utilizing a mask aligner, etc., the positioning patterns are matched. A replica of concave and convex patterns of the minute structure is formed on the polymer waveguide substrate 404 by pressing the quartz substrate 401, which serves as a metal die, onto the polymer waveguide substrate 404 (FIG. 37-(b), (c) and (d)).
(3) The thickness of the upper clad layer is increased as necessary (FIG. 37-(e)).

In this explanatory drawing, a description is based on the case where a minute refractive index controlling structure is constructed on a substrate on which the upper clad layer has already been fabricated. However, after concave and convex portions are formed on the lower clad layer, the core layer and upper clad layer may be fabricated, and the upper clad layer may be fabricated after concave and convex portions are formed on the core layer.

In the present embodiment, a method for constructing an optical signal processing circuit has been achieved, which is capable of copying a minute structure by fabricating a metal die having the minute structure and pressing the metal die onto a polymer waveguide substrate. In the present method, since the minute structures for a number of optical signal processing circuits are constructed by being copied one after another if one metal die is accurately fabricated, it is possible to fabricate the optical signal processing circuits each having a minute structure at a high speed. In addition, a mask aligner available on the market can be used for copying the minute structures, therefore the fabrication thereof can be easily and inexpensively carried out.

Figure 38:
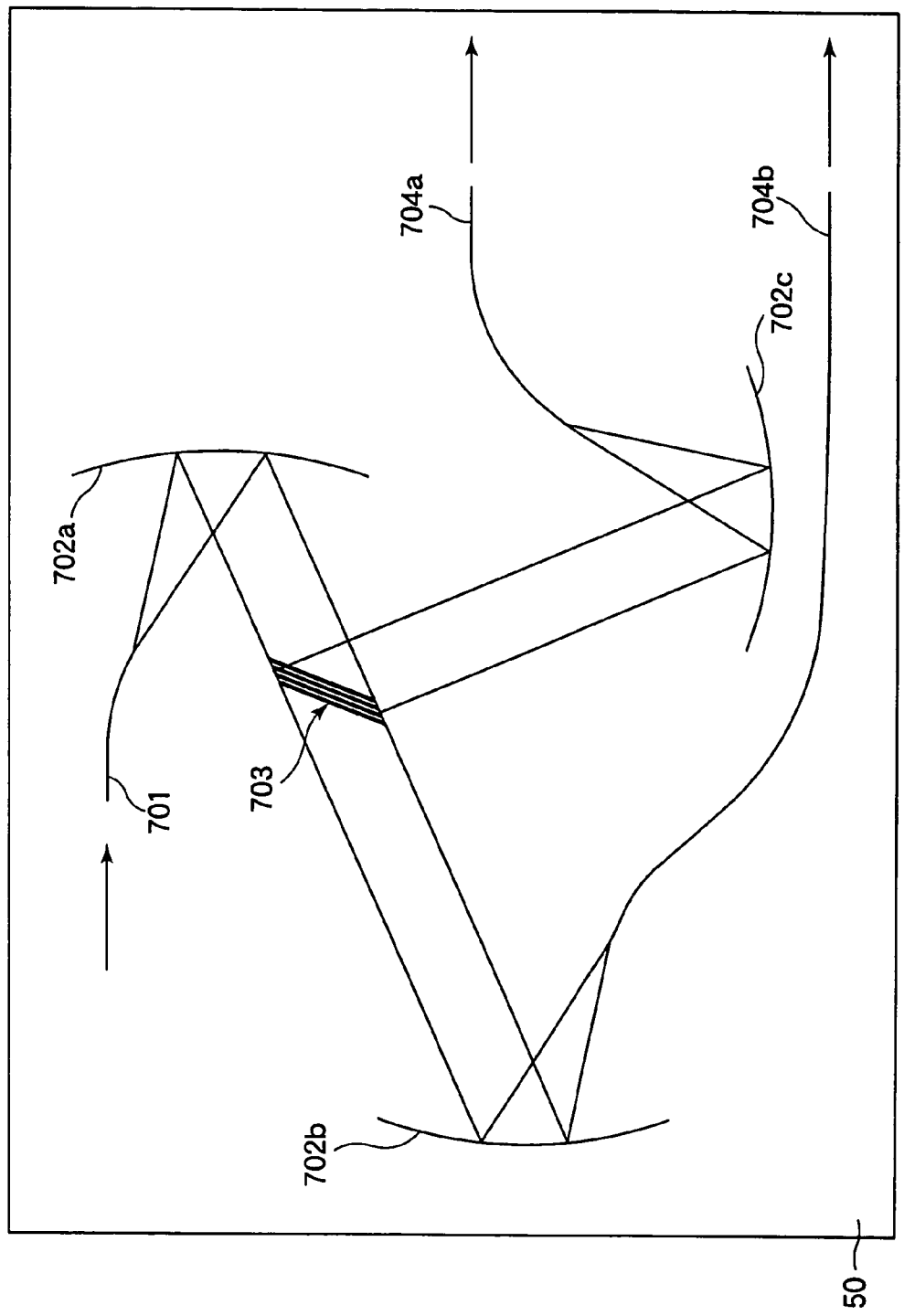
FIG. 38 shows a TE/TM mode splitting circuit constructed by utilizing any one of the methods according to the eleventh through thirteenth embodiments.
Figure 39:
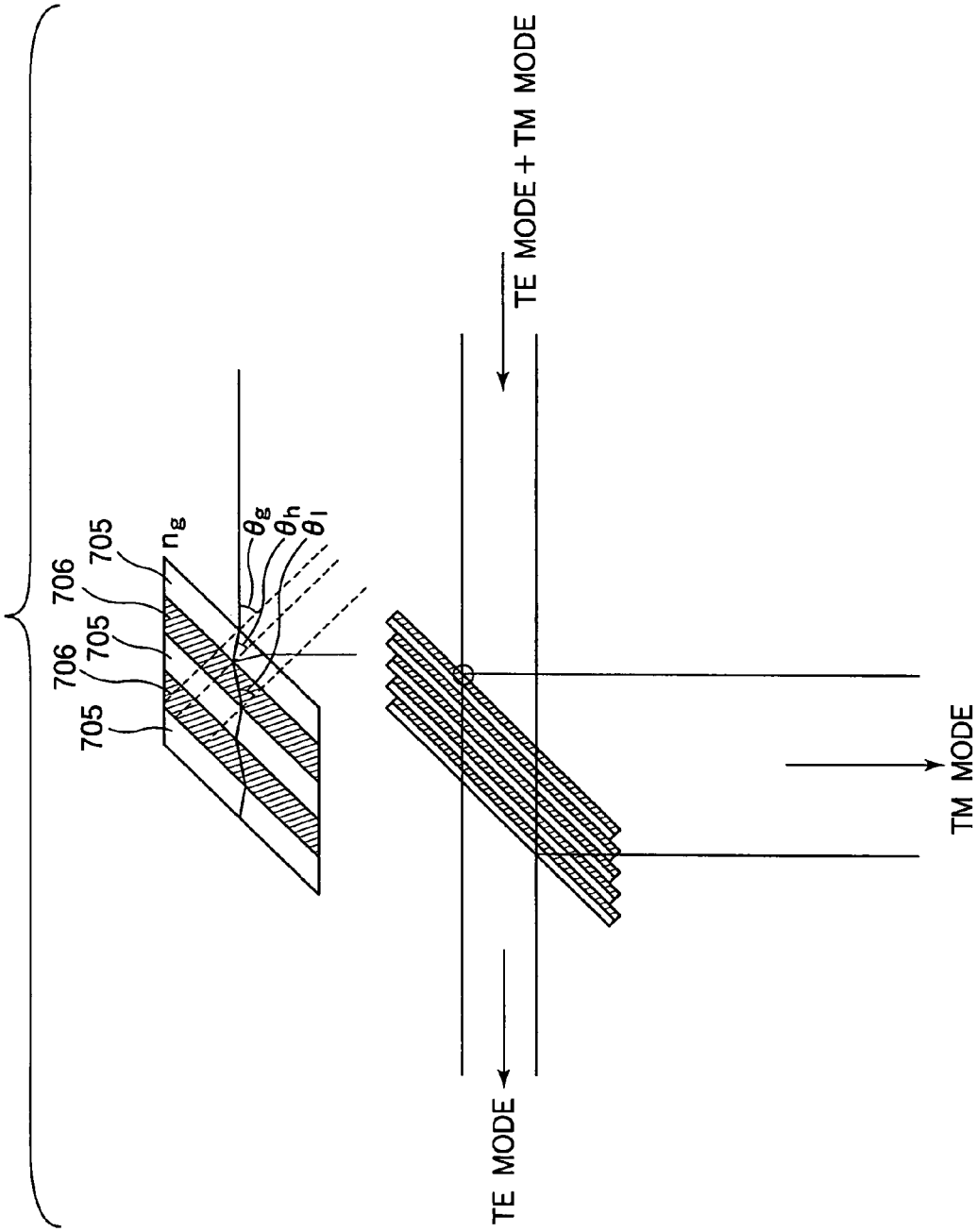
FIG. 39 shows the details of a mode separation structure 703.

FIG. 38 shows a TE/TM mode branch circuit that is constructed by utilizing any one of the methods disclosed in the eleventh embodiment through the fourteenth embodiment. Herein, with respect to an input waveguide 701, a reflecting structure 702a converts emission light brought about by the input waveguide 701 to parallel light. That is, the reflecting structure 702a collimates the emission light. Reflecting structures 702b and 702c couple lights of respective modes, which are separated by a mode separation structure 703, to output waveguides 704a and 704b. FIG. 39 shows details of the mode separation structure 703. The mode separation structure 703 has a periodic structure composed of a high refractive index portion 705 and a low refractive index portion 706. Although not illustrated in the drawing, the portion where light propagates, other than the input and output waveguides 701, 704a and 704b, is a slab waveguide. Lengths and refractive indices in the respective normal lines are nh, dh, nl and dl. Also, the angle created by the light propagation direction and the normal line is θg, the angle created by the light propagation direction and the normal line at the high refractive index portion 705 is θh, and the angle created by the light propagation direction and the normal line at the low refractive index portion 706 is θl. Further, the wavelength of light propagating in a vacuum state and the refractive index thereof are λ0 and ng. In this case, the refractive index and length are determined so that the following relationships can be established:

$$n_g \sin \theta_g = n_h \sin \theta_h = n_l \sin \theta_l \tag{7}$$

$$\frac{n_h}{\cos\theta_h} = \frac{n_l}{\cos\theta_l} \tag{8}$$

$$n_h d_h \cos\theta_h = \frac{\lambda_0}{4} \tag{9}$$

$$n_l d_l \cos\theta_l \tag{10}$$

Where these relationships are met, the TE mode light (in the mode having an electric field component only in the orientation orthogonal to the propagation direction in the plane of a waveguide) propagates, and a part of the TM mode light (in the mode having a magnetic field only in the orientation orthogonal to the propagation direction in the plane of a waveguide) reflects. If the mode separation structure 703 is sufficiently large, almost all of the TM mode light reflects, and the present circuit functions as the TE/TM mode branch circuit.

Figure 40:
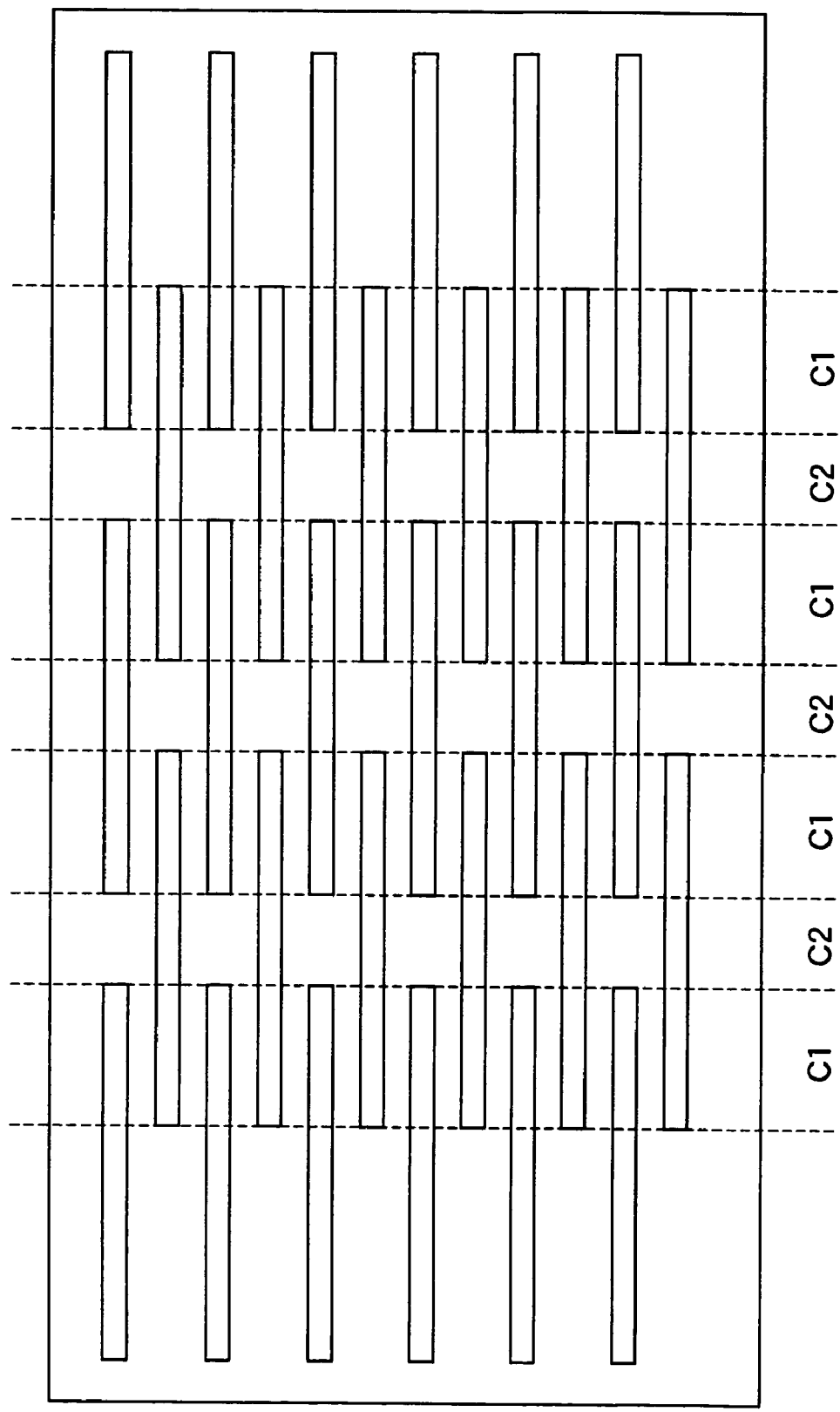
FIG. 40 shows a first example of patterns for constructing the mode separation structure 703.
Figure 41:
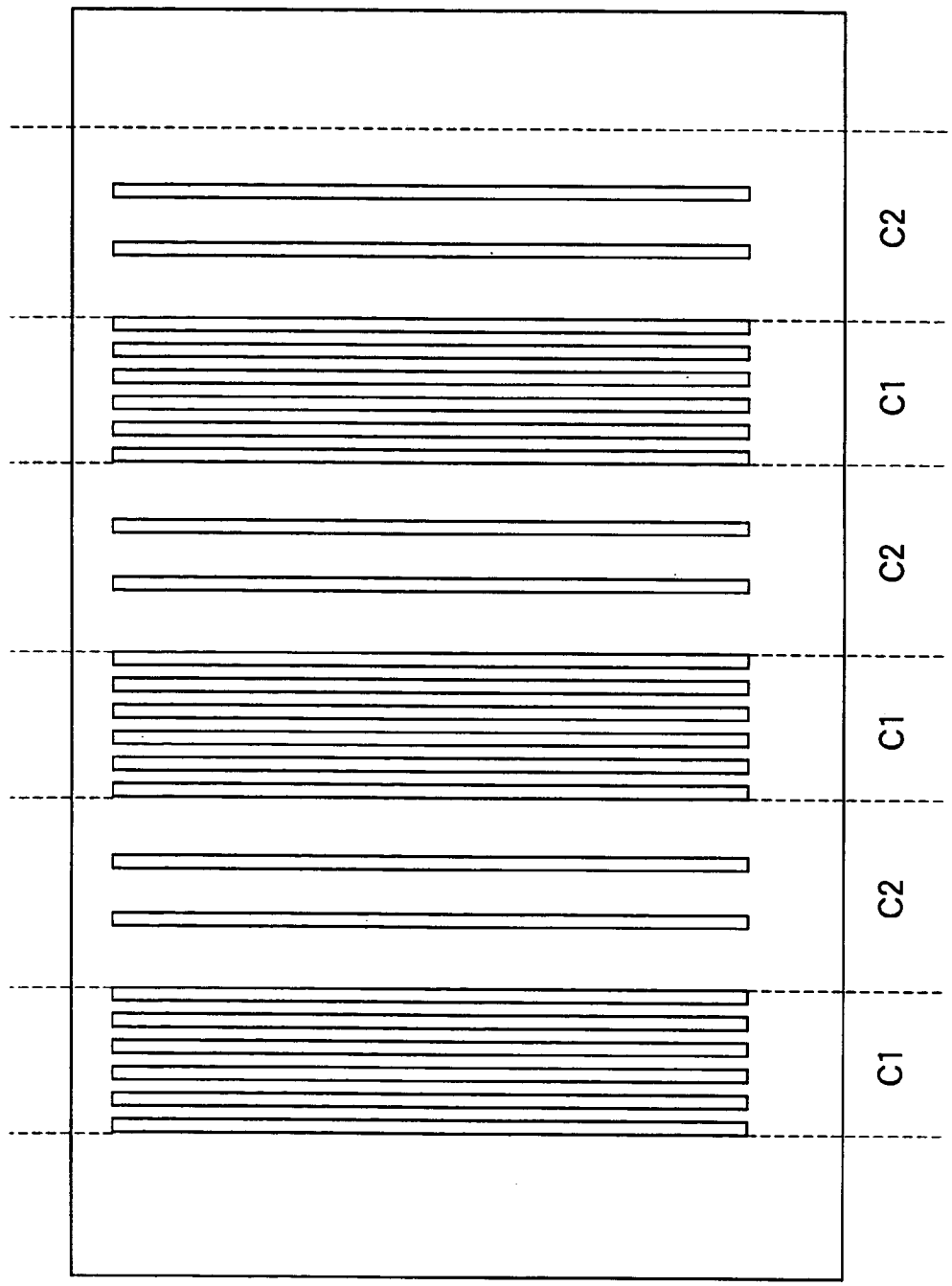
FIG. 41 shows a second example of patterns for constructing the mode separation structure 703.

FIG. 40 and FIG. 41 show examples of patterns for constructing the mode separation structure 703 by the method according to the eleventh embodiment through the fourteenth embodiment. A change in the effective refractive index is proportional to the density of the minute structure pattern. It is possible to fabricate an area C1 having a high pattern density and an area C2 having a low pattern density by utilizing the pattern illustrated in the drawing. If it is assumed that C1 and C2 are a low (high) refractive index portion and a high (low) refractive index portion, the eleventh embodiment through the fourteenth embodiment can be achieved.

The present embodiment made clear a method for constructing a TE/TM mode multiplexer circuit. The present circuit functions as the entire waveguide type polarization multiplexer circuit, whereby a circuit integrated in a waveguide disclosed in the embodiment is small-sized and has high reliability in comparison with the case where a prior art polarization multiplexer circuit is constructed by using a polarization beam splitter and fiber collimator, etc.

As described above, the optical signal processing circuit according to the invention was described in detail according to the above-described embodiments. However, the invention is not limited to the above-described embodiments, and it is a matter of course that the invention can be embodied in various modifications and variations within the scope not departing from the spirit of the invention. For example, the optical signal processing circuit according to the invention may be applicable to quartz-based waveguides, polymer-based waveguides, $LiNbO_3$ waveguides, chemical compound semiconductor waveguides, and optical waveguides of any materials.

Instead of the periodic polarization inverting structure of an optical nonlinear component shown in the tenth embodiment (FIG. 30) and the eleventh embodiment (FIG. 31), optical amplification materials such as YIG, GGG, YAG, sapphire, $LiNbO_3$, $BaTiO_3$, $LiTaO_3$, quartz, or glass to which a lanthanoid-based rare earth element or Cr is doped may be used.

INDUSTRIAL APPLICABILITY

As described above, the following effects can be brought about with the optical signal processing circuit and method for producing the same according to the invention.

With the optical signal processing circuit according to the invention, the first and second coupling ends I and U are, respectively, entered into a position where an image-formation of each other is established in equal magnification or an arbitrary magnification, which is a feature that cannot be achieved by a prior art optical waveguide circuit not including a reflecting structure.

Thereby, where the optical signal processing circuit according to the invention is applied to a conventional directivity coupling type optical coupler in which the most frequently used optical fibers are welded in parallel, the following advantages can be brought about.

(a) Although in the directivity coupling type coupler the coupling efficiency principally depends on the wavelength, the optical coupler according to the invention does not have wavelength dependence.

(b) Since it is difficult to micro-adjust the bifurcating ratio although the bifurcating ratio of the directivity coupling type coupler is controlled by the distance between optical fibers to be welded and the welding length, the ratio accuracy cannot be increased. However, in an optical coupler to which the optical signal processing circuit according to the invention is applied, since it is possible to geometrically determine the ratio by the division position of the reflecting structure, it becomes possible to very accurately control the ratio.

(c) Although the dimension is several centimeters including the termination processing portion in a prior art optical fiber coupler, the dimension of the optical coupler can become several millimeters if the optical signal processing circuit according to the invention is applied, wherein remarkable downsizing is brought about.

In addition, with the optical signal processing circuit according to the invention, since isochronism can be obtained at respective points in a waveguide crossing a line perpendicular to the optical axes of the first optical waveguide and the second optical waveguide, the coupling circuit can be linearly disposed in parallel, wherein it becomes easy to design and fabricate optical circuits.

Further, with the optical signal processing circuit according to the invention, since light emitted from the first coupling end of the first optical waveguide of a single mode is converted to wide parallel light in the coupling circuit by the first reflecting structure, which cannot be achieved by a conventional optical waveguide circuit not including any reflecting structure, it can be connected again to the second coupling end of the second optical waveguide circuit of a single mode by the second reflecting structure.

Thereby, while suppressing an excessive loss to a low level, it becomes possible to insert various types of optical components in positions of the coupling circuit where wide parallel light is secured.

Also, the optical signal processing circuit according to the invention can be provided with a plurality of reflecting structures. Therefore, if it is applied to a configuration where the number of arcuate reflecting structures is ten-odd or less, that is, a configuration that polarizes wavelength-multiplexed optical signals of ten-odd waves, it is possible to construct a wavelength multiplexer that has less loss and less loss unevenness than in conventional arrayed waveguide diffraction gratings. Also, since no circulator is required, which becomes necessary in the case of a fiber diffraction grating, it is possible to fabricate a wavelength multiplexer at low loss and low cost.

Further, since the arrayed waveguide is disposed in parallel different from conventional arrayed waveguide diffraction gratings, it becomes easy to design and fabricate optical circuits.

Still further, with the method for producing an optical signal processing circuit according to the invention, laser ablation based on ultra-short light pulses is utilized to form concave, flat or convex reflecting structures, or periodic grooved structures. Since, in the laser ablation, etching is carried out in a shorter time than the thermal relaxation time, the perpendicularity and smoothness of a processed end face become very favorable.

In addition, several minutes are sufficient as the time required for forming a grooved structure of several tens of microns in an opening of several millimeters. Further, without using any mask, minute processing can be carried out while squeezing to a spot system of a wavelength or so.

By concurrently using a mask by electron beam exposure, it becomes possible to form sub-micron width grooves whose size is the laser beam convergence diameter or less.

Since tantalum, molybdenum, tungsten, chromium, gold, platinum, vanadium, nickel, silver, copper, silicon oxide, silicon nitride, titanium oxide, boron nitride, aluminum nitride are used as the mask material, etching can be carried out at a very high aspect ratio.

Thereby, a novel optical signal processing circuit can be fabricated, in which concave, flat and convex reflecting structures are provided.

All the publications, patents and patent applications cited in the present specification are taken in the specification for reference as they are.

What is claimed is:

1. A optical signal processing circuit comprising:
   a substrate on which an optical waveguide is held;
   first and second optical waveguides formed on said substrate; and
   a reflecting structure having a single reflecting surface that disposes a first coupling end of said first optical waveguide and a second coupling end of said second optical waveguide, which are formed on said substrate, in a position where an image Fourier transformation of each other is established, and couples the first and second optical waveguides together,
   wherein said reflecting structure is shaped to be an arc of a circle whose radius is r; and
   said first coupling end and said second coupling end are disposed so that the optical axes thereof pass through the same point Q on said reflecting structure, and the coupling ends are disposed at a symmetrical position with respect to a straight line including the center P of the arc of said reflecting structure and said point Q, and are further disposed on an arc of a circle whose radius is r, centering around a termination point T that is provided by extending a line segment PQ by r/2 in the direction of said point Q.

2. An optical signal processing circuit, comprising:
   a substrate on which optical waveguides are held;
   first and second optical waveguides formed on said substrate;
   a reflecting structure that disposes a first coupling end of said first optical waveguide and a second coupling end of said second optical waveguide, which are formed on said substrate, in a position where an image-formation of each other is established, and couples the first and second optical waveguides together,
   wherein the reflecting structure is a spherical arc,
   further comprising a wave front compensating portion that contains a material having a refractive index different from the effective refractive index of a light propagation path in a plurality of grooves formed in said light propagation path on said substrate and having different widths depending on positions thereof and which compensates the wave front.

3. An optical signal processing circuit, comprising:
   a substrate on which optical waveguides are held;
   first and second optical waveguides formed on said substrate; and
   a reflecting structure that disposes a first coupling end of said first optical waveguide and a second coupling end of said second optical waveguide, which are formed on said substrate, in a position where an image-formation of each other is established, and couples the first and second optical waveguides together,
   wherein said reflecting structure is shaped in a first spherical arc whose radius is r; and
   said first coupling end and second coupling end of said optical waveguide are disposed so that the optical axes thereof pass through the same point Q on said reflecting structure, and the coupling ends are provided on a second spherical arc whose radius is r, centering around said point Q, and are disposed at a symmetrical position with respect to a straight line including the center P of the first spherical arc of said reflecting structure and said point Q.

4. An optical signal processing circuit comprising:
   a substrate on which optical waveguides are held;
   first and second optical waveguides formed on said substrate;
   a reflecting structure that disposes a first coupling end of said first optical waveguide and a second coupling end of said second optical waveguide, which are formed on said substrate, in a position where an image-formation of each other is established, and couples the first and second optical waveguides together; and
   a periodic grooved structure formed in a light propagation path on said substrate.

5. The optical signal processing circuit as set forth in claim 4, wherein said periodic grooved structure is shaped so that respective grooves thereof are straight, and are disposed in parallel to each other in a specified direction.

6. The optical signal processing circuit as set forth in claim 4, wherein said periodic grooved structures are shaped so that respective grooves thereof are straight, and are disposed in parallel to each other in a plurality of different directions respectively.

7. The optical signal processing circuit as set forth in claim 4, wherein said periodic grooved structures are shaped so that respective grooves thereof are arcuate or quadratic-curved.

8. The optical signal processing circuit as set forth in claim 7, wherein the coupling ends of said optical waveguides are disposed at the center of the arc or quadratic curve of said grooves.

9. The optical signal processing circuit as set forth in claim 7, wherein the coupling ends of said optical waveguides are disposed at a symmetrical position with respect to the optical axis of said arcuate or quadratic curved groove.

10. The optical signal processing circuit as set forth in claim 4, wherein said periodic grooved structure has the periods of said grooves varying by fixed spacing.

11. The optical signal processing circuit as set forth in claim 4, wherein said periodic grooved structure has the depths of said grooves varying by fixed depths.

12. The optical signal processing circuit as set forth in claim 4, wherein said periodic grooved structure has the periods of said grooves varying periodically.

13. The optical signal processing circuit as set forth in claim 4, wherein said periodic grooved structure has a ratio in the widths of concave portions and convex portions of the grooves, which is 1:1/nc (nc is the effective refractive index of the optical waveguide).

14. The optical signal processing circuit as set forth in claim 4, wherein said periodic grooved structure has a plurality of grooves in which concave portions of said grooves are filled up with a material whose refractive index differs from that of the material for the optical waveguides.

15. The optical signal processing circuit as set forth in claim 4, wherein said periodic grooved structure has the concave portions of said respective grooves filled up with a material whose refractive index (nx) differs from that of the material for the optical waveguide, and a ratio in the widths of concave portions and convex portions of the grooves, which is 1/nx: 1/nc.

16. An optical signal processing circuit, comprising:
   a substrate on which optical waveguides are held;
   first and second optical waveguides formed on said substrate;
   a reflecting structure that disposes a first coupling end of said first optical waveguide and a second coupling end of said second optical waveguide, which are formed on said substrate, in a position where an image-formation of each other is established, and couples the first and second optical waveguides together,
wherein the reflecting structure is a spherical arc,
further comprising a groove formed in a light propagation path on said substrate and a lens inserted in said groove.

17. An optical signal processing circuit, comprising:
a substrate on which optical waveguides are held;
first and second optical waveguides formed on said substrate;
a reflecting structure that disposes a first coupling end of said first optical waveguide and a second coupling end of said second optical waveguide, which are formed on said substrate, in a position where an image-formation of each other is established, and couples the first and second optical waveguides together,
further comprising grooves formed in a light propagation path on said substrate, a pair of lenses spaced from each other and inserted in said grooves respectively; and an optical element disposed between said lenses.

18. The optical signal processing circuit as set forth in claim 16, wherein said lens is a distributed refractive index lens.

19. A method for producing an optical signal processing circuit having a substrate on which optical waveguides are held; first and second optical waveguides formed on said substrate; and a reflecting structure that disposes a first coupling end of said first optical waveguide and a second coupling end of said second optical waveguide, which are formed on said substrate, in a p position where an image-formation of each coupling end is established, and couples the first and second optical waveguides together, comprising the steps of:
(i) fixing a substrate, on which an optical waveguide is formed, on a stage;
(ii) adjusting the tilt angle so that the substrate becomes perpendicular to an optical axis of a laser beam by observing a plurality of markers provided on the substrate with a monitoring device;
(iii) rendering a stage controller to recognize the position of an optical waveguide by observing a plurality of markers provided on the substrate with a monitoring device;
(iv) condensing the laser beam along the portion where a reflecting structure is provided, and producing concave portions by moving the stage; and
(v) condensing the laser beam along the surroundings of the concave portions and smoothing the end faces of the concave portions by moving the stage.

20. A method for producing an optical signal processing circuit having a substrate on which optical waveguides are held; first and second optical waveguides formed on said substrate; and a reflecting structure that disposes a first coupling end of said first optical waveguide and a second coupling end of said second optical waveguide, which are formed on said substrate, in a position where an image-formation of each coupling end is established, and couples the first and second optical waveguides together, the method comprising the steps of:
(i) applying resist on a substrate on which an optical waveguide is formed;
(ii) tracing a pattern on the resist by using an electron beam tracing device;
(iii) developing the resist;
(iv) fixing the substrate, on which said pattern is formed, on a stage;
(v) adjusting the tilt angle so that the substrate becomes perpendicular to an optical axis of a laser beam by observing a plurality of markers provided on the substrate with a monitoring device;
(vi) rendering a stage controller to recognize the position of the above-mentioned pattern by observing a plurality of markers provided on the substrate with a monitoring device;
(vii) condensing the laser beam, and etching a surface of the substrate by sweeping the surface with a spot of the laser beam while moving the stage;
(viii) controlling the etching depth according to a number of times of pulse irradiation; and
(ix) peeling off said resist.

21. A method for producing an optical signal processing circuit having a substrate on which optical waveguides are held; first and second optical waveguides formed on said substrate; and a reflecting structure that disposes a first coupling end of said first optical waveguide and a second coupling end of said second optical waveguide, which are formed on said substrate, in a position where an image-formation of each coupling end is established, and couples the first and second optical waveguides together, the method comprising the steps of:
(i) forming a thin film (A) made of metal or dielectrics on the optical waveguides held on the substrate;
(ii) applying resist on the thin film (A) formed on the optical waveguides;
(iii) tracing a pattern on the resist with an electron beam tracing device;
(iv) developing said resist;
(v) etching said thin film (A) by a reactive ion etching device while using the resist as a mask, and copying the electron beam traced pattern;
(vi) peeling off said resist;
(vii) fixing the substrate on a stage;
(viii) adjusting the tilt angle so that the substrate becomes perpendicular to an optical axis of a laser beam by observing a plurality of markers provided on the substrate with a monitoring device;
(ix) rendering a stage controller to recognize the position of said pattern by observing a plurality of markers provided on the substrate with a monitoring device;
(x) condensing said laser beam and etching a surface of the substrate by sweeping the surface with a spot of the laser beam while moving the stage; and
(xi) controlling the etching depth according to a number of times of pulse irradiation.

22. The method for producing the optical signal processing circuit as set forth in claim 19, further comprising the steps of:
disposing a spatial filter in a light condensing device; and
making the beam intensity profile of the light condensed beam rectangular.

23. The method for producing the optical signal processing circuit as set forth in claim 19, further comprising the steps of:
depositing a metal or dielectric film on the end face of the etched concave portion after said steps are completed; and
forming a reflecting structure to have increased reflectivity in said concave portion end face.

24. The method for producing the optical signal processing circuit as set forth in claim 21, wherein the material of said thin film (A) is any one of tantalum, molybdenum, tungsten, chromium, gold, platinum, vanadium, nickel, silver, copper, silicon oxide, silicon nitride, titanium oxide, boron nitride, and aluminum nitride.

25. An optical signal processing circuit, comprising:
a substrate on which an optical waveguide is held;
first through Nth optical waveguide (N is an integer not less than 2) formed on said substrate; and
N−1 reflecting structures that dispose a first coupling end of said kth optical waveguide (k is an integer of N−1≧k≧1) and a second coupling end of the k+1th optical waveguide, which are formed on said substrate, in a position where an image-formation of each other is established, and couple them together,
wherein a part or the entirety of said optical waveguide includes a nonlinear optical material, and
wherein said nonlinear optical material has a periodic polarization inverting structure.

26. An optical signal processing circuit, comprising:
a substrate on which an optical waveguide is held;
a reflecting structure for collimating light from an incident waveguide, in a slab waveguide formed on said substrate; and
a periodic structure formed in the propagation path of the light collimated by said reflecting structure, said periodic structure transmitting light polarized in one direction and reflecting light polarized in the direction orthogonal thereto.

27. A method for producing the optical signal processing circuit having a substrate on which optical waveguides are held; first and second optical waveguides formed on said substrate; and a reflecting structure that disposes a first coupling end of said first optical waveguide and the second coupling end of said second optical waveguide, which are formed on said substrate, in a position where an image-formation of each coupling end is established, and couples the first and second optical waveguides together, comprising the steps of:
(i) applying resist on a substrate on which an optical waveguide is formed;
(ii) tracing, on the resist with an electron beam tracing device, a pattern whose length in a specified direction is longer than the wavelength of a laser beam and length orthogonal to said direction is shorter than the wavelength of the laser beam;
(iii) developing the resist;
(iv) fixing the substrate, on which said pattern is formed, on a stage;
(v) adjusting the tilt angle so that the substrate becomes perpendicular to the laser beam optical axis by observing a plurality of markers provided on the substrate with a monitoring device;
(vi) rendering a stage controller to recognize the position of said pattern by observing a plurality of markers provided on the substrate with a monitoring device;
(vii) condensing said laser beam and etching the surface by sweeping the surface with a spot of the laser beam while moving the stage;
(viii) controlling the etching depth according to a number of times of pulse irradiation; and
(ix) peeling off said resist.

28. A method for producing the optical signal processing circuit having a substrate on which optical waveguides are held; first and second optical waveguides formed on said substrate; and a reflecting structure that disposes a first coupling end of said first optical waveguide and a second coupling end of said second optical waveguide, which are formed on said substrate, in a position where an image-formation of each coupling end is established, and couples the first and second optical waveguides together, comprising the steps of:
(i) forming a metal or dielectric thin film on a substrate on which an optical waveguide circuit is formed, and applying resist on said thin film;
(ii) tracing a pattern on the resist with an electron beam tracing device;
(iii) developing said resist;
(iv) copying said electron beam-traced pattern by etching using the resist as a mask;
(v) peeling off said resist;
(vi) accelerating and implanting ions; and
(vii) removing the thin film.

29. A method for producing the optical signal processing circuit having a substrate on which optical waveguides are held; first and second optical waveguides formed on said substrate; and a reflecting structure that disposes a first coupling end of said first optical waveguide and a second coupling end of said second optical waveguide, which are formed on said substrate, in a position where an image-formation of each coupling end is established, and couples the first and second optical waveguides together, comprising the steps of:
(i) fabricating a minute structure having concave and convex portions on a metal die;
(ii) forming positioning markers on said metal die having said minute structure and on an optical waveguide substrate respectively;
(iii) forming a replica of said minute structure on said optical waveguide substrate while applying pressure with the positions of said metal die and optical waveguide substrate matching each other; and
(iv) forming a core layer and an upper clad layer on a lower clad layer where said replica is produced on said lower clad layer; or forming an upper clad layer on said core layer where said
replica is formed on said core layer.

* * * * *